(12) United States Patent
Yett

(10) Patent No.: US 11,882,265 B1
(45) Date of Patent: Jan. 23, 2024

(54) ARRAY OF INDIVIDUALLY ANGLED MIRRORS REFLECTING DISPARATE COLOR SOURCES TOWARD ONE OR MORE VIEWING POSITIONS TO CONSTRUCT IMAGES AND VISUAL EFFECTS

(71) Applicant: James Yett, San Jose, CA (US)

(72) Inventor: James Yett, San Jose, CA (US)

(*) Notice: Subject to any disclaimer, the term of this patent is extended or adjusted under 35 U.S.C. 154(b) by 1018 days.

(21) Appl. No.: 16/447,931

(22) Filed: Jun. 20, 2019

Related U.S. Application Data

(63) Continuation of application No. 14/728,624, filed on Jun. 2, 2015, now Pat. No. 10,386,712, which is a continuation of application No. 12/799,553, filed on Apr. 26, 2010, now Pat. No. 9,071,834.

(60) Provisional application No. 61/214,367, filed on Apr. 23, 2009.

(51) Int. Cl.
*H04N 13/322* (2018.01)
*G02B 26/08* (2006.01)
*G02B 30/35* (2020.01)
*G03B 25/02* (2006.01)
(Continued)

(52) U.S. Cl.
CPC ....... *H04N 13/322* (2018.05); *G02B 26/0816* (2013.01); *G02B 27/0093* (2013.01); *G02B 30/35* (2020.01); *G03B 25/02* (2013.01); *G02B 27/022* (2013.01)

(58) Field of Classification Search
CPC .............. H04N 13/322; G02B 26/0816; G02B 27/0093; G02B 30/35; G02B 27/022; G02B 27/0012; G03B 25/02
See application file for complete search history.

(56) References Cited

U.S. PATENT DOCUMENTS

| | | | | |
|---|---|---|---|---|
| 3,173,985 A | * | 3/1965 | Wendel | G02B 5/08 353/121 |
| 3,469,837 A | * | 9/1969 | Heilig | A63J 25/00 472/60 |

(Continued)

OTHER PUBLICATIONS

Bengt Sjolen and Adam Somlai_Fischer' "Aleph reorganizing vision" environmental art installation. http:/Avww.aether.hu/2006/aleph/ 2007 (Year: 2007).*

(Continued)

*Primary Examiner* — Kimberly N. Kakalec

(57) ABSTRACT

A general purpose image and visual effects display apparatus, with associated methods, which is comprised of an array of independently angled reflective or refractive elements wherein the varying angle pattern of each element across said array is designed to reflect or refract specifically designed as well as fortuitously located existing colors, in precisely determined patterns, to make apparent to specific viewing or receiving locations a wide range of complex emergent visual and other effects. In some embodiments very high resolution and high color fidelity image display is possible. In other embodiments moving images akin to video can be displayed, using no electronics or moving parts. In other embodiments true binocular 3D images can be displayed directly to viewers, without the need for special 3D viewing glasses. Many of the embodiments and methods are applicable to non-visible light and other reflectable wave-based phenomena.

11 Claims, 51 Drawing Sheets

(51) Int. Cl.
  *G02B 27/00* (2006.01)
  *G02B 27/02* (2006.01)

(56) References Cited

U.S. PATENT DOCUMENTS

| | | | | | |
|---|---|---|---|---|---|
| 3,712,708 | A | * | 1/1973 | Brown | G03B 21/602 |
| | | | | | 359/451 |
| 3,806,233 | A | * | 4/1974 | Stefano | B60R 1/082 |
| | | | | | 359/872 |
| 4,560,256 | A | * | 12/1985 | Blom | G02B 27/0018 |
| | | | | | 359/851 |
| 4,696,554 | A | * | 9/1987 | Seawright | G02B 5/124 |
| | | | | | 359/853 |
| 5,083,857 | A | * | 1/1992 | Hornbeck | H04N 9/3102 |
| | | | | | 359/224.1 |
| 5,222,025 | A | * | 6/1993 | Taylor, II | G02B 5/09 |
| | | | | | 359/851 |
| 5,517,347 | A | * | 5/1996 | Sampsell | G02B 26/0841 |
| | | | | | 359/224.1 |
| 5,521,724 | A | * | 5/1996 | Shires | G02B 5/32 |
| | | | | | 359/25 |
| 5,805,119 | A | * | 9/1998 | Erskine | G09G 3/346 |
| | | | | | 345/611 |
| 6,643,069 | B2 | * | 11/2003 | Dewald | G02B 26/0841 |
| | | | | | 359/627 |
| 8,128,227 | B2 | * | 3/2012 | Greenlee | A61B 5/398 |
| | | | | | 351/200 |
| 2004/0070565 | A1 | * | 4/2004 | Nayar | G09G 3/003 |
| | | | | | 345/156 |

OTHER PUBLICATIONS

Bengt Sjolen and Adam Somlai_Fischer \lustration explaining "Aleph" http://www.aether.hu/2006/aleph/images/alef-explainingjpg (Year: 2006).*

Daniel Rozin Mirrors Mirror http:/Awww.smoothware.com/danny/mirrorsmirror.html (Year: 2008).*

Daniel Rozin Broken Red Mirror http:/www.smoothware.com/danny/brokenmirror.htm! (Year: 2000).*

Sjolen et al. (Aleph: Reorganizing Vision, 2007, [retrieved on Mar. 29, 2022]. Retrieved from the Internet <URL: http://www.aether.hu/aleph/>) (Year: 2007).*

Anish Kapoor Hexagon Mirror Dish. hittp://www.factum-arte.com/eng/artistas/kapoor/dish_hexagon.asp (Year: 2007).*

Anish Kapoor Islamic Mirror. http://www.factum-arte.com/eng/artistas/kapoor/dish_octagon_square.asp (Year: 2008).*

Anish Kapoor Regular Triangle mirror Dish http://www.factum-arte.comveng/artistas/kapoor/dish_triangle_regular.asp (Year: 2008).*

Anish Kapoor Random triangle mirror dishes http://www.factum-arte.com/eng/artistas/kapoor/dish_iriangle_random.asp (Year: 2008).*

Anish Kapoor Inout (Infinity) http://www.factum-arte.comveng/artistas/kapoor/inout.asp (Year: 2009).*

James Seawright "Hex Flector" http://www.seawrightnetjames-seawrightworks.html (see image 5 on page) (Year: 1988).*

James Seawright "Passing Reflections" http://wwww.seawright.netjamesseawrightworks.html (see images 6 and 7 on page) (Year: 1987).*

James Seawright "Mirror 5" http://www.seawrightnetjamesseawright/works.html (see image 4 on page) (Year: 1984).*

International Searching Authority Written Opinion of the International Search Authority dated Jan. 18, 2012 (Year: 2012).*

Seawright 'Mirror 1' (1984) (available at: http://users.rcn.com/jdeubel/plaza/mirrori.html) (Year: 1984).*

Rozin 'Wooden Mirror' (1999) (available at: http://www.smoothware.com/danny/woodenmirror.html) (Year: 1999).*

Rozin 'Self Centered Mirror' (2003) (available at: http://www.smoothware.com/danny/selfcenteredmirror.html) (Year: 2003).*

Rozin "Mirror No. 5—2001" (available at http://www.smoothware.com/danny/mirror5.html). (Year: 2001).*

Falk, Seeing the Light: Optics in Nature, Photography, Color, Vision and Holography, 1986, p. 213. (Year: 1986).*

* cited by examiner

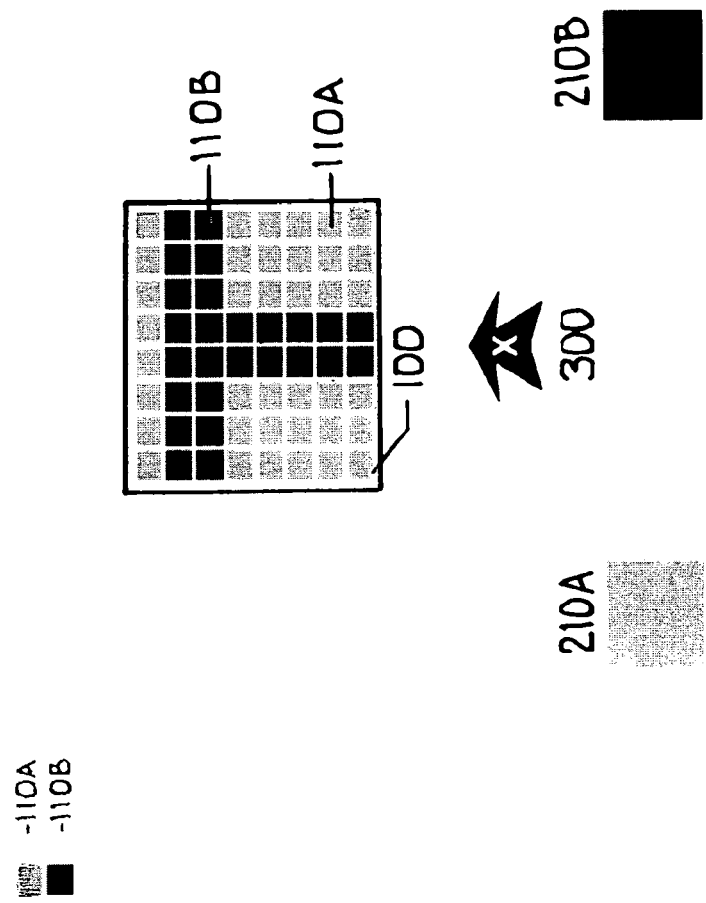

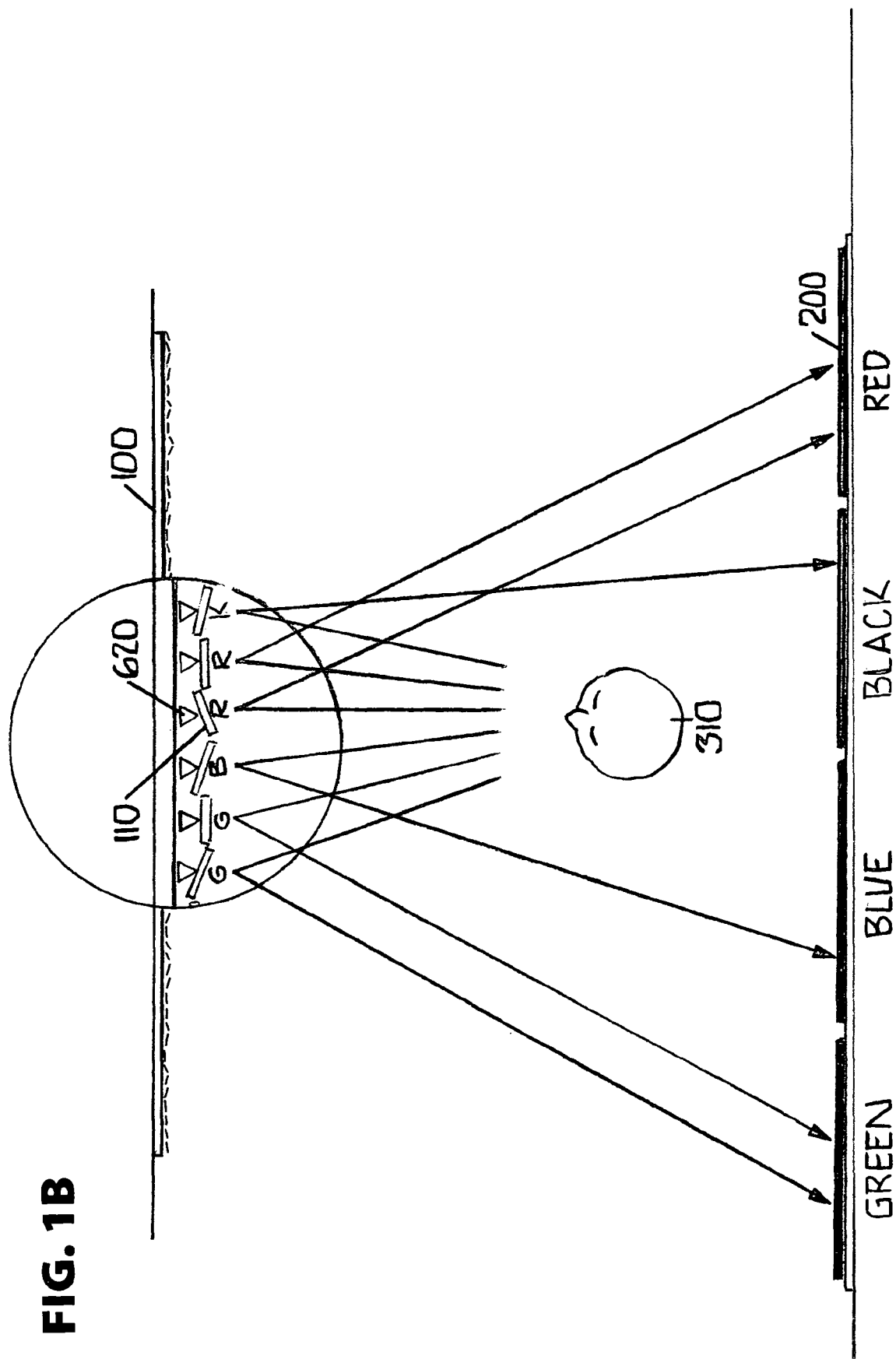

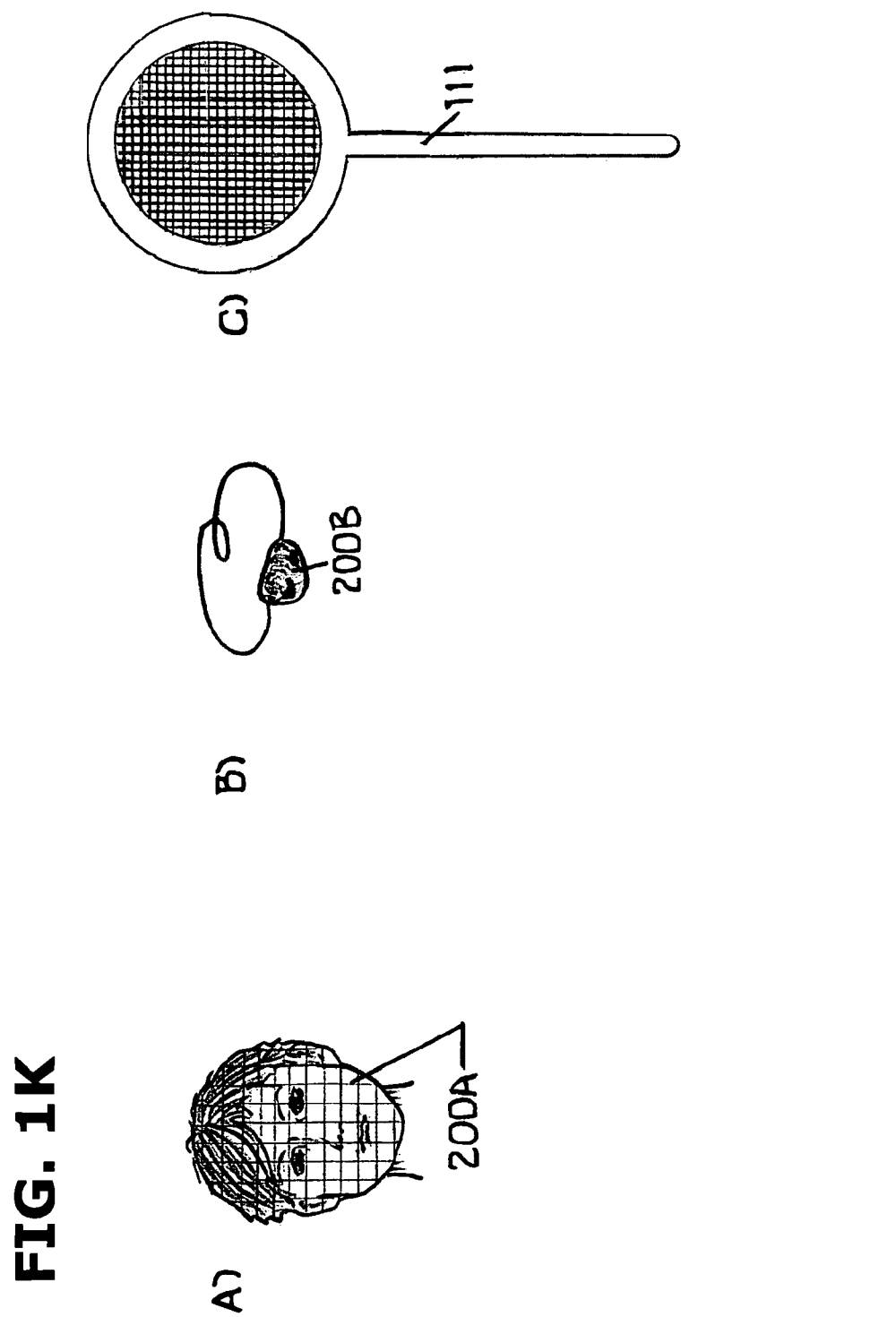

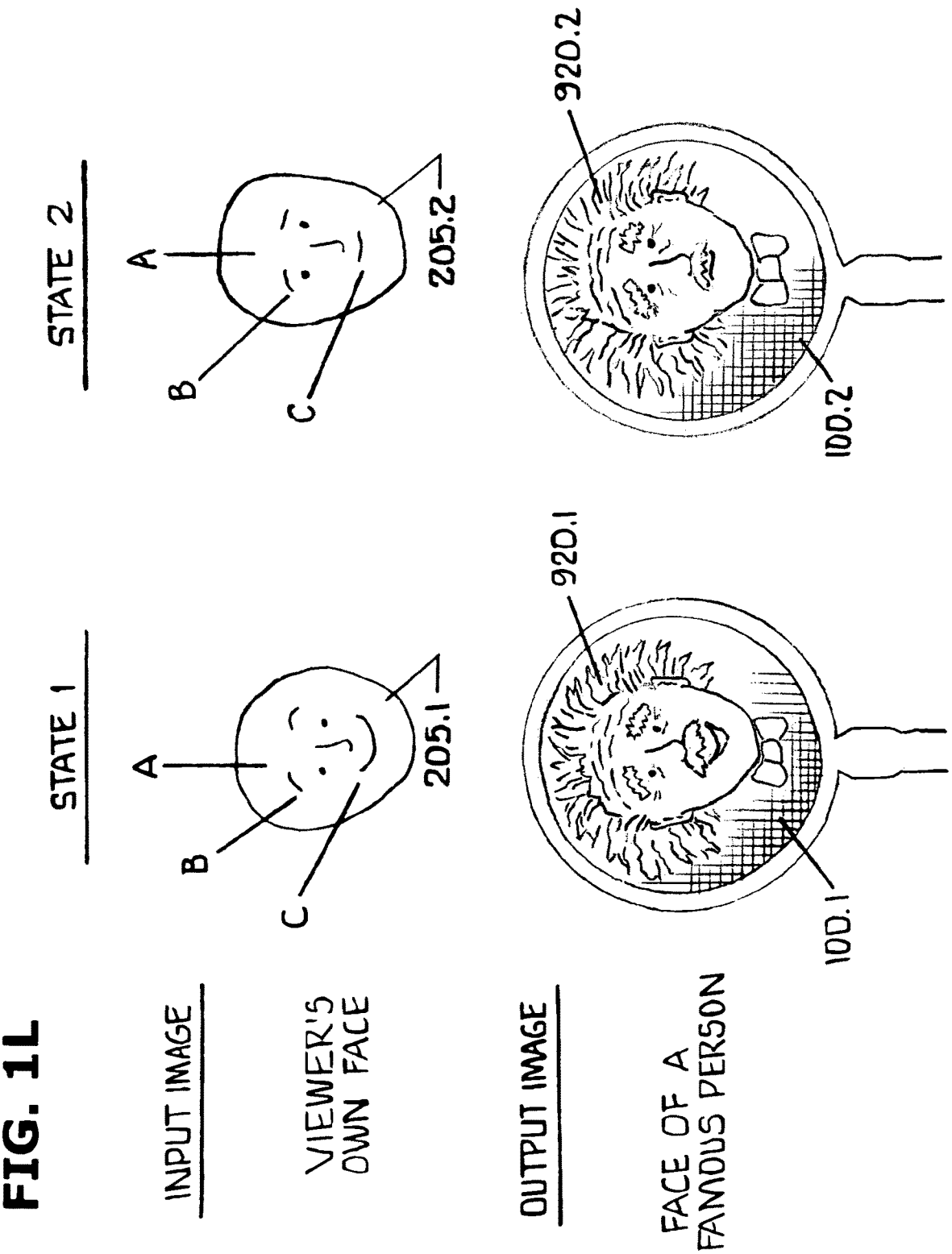

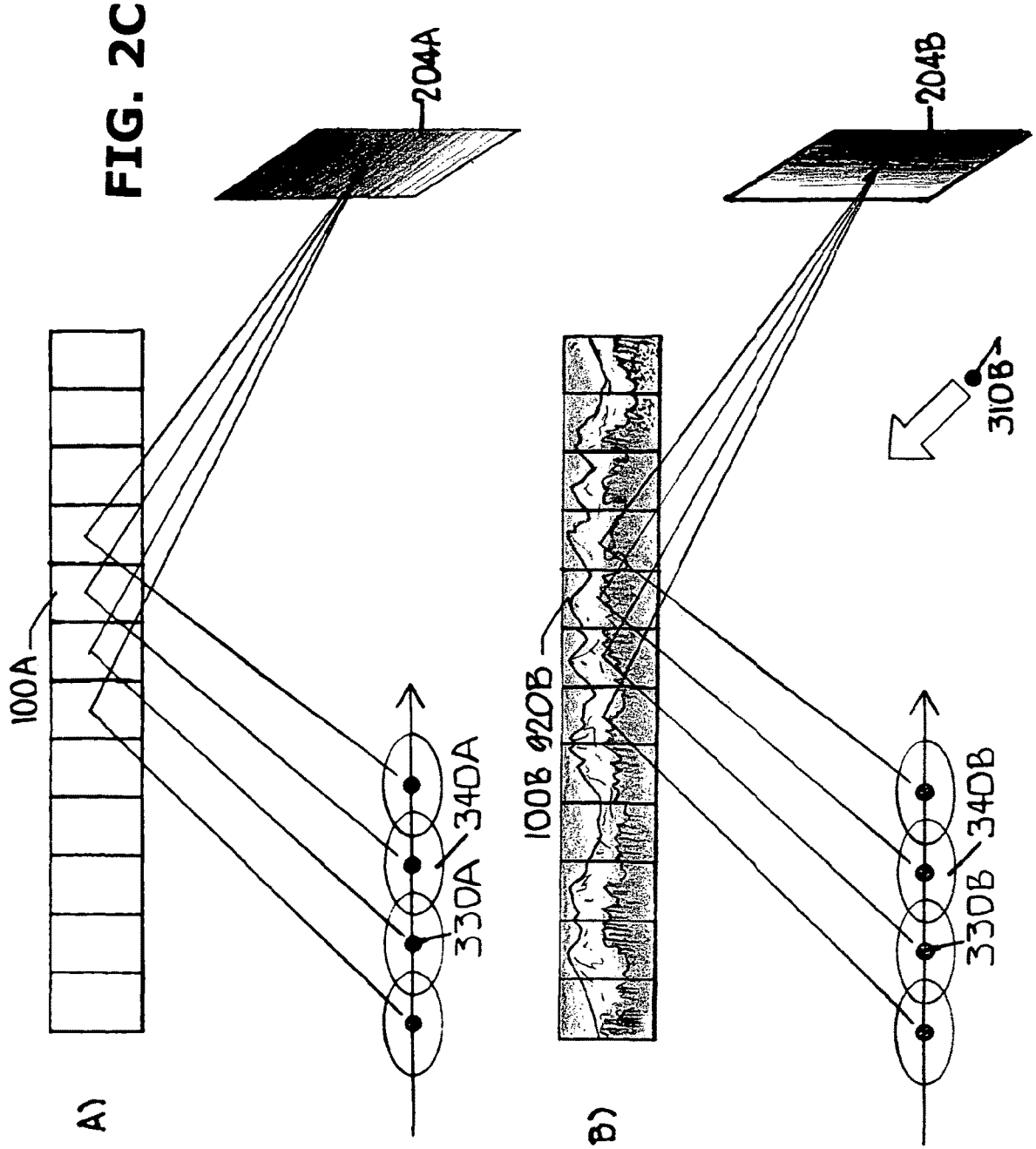

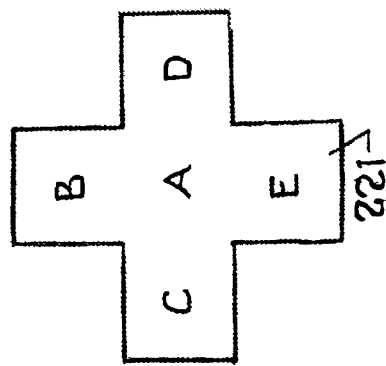

A)

110

B)

100
621

US 11,882,265 B1

ARRAY OF INDIVIDUALLY ANGLED MIRRORS REFLECTING DISPARATE COLOR SOURCES TOWARD ONE OR MORE VIEWING POSITIONS TO CONSTRUCT IMAGES AND VISUAL EFFECTS

CROSS-REFERENCE TO RELATED APPLICATIONS

This application is a continuation of and claims priority under 35 USC 120 to U.S. patent application Ser. No. 12/799,553 filed Apr. 26, 2010 that in turn claims priority and the benefit under 35 USC 119(e) to U.S. provisional patent application No. 61/214,564, filed Apr. 25, 2009 by the present inventor, the entire contents of all of which are incorporated herein by reference.

FEDERALLY SPONSORED RESEARCH

Not applicable.

SEQUENCE LISTING OR PROGRAM

Not applicable.

BACKGROUND

Field

The invention relates to structures for representing full color images, animation, 3D graphics and other visual effects, and particularly to structures comprising a plurality of tile elements which reflect or refract light and the color reflection sources which are optionally organized in conjunction with or tracked and cataloged to be reflected by said array, to construct said visual effects.

Prior Art

U.S. Pat. No. 3,173,985, "Method of Reflection for Producing a Pleasing Image", by Clifford A. Wendel, 1965, describes a method of producing a grey scale image on a screen by reflecting a light source onto a translucent screen using a faceted mirror surface.

U.S. Pat. No. 4,696,554, "Method and Apparatus for Providing a Variable Multiple Image Visual Effect", by James Seawright, 1987, describes an array of mirrors differentially angled so as to all reflect the viewer's own face or eye, back to himself, to present multiple identical self reflections to the viewer.

Published patent application Ser. No. 11/570,589, "Sculptural Imaging With Optical Tiles", by Roderick Quin, 2008, uses arrays of shaded tiles to presents images directly to the viewer.

Visual artist Daniel Rozin in 2003 produced an art installation called "Broken Red Mirror", in which the large shards of a broken mirror were angled to reflectively reconstruct a torn photograph spread on a wall behind the viewer of the mirror shards.

An article published in 2007 on the inhabitat.com web site describes an articulated mirror array built by Adam Somlai-Fischer and Bengt Sjolen, consisting of several dozen old car side mirrors that could be tilted up or down under software control to present changing reflective patterns and rough images: http://www.inhabitat.com/2007/08/11/aleph-mirror-environmental-art/

SUMMARY

Each reflective tile in a mirror tile array as described herein is, in several embodiments, functionally a pixel. A mirror tile pixel's color is dynamically changeable by changing the reflection vector from viewer to mirror to color source. Full control over color of each pixel/mirror is possible by giving each mirror its own dedicated reflection color source, which is possible by angling each mirror so that it reflects a different position in space, at which can be placed any color source. With control over the color of each mirror/pixel, comes complete control over the entire image. Any image can thus be presented with this method, up to the resolution of the given mirror array, which by means of various current technologies, is potentially a very high resolution.

A second and different color source can be placed laterally contiguous to the first color source of each mirror/pixel. This second color source can be part of an alternate image. This alternate image can then be viewed by a viewer of the first image from a viewing position laterally contiguous with the original viewing position. Or, in place of the viewer shifting his position laterally, the second image can also be brought into view by either pivoting the mirror array a small amount or by moving the color sources.

Further, if the color sources for a series of images are similarly lined up sequentially next to each mirror's/pixel's first two image's color sources, then this series of images can be viewed in sequence by the same method of adjusting the reflection vector (either by shifting viewer position, mirror array angle pivot, or source color position). If this sequence of images is a series of animation or video frames, then this static differentially angled mirror array can be used to present animation or, essentially, video.

For a more detailed review of some the underlying principles, in accordance with one embodiment of the invention, picture a ceramic wall mosaic showing a lake-side scene. If every colored ceramic tile in this mosaic is replaced by a tiny mirror, the lake-side scene is lost and replaced by a reflection of the viewing environment. If each tiny mirror is perfectly in plane with all others, the result is effectively a standard mirror. If the mirror tiles are set out of plane with each other, the reflected image will be jumbled. Alternatively, in place of randomly angled mirror tiles, there are many precise and specific mirror angle arrangements that support a range of image presentation effects, many of them previously achieved only using live computer displays. As a simple example, the same scene that had been constructed using colored ceramic tiles can be reproduced using mirror tiles, the color of each tile apparent in reflection from a given viewing position. This reflective color mosaic can be very similar to, if not indistinguishable from, the original tile display. Many optional additional properties can be invoked in this display now that the source colors have been abstracted away from the image. For example, the water can be made to shimmer like water, the tree leaves can be made to wave or animate, in various ways, whenever a breeze blows through a nearby tree—if this is an outdoor display, and the image's reflective source for green is the leaves of a wind-blown tree. In addition, with certain methods of placing each mirror tile's source colors, the original image can be displayed in true 3D, or it can be animated in various ways, such as to show a bird flying through the scene.

The colors in an angled mirror mosaic display are abstracted away from the viewing apparatus in a way roughly similar to how a computer display's color palette is abstracted away from the onscreen image, stored in memory where it can be freely and programmatically manipulated, or references to it can be manipulated, in both cases to invoke effects on the displayed image. Both displays' colors are not determined by manipulating actual spots of pigment on a display but, much more fluidly, by manipulating numbers, which then determine the display colors. In the mirror display, the number from which color is derived is the array of mirror tile angle settings. These angles use light reflection vectors roughly similarly to how a computer image uses a digital color lookup table. In both cases, the abstraction between color and display allows programmatic manipulation of the contents of the display. The abstraction of color, away from the mirror display allows, in one sense, a layer of software in a physical object, where image effect algorithms can be implemented by the group manipulation of mirror angle settings, and these algorithms can be executed by the real-time interplay of light when the viewer moves along a preset viewing path to invoke a predetermined collective reflection vector movement, thus invoking a predetermined sequence of changes in the reflective source colors of each tile, resulting in an animation or image other effect.

The simplest class of angled mirror array image effects, effects configured without regard to colors in the viewing environment, includes image distortions akin to fun house mirror effects, but also such effects to a far more complex degree and with fewer mirror shape design constraints, partially because a mirror array considered as a distorting surface can have shape discontinuities not possible in a bent or even a folded continuous reflective sheet. In a more interesting class of effects, the mirror tile angles are configured with precise consideration of the colors constellated in the reflected environment, to invoke a much wider and more useful range of image effects than generic distortion effects. For example, a given city scene can be reflectively translated into a photo-realistic portrait, or a mountain scene, etc. Still more diverse effects are possible when the colors and patterns in the reflected environment are specifically devised and mapped out, and then set into reflectable position, in conjunction with the formulation of specific mirror angle arrangements. This is where 3D effects, animation and other unexpected and novel effects arise, in the absence of a video screen, or of any moving parts in the display device. In some constructions very long form animation is possible—theoretically of arbitrary length and, with increasing technical difficulty, any resolution. This is basically video without electronics and without any moving parts. This moving images technique is possible using non-modern components, though animation of any length or resolution would be very labor intensive, without computer assistance in repeating the thousands of iterations required to set up each frame.

In a more versatile version of this type of display each mirror/pixel is actuated live by computer, and able to be quickly and precisely retargeted—re-angled—to new color sources, several if not 30 times per second, taking a fraction of that time in transit between angle settings, thus supporting high-speed "reflection re-set animation". This live actuated embodiment is much more versatile than static mirror array reflected-color reference animation, which is based on mirror pixels reflection-tracking over printed pixel animation histories, and is therefore limited to preset printed content. In addition, a further-enhanced live-actuated embodiment tracks, through a real-time video feed, both viewer position and all color reflection source positions and their changing color characteristics. By tracking viewer position, especially eye position, and adjusting all tiles to compensate for changes in viewer position, the actuated reflective display can under computer control ensure that the reflected images and effects remain in view as the viewer moves at will. By tracking the color environment, real-time changes in available reflectable colors can be incorporated into the scene, enhancing a wealth of software controlled interactive and other visual effects. For one example, if a red car enters the scene it can be tracked and reflected and constitute the source color of a bouncing ball for part of its drive-by, and then the reflection of the car can be morphed into a realistic reflection of a red car.

Returning again to review some more basic principles, note that a grid of individually angled mirror tiles can effectively act as pixels—pixels that reflect rather than radiate light, to redirect local color sources by virtue of their differential reflection angles, and present those color sources in any pixel order, thereby constructing any possible image, with two key limitations:

the palette of colors in the surrounding environment available to be reflected;

the resolution of the mirror tile grid.

The mirror angle grid constructs a given image by reflecting colors that are either accidentally or purposefully present in the surrounding environment. The random preexisting color set in an environment can be ordered into any image whose palette is a subset of that given color set—or can be mixed from the environmentally available colors. To construct an image, each mirror tile in the grid must be specifically angled based on the spatial position of each required color in the environment, the desired constructed image, and the position of the viewer of the resulting reflectively constructed image. To maximize available display color range, with a given limited available reflectable palette, groups of mirrors can be treated as "sub-pixels", or color channels, (and optionally freely sized in relation to each other), to mix colors.

If, for example, in a given intended display image the 327th mirror/pixel in the 44th mirror/pixel row must be a specific light shade of orange, to become a tiny section of an image of an orchard, then that mirror tile must be angled, with respect to the viewer, toward a suitably shaded orange colored object somewhere in the reflectable surroundings of the mirror array, and so must all other pixels that form a tangerine. The various necessary shades of orange may be reflected from different points in the surrounding environment, and the several dozen mirror tiles that together construct the tangerine may all be angled in slightly or distinctly different directions or, equally, many or all of them could be angled toward just a few specific color sources, perhaps seven different shades of orange. If no orange color sources exist in the environment of the reflective display, then it may not be possible in that location to reflectively construct an image of a tangerine, at least not an orange tangerine. There would, however, remain the option of reflecting yellows and reds on groups of adjacent mirror tiles, to mix these two colors to thereby derive the required orange shades. This is perfectly feasible, provided the required component colors are available to mix. If no suitable mix colors are available in the reflectable environment, then an object or swatch of suitable orange could be purposefully introduced into the scene, to augment the existing color set. Some reflective grid displays are constructed solely from existing colors, for various reasons, and some are constructed solely from custom-devised and introduced colors, color patterns and assemblages, and some from a mixture of existing and introduced color sources. Colors and color patterns which are designed specifically for the purpose of being reflectively reconstructed into mirror grid images can be engineered both independently of the angle settings of the presentation mirror grid, or can be designed in conjunction with the mirror grid in order to present many image effects that are not possible when reflecting only ambient colors. While both the angled mirror array and the source color pattern are widely configurable alone to produce various effects, the parameters of both of these, when adjusted in conjunction, enable effects not possible when setting the parameters of each element in isolation.

The reflectable color set can thus be a pre-existing random constellation of colors, or be an augmented random set of colors, or can be an entirely constructed image—a very precisely designed color pattern, sometimes reverse calculated from desired display effects. Display effects can be very complicated, and the reflective reference color maps required to produce them can therefore be very complex, large and elaborate.

The display types possible with this angled reflection array and designed source graphics system include still images, multiple different still images displayed at the same time to different viewing positions, animation, multiple different animations simultaneously displayed to different viewing positions, 3D images with stereoscopic vision, single axis 3D rotation, two axis 3D rotation and many other specialty effects.

How can stereoscopic 3D images be presented by static mirrors that reflect static color arrays? Each eye looks at each mirror tile from a slightly different position, and thus the reflection source seen by each eye is similarly a different position. In each mirror tile each eye can be presented a different color in reflection, and thus for each eye a different image can be constructed by the entire array. The different images seen by the two eyes can be any pair of images, including 3D image stereo pairs.

How can animations be presented by static mirrors that reflect static color arrays? The movement of the viewer causes the reflection point targeted by each mirror tile to move along a path, that path being the inverse of the movement of the viewer's movement. Each mirror tile reflection target can be set up to move along a different reflection path, not overlapping the reflection targets of other mirrors. Along that path can be printed color changes that correspond to the changes that each mirror tile/pixel must display over time and thus form an animation.

There are embodiments of the invention not based on static mirror arrays and static reflection sources, and in these the animation or other interactive effects are not under control solely of the viewer's movement relative to the mirror array, or other relative movement between viewer, mirror array and reflected graphics. In these other embodiments further interactive elements are supported by dynamic control of elements of the system, such as movement of the mirror array as a whole, movement of sections of it, control of individual mirror angles, movement of the reflected color source or parts of it or the use of a computer display or other programmable or moveable media as the color source.

The images presented by this system are visible only from specific viewing areas, where all the prescribed tile reflections converge. The image viewing area can be small, or large, or irregularly shaped, and there can be more than one viewing area per display, each viewing area with a different image, animation or effect and size. The reflection reference colors that are reflected toward the viewing area or areas can be reflection-gathered from many directions, or can be reflected from a small contiguous area, such as from a small prepared source graphic of tightly packed colors and patterns that support a given effect. For example, the ability for the viewer to vary the overall hue or brightness of the image by moving his position within the viewing area can be set up by sorting all the source colors by hue or brightness, and then printing them contiguously in that order. For a simple example, a rainbow image can be used as a color source. From a specific position an image reflectively constructed from a rainbow color source will be apparent in true color, but from adjacent positions all mirror tile reflection vectors will be shifted along the source graphic, and thus the apparent image will be color shifted.

Some embodiments of the invention rely solely upon colors in the surrounding environment, and do not introduce any additional color sources. The first step in designing mirror arrays that will extract images from the environment is to determine the existing colors in the environment and then compile them into a list. This palette must list, minimally, not just the specific colors situated in the environment but also the mirror angle settings at which they are available with respect to the mirror array position. This is the basis for setting the angles of the mirror tiles to construct an image and direct it toward a given viewing position in that given environment. In a standard computer graphics program when a given pixel needs to be designated as turquoise, for example, the appropriate RGB (Red-Green-Blue) primary color levels are assigned to that pixel. To designate a pixel/mirror tile as turquoise in a reflective mirror grid, instead of assigning RGB levels, reflection angle settings are assigned to each mirror tile. The angle settings of all locally available reflective colors will, generally, have been determined prior to the design of the given image, to confirm that the all colors necessary to construct that image are reflectively available.

A more detailed palette/color angle list will include, beyond each color's angle position, additional color source attributes useful for specialized images and effects. These additional color parameters include color correlated to time of day and time of season, color source texture information and various other optional specialty attributes. Especially important and useful for designing reflectively presented images is the exact size and shape of each color source. Size of a color source determines the size of the viewing area of the reflection of that color. When composing an image with a reflective palette for a given display situation, there is often a minimum required viewing angle, and therefore a minimum required color source size. As noted, some colors in a given reflected image may be required to have a large viewing angle, while other colors in the same image may not have that requirement, or may be required to have a small viewing angle. In some instances the foreground of an image might be specified for wide viewability while the background is specified to be constructed of very changeable reflected colors. The background might therefore be constructed of references to mottled areas, with no consistent coloration, and thus the angle locations of such textures and small angle color patches would be logged, in a local palette survey, along with the list of large patches of solid color. Further, mottled areas that are biased toward greens, browns, blues, grays, etc., would be registered separately in a more comprehensive palette, so that image design would be afforded the option of a mottled background, as in one case, might horizontally graduate from gray, to blue to brown, for example. A wide range of color source pattern information can, thus, be usefully logged for use when creatively composing possible reflectively presented images.

Reflectable texture is a specialty application of the more general and purer idea of identifying and using solid color sources used in mirror arrays to allow mirror arrays to in many cases most directly emulate certain basic traditional display type characteristics. Most of the effects described herein pertain to the interplay of solid colors, and in most instances the color-reflective mirror array effects discussed are dealing with solid colors. Many of the effects discussed use gradients as color sources, but treat the sections of gradient as solid colors, since perceptively, they are in effect solid colors. The same principle applies in many cases when compiling ambient environmental reflectable color lists, where a nearby green tree has both texture and shade changeability, affording an opportunity for these have to be registered as palette attributes, for proper or accurate image composition. Such a tree color source is not a solid green. A distant tree, by contrast, is, effectively, a solid green, and will be useful therefore in different and generally more versatile ways. The potential combination of pure color effects and the wide range of texture, movement, time-dependent reflectable color sources and a myriad of other reflectable environmental visual characteristics provides an additional wide range of creative and utilitarian advantages to reflection based imaging as described herein.

When a color is present in the environment, or is placed into the environment, as a wide reflectable swatch, and a given mirror tile targets that swatch toward a given viewing position, that color will be visible in that tile from a wide viewing area. If all color references of a display image are large swatches, the viewing area will be wide with respect to the entire image. Likewise for reflectively constructed images that target small color source swatches. Reflectively targeting these will result in an image viewable from a correspondingly narrow viewing area.

There can be different color source swatch sizes for different parts of a given image, and therefore different viewing area sizes for those different parts of the image. For example, most of an image of a house can be constructed of wide viewing angle colors, while at the same time the window panes of the house's windows are constructed of narrow viewing angle colors. This allows a viewer of the image to move within a wide area and see the image of the house and windows, though the windows will be blank, and then move into a small section of the wider viewing area from which to see colors and images in each window. Each separate window's content can, also, become visible from a different area within the wider viewing area. Or a combination of still image and animation can be used to present short animations within small sections of a larger still image, in this case perhaps displayed in a window pane or as a television screen seen faintly in the house through a window.

If all colors in a given image are referenced from very small swatches, then the entire image's viewing area will be very small. Narrow viewing angles for individual images or effects facilitate the presentation of multiple separate viewing areas, of entirely different images, and many other interesting effects, such as animation and 3D imagery. As noted, to present 3D images, each eye is simply presented with a different color, at each mirror/pixel, to thereby construct two separate images, one for each eye. The more color reflection sources, all things being equal, the smaller the color sources and therefore the smaller the viewing areas of the images reflectively constructed. 3D images, in that they require twice as many color resources tend to be associated with narrower viewing areas. When a given effect requires viewing angles that are so narrow as to strain the viewer's ability to effectively maintain a stable gaze within the viewing area, then the viewing area may be stabilized by one of a number of different methods, one being simply the placement of apertures, stable viewports through which to stably see the images. When there are different characteristics to an image, effect or animation from different positions within the viewing area, then the viewport can helpfully be notated to indicate the image attributes at the various positions and the effect of movement in one direction or another, within the viewing area.

The general display principles and variations described can all be constructed by hand, mirror tile angle by mirror tile angle, though any but the most simple displays would in practical circumstances rely upon computer and software assistance to perform the many iterations of simple math operations required.

DRAWINGS—FIGURES

Basic Image Translation and Color Sources:

Figure 1C:
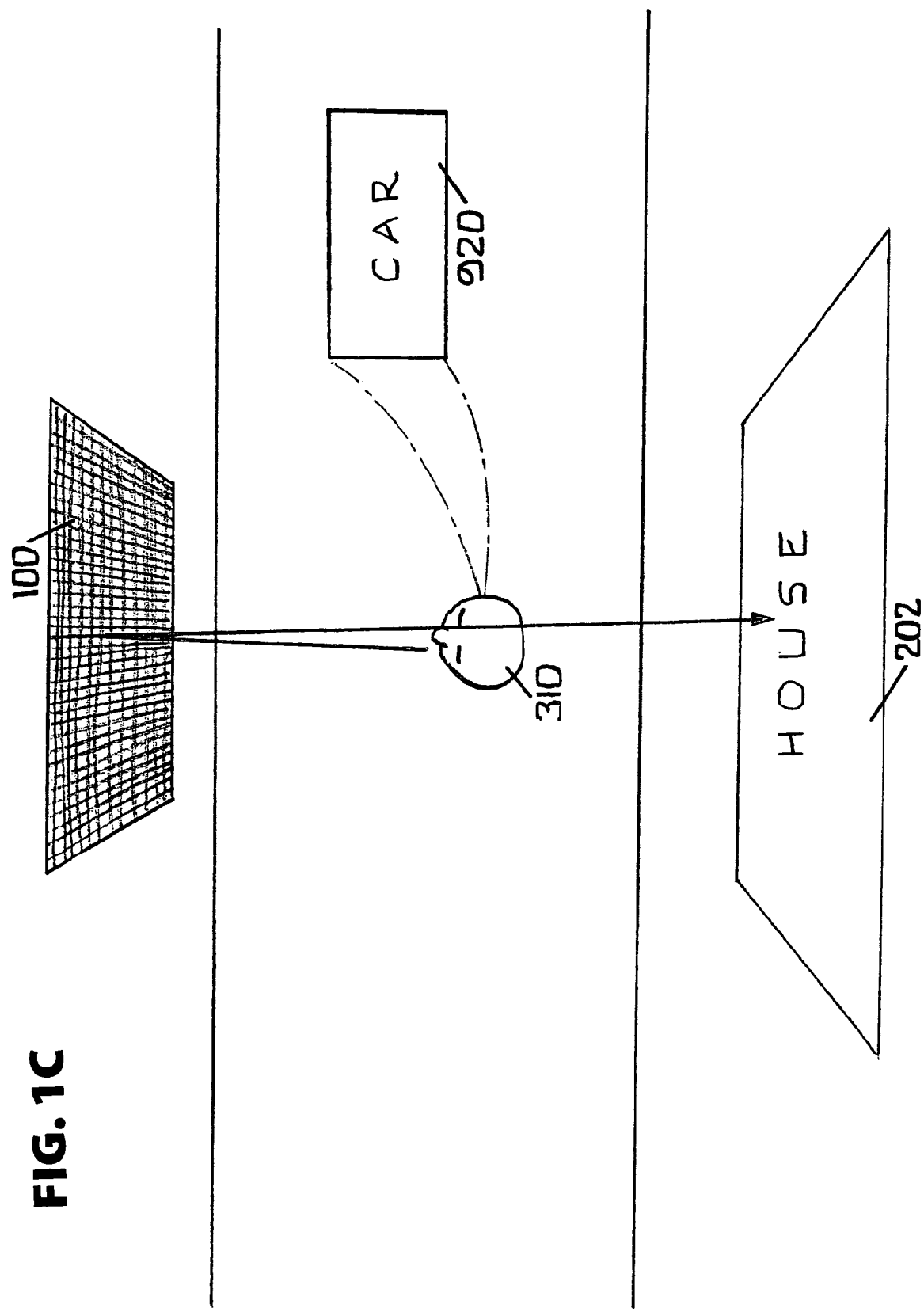
FIG. 1C shows that in place of discrete color swatch color sources, a realistic image and color patches therein can be used as an image construction color source, thus effectively "translating" one image into another.
Figure 1D:
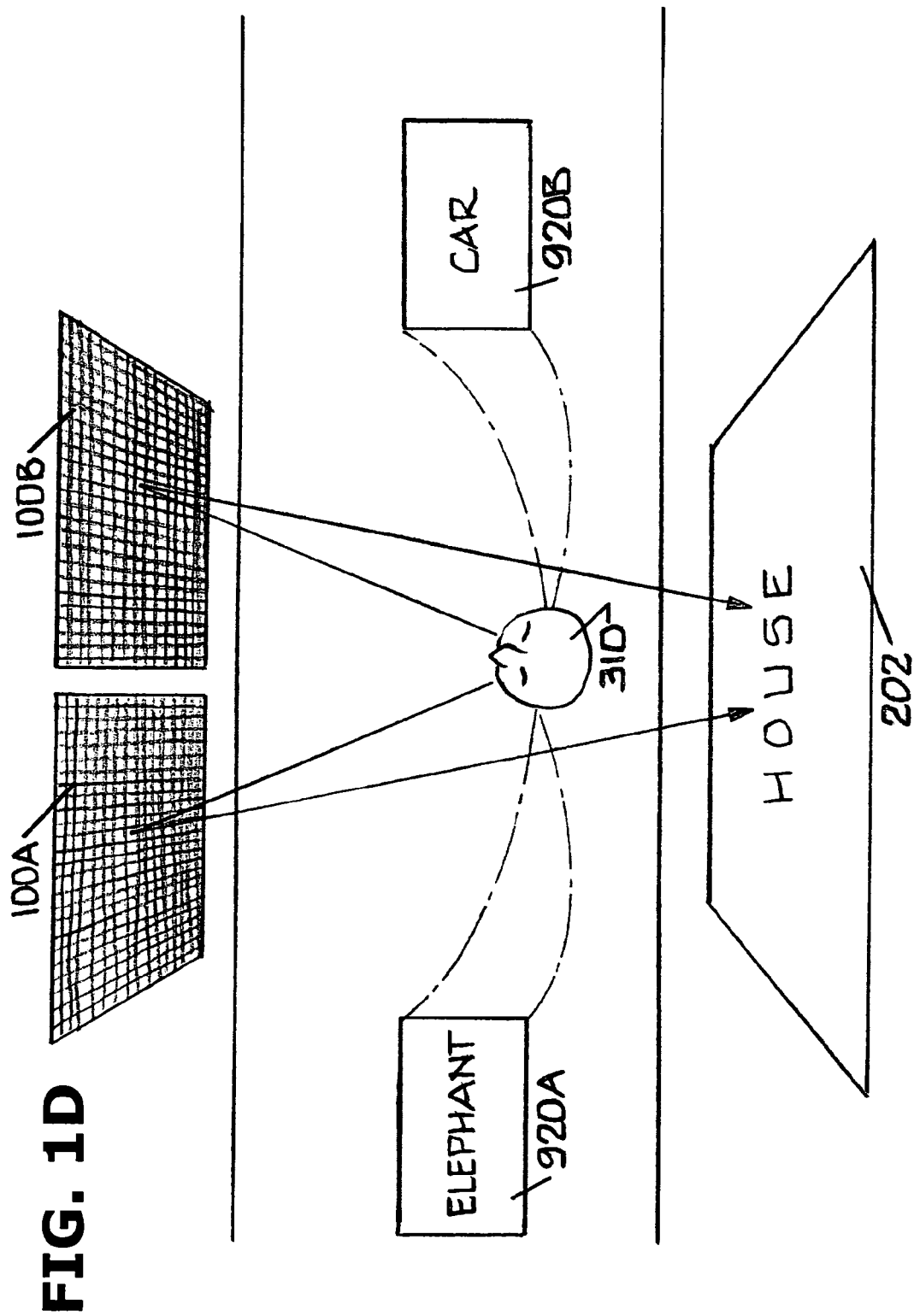
FIG. 1D shows that a single realistic image source can be simultaneously "translated" into two different reflective images in separate arrays, visible at one viewing location.
Figure 1E:
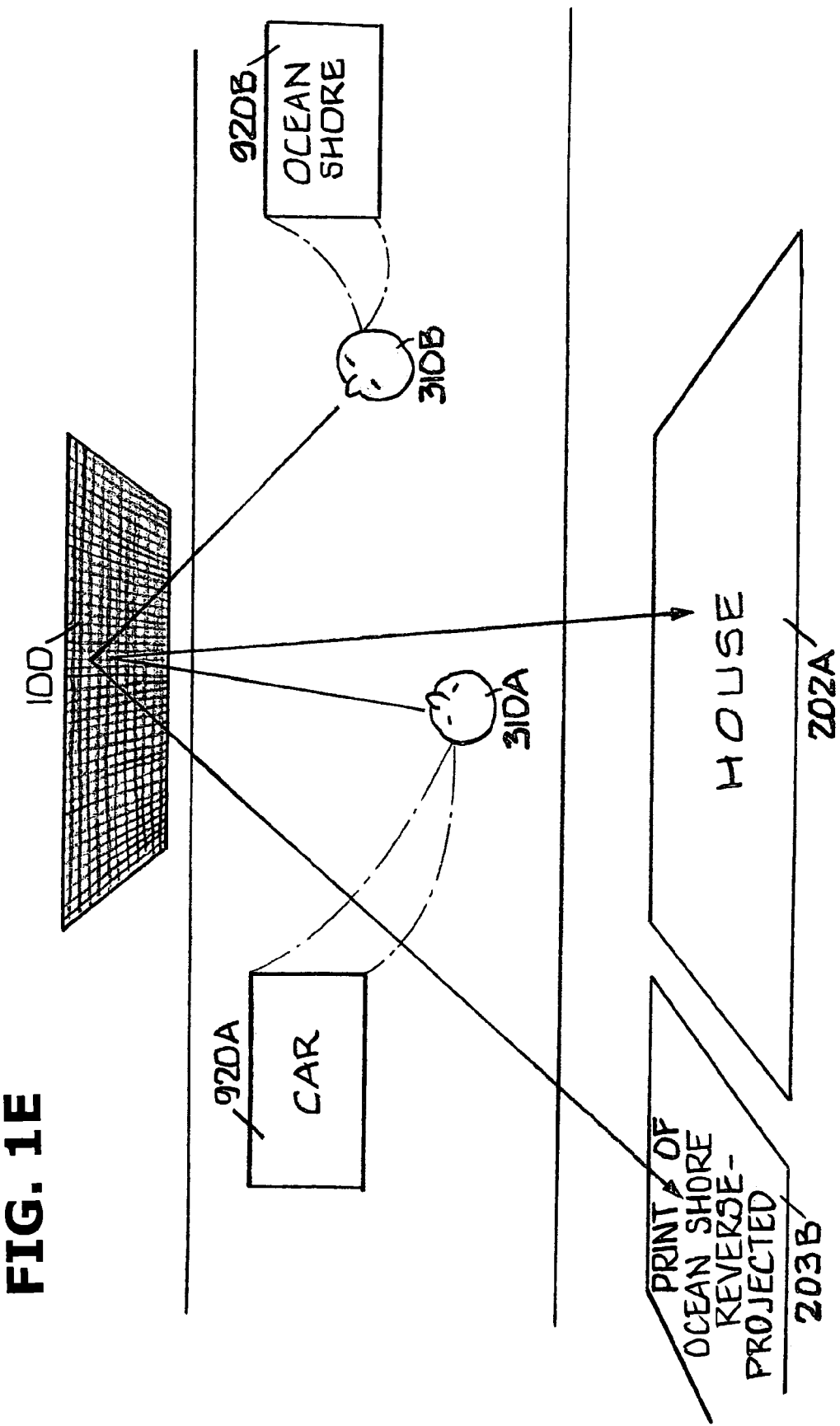
FIG. 1E shows two viewing locations for a single mirror array, each one of said viewing locations being shown a different image.
Figure 1F:
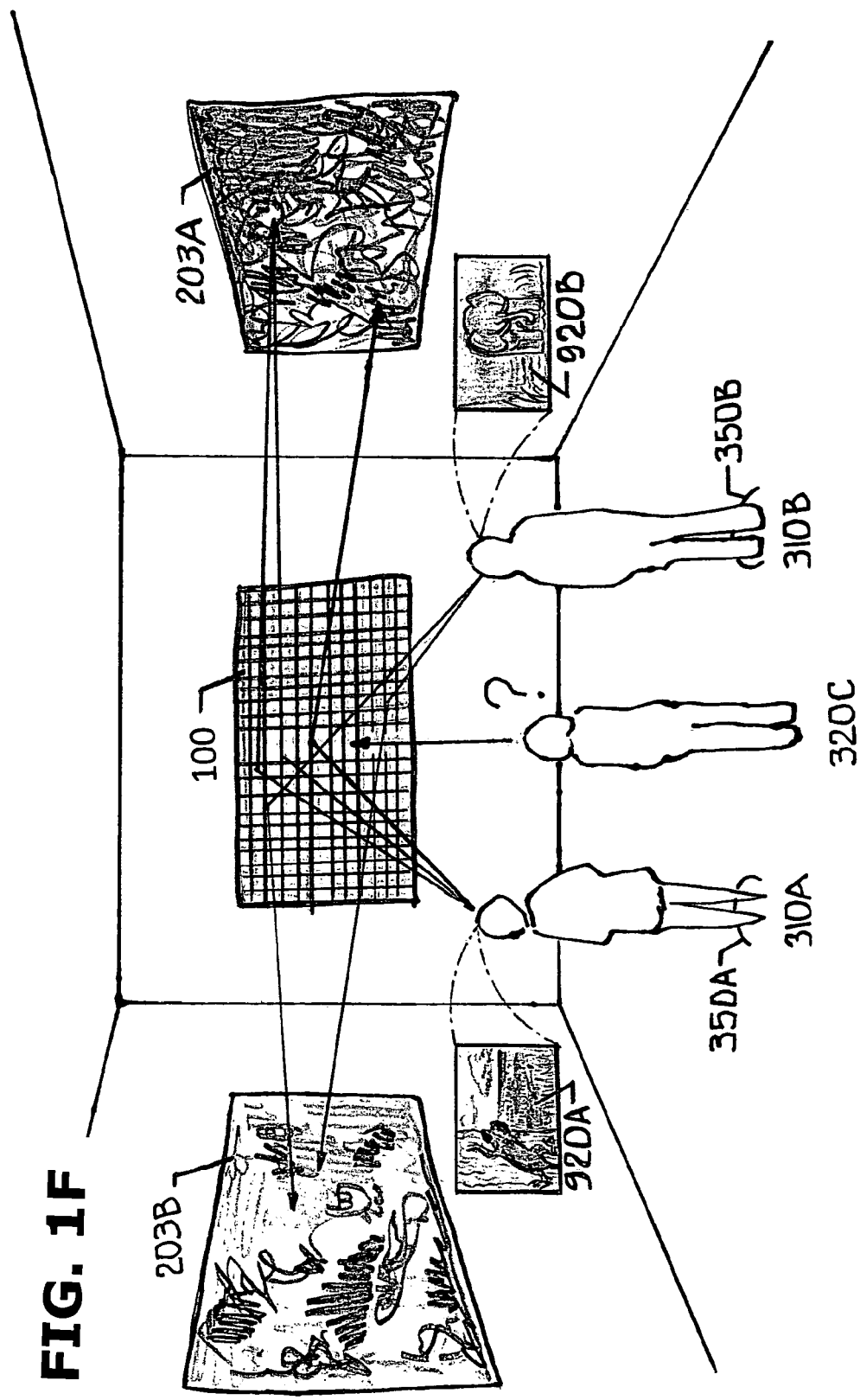
FIG. 1F shows how two unique reverse projected images are apparent from the different perspectives of two viewers, A and B, looking at the same mirror array
Figure 1G:
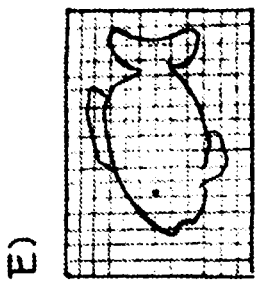
FIG. 1G shows two methods for rearranging the colors of an image of a city scene into an image of a fish.
Figure 1G:
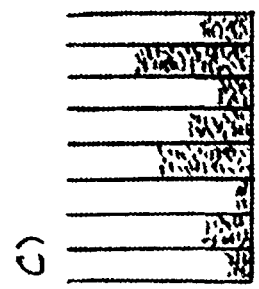
Figure 1G:
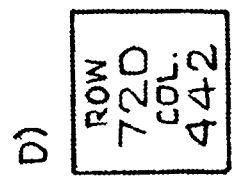
Figure 1G:
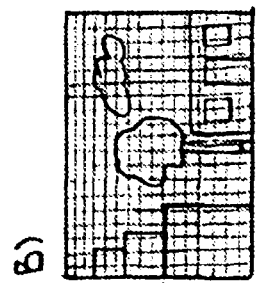
Figure 1G:
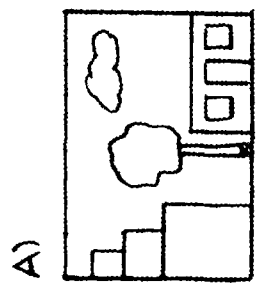
Figure 1G:
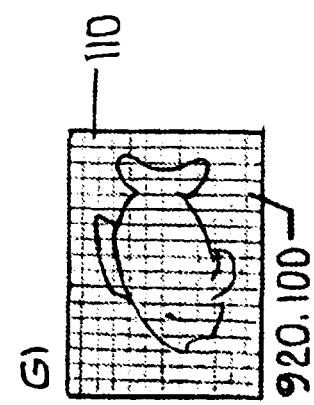
Figure 1G:
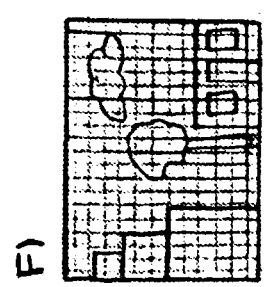
Figure 1H:
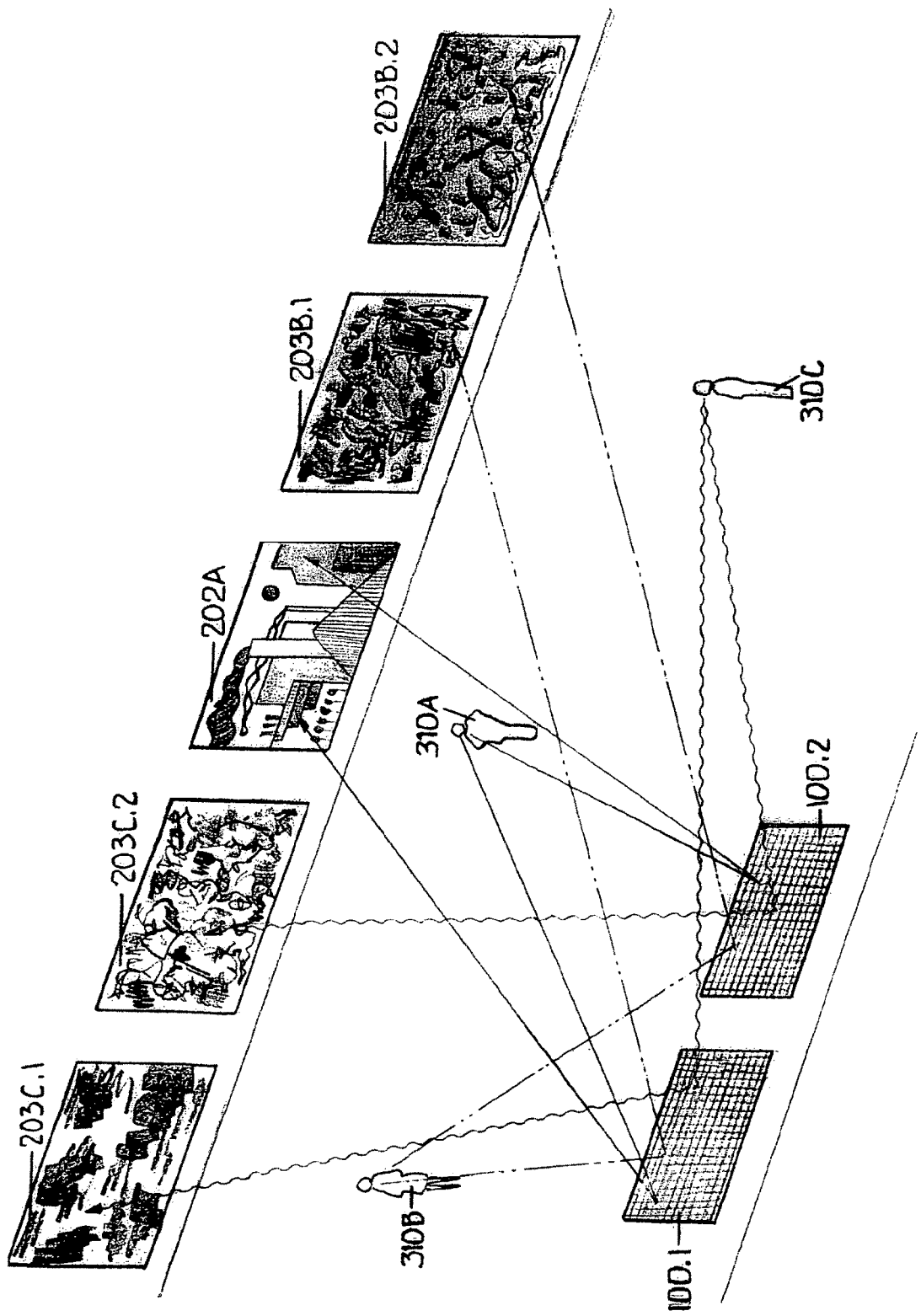
FIG. 1H shows the geometrical configuration of 2 mirror arrays and 5 color reference maps.
Figure 1I:
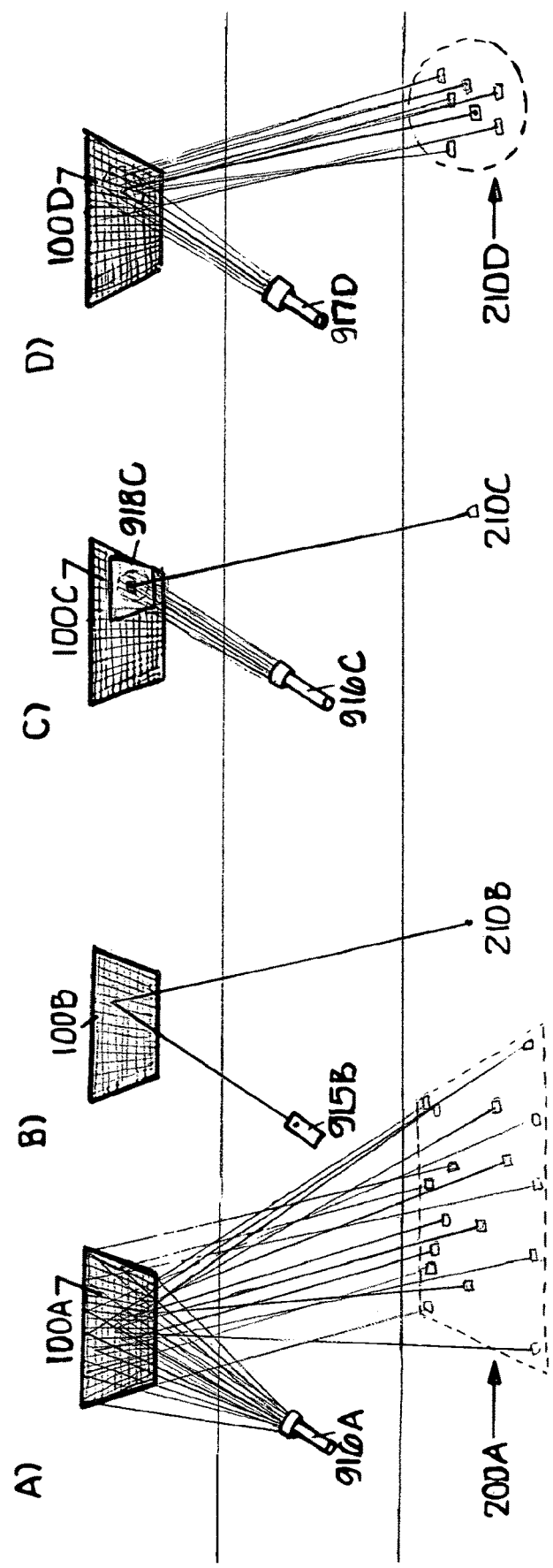
FIG. 1I shows a laser and a flashlight technique for determining the color reflection source location for each mirror tile in an array, from a chosen viewing location.
Figure 1J:
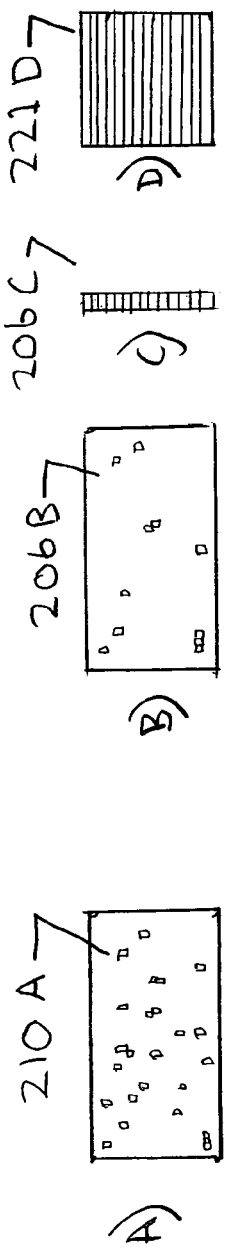
FIG. 1J shows how reference graphic color swatches can be freely repositioned
Figure 1M:
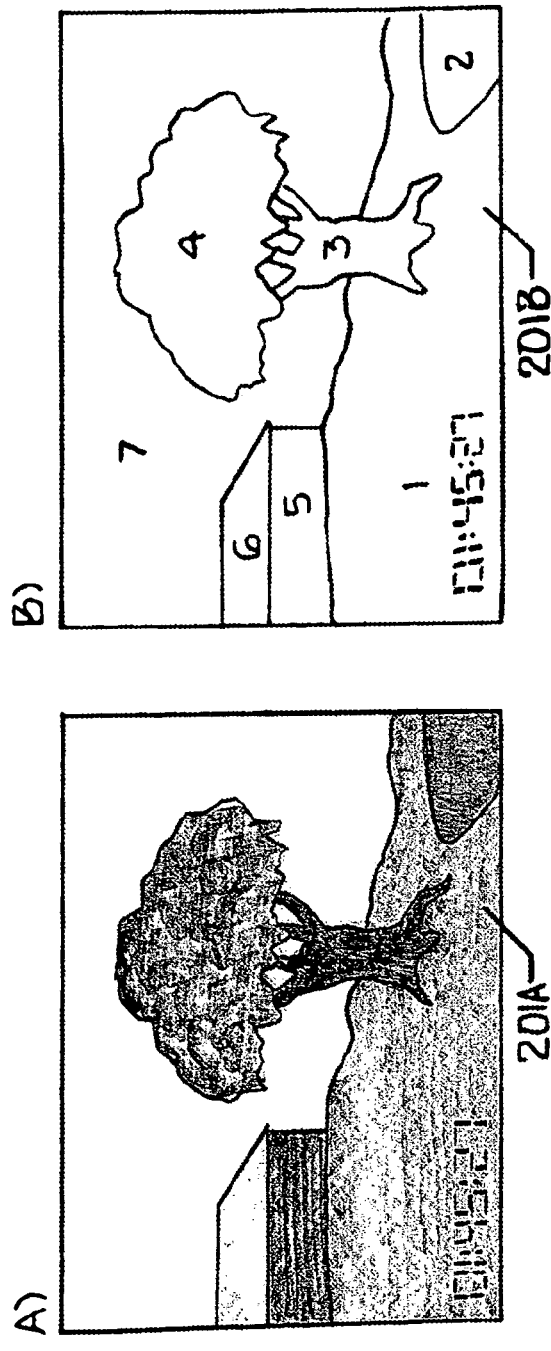
FIG. 1A shows a simple reflectively constructed image.
FIG. 1B shows individual mirrors angled so as to reference specific colors, reflected to a single viewing location, to construct an image.
FIG. 1K shows a mirror array viewer's own face being calibrated to become the source graphic for the image he will see in a small mirror array.
FIG. 1L shows a reflective array built to use the viewer's own face as the color source to construct the image of another person's face.

FIG. 1M relates to the process of how an outdoor scene would be color sensed by digital camera to identify flat areas of like color.

Figure 1N:
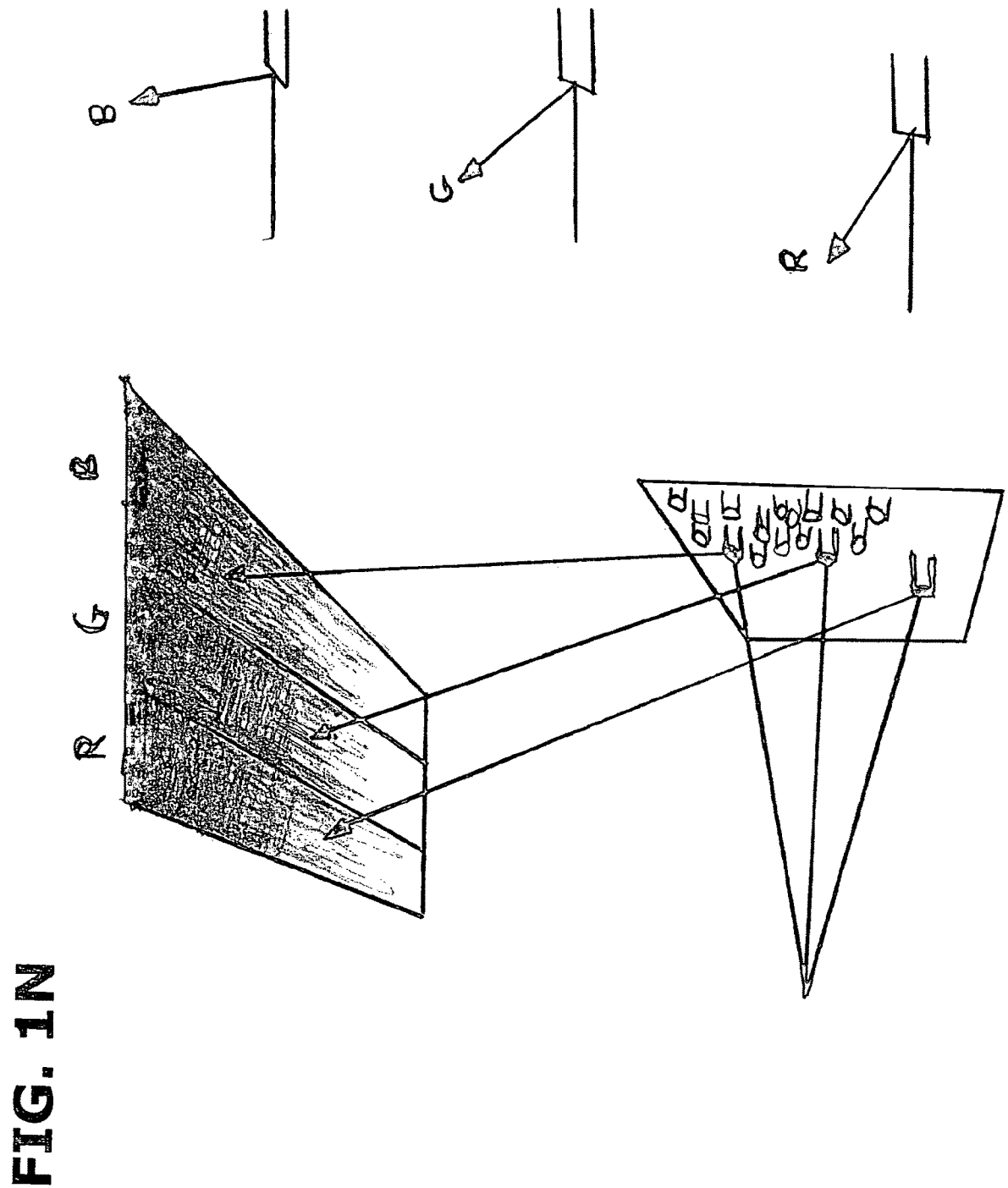

FIG. 1N shows rotatable angle cut pegs reflecting an RGB color source.

Figure 2A:
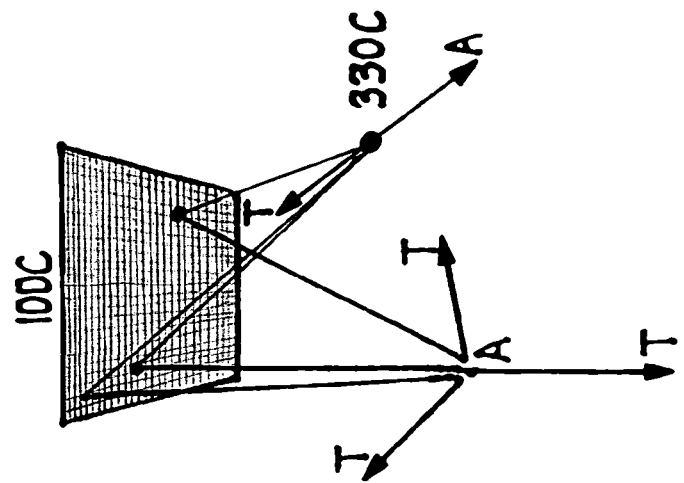
Figure 2A:
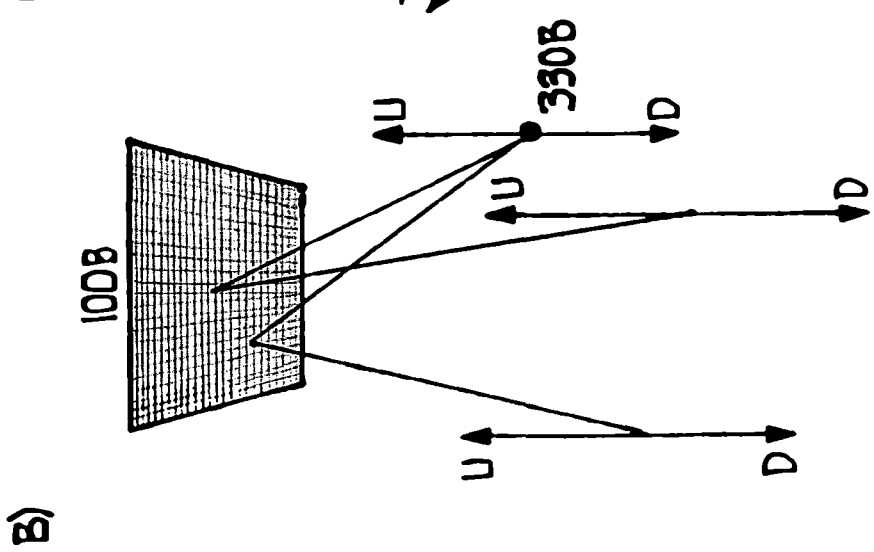
Figure 2A:
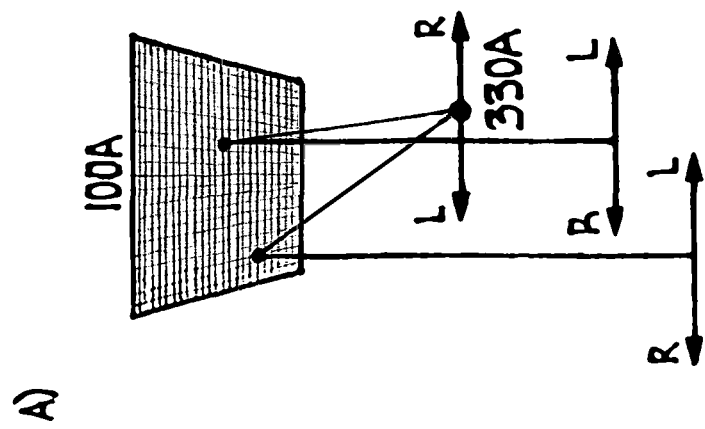

Movement:

FIG. 2A shows how viewer movement, whether on the X, Y or Z axis with respect to the mirror array, results in a reciprocal reflection vector change.

Figure 2B:
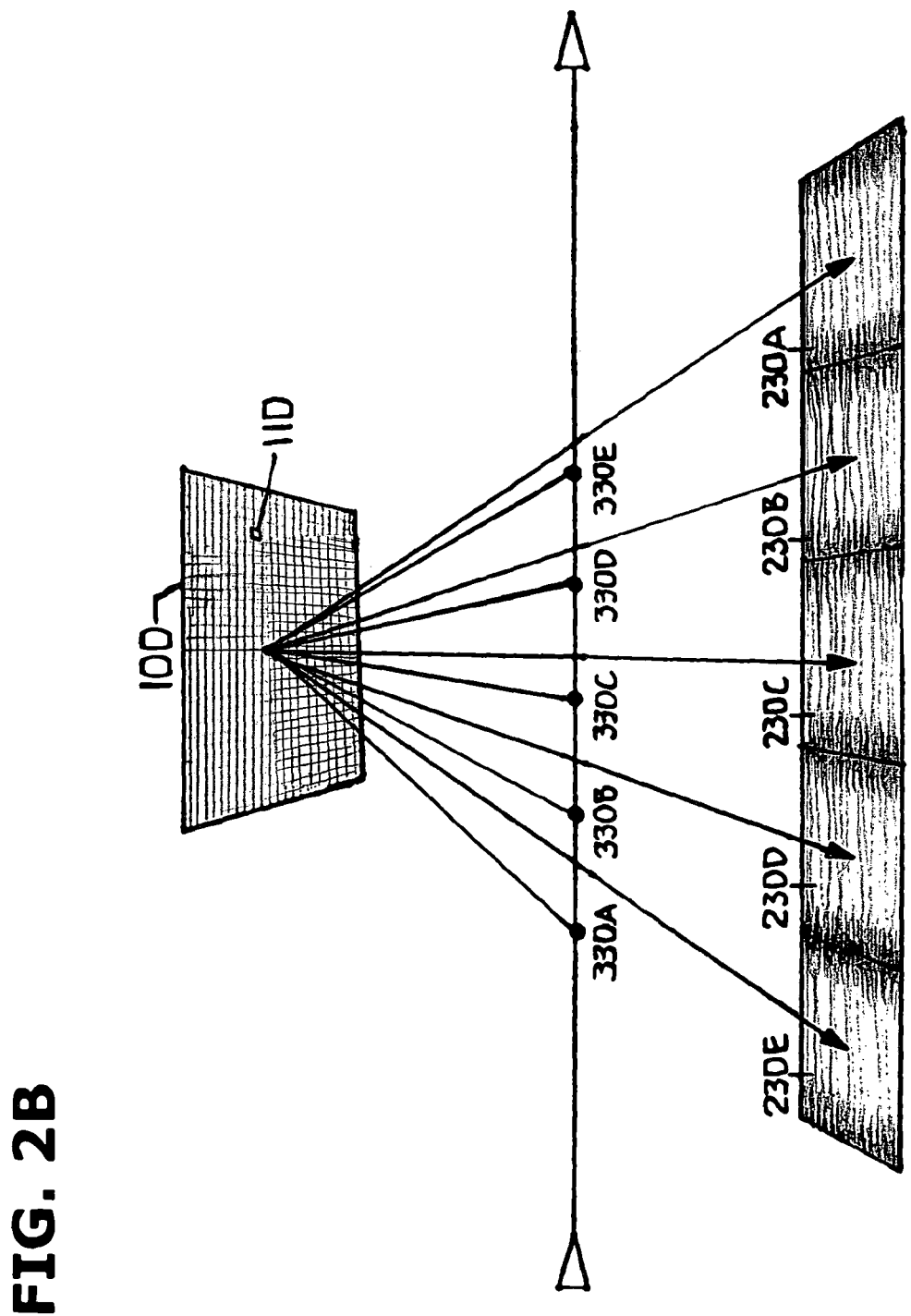

FIG. 2B shows still image sequence transition effects from the perspective of a viewer moving along a path, shown from left to right in front of a mirror array.

FIG. 2C shows a passerby who sees a series of reflective arrays, arranged to display a sequence of images, using grey gradients as a color source.

Figure 2D:
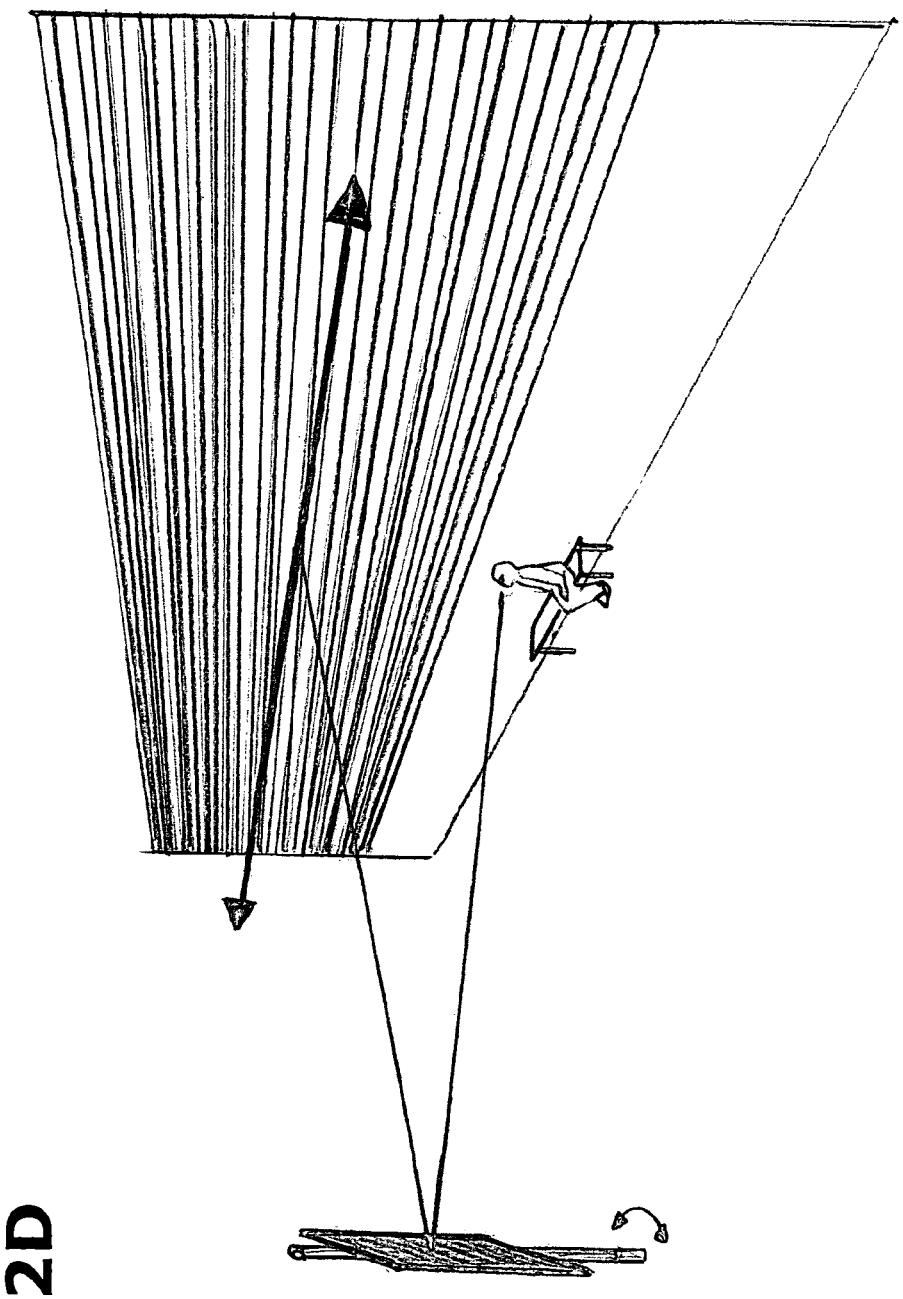

FIG. 2D shows a pivoting array, in which a viewer is watching an animation.

Figure 3A:
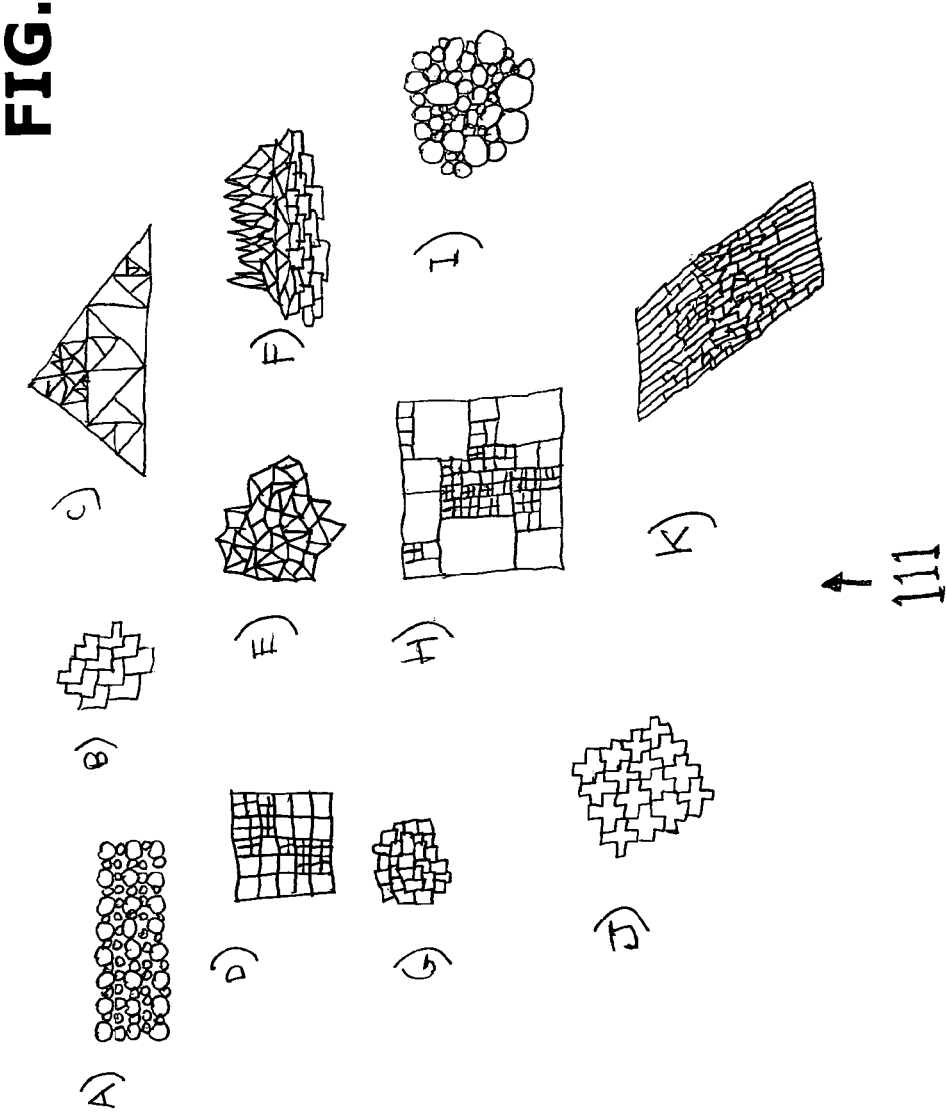

Mirror Tile Shape:

FIG. 3A shows a selection of mirror tile element size and shape options.

Figure 3B:
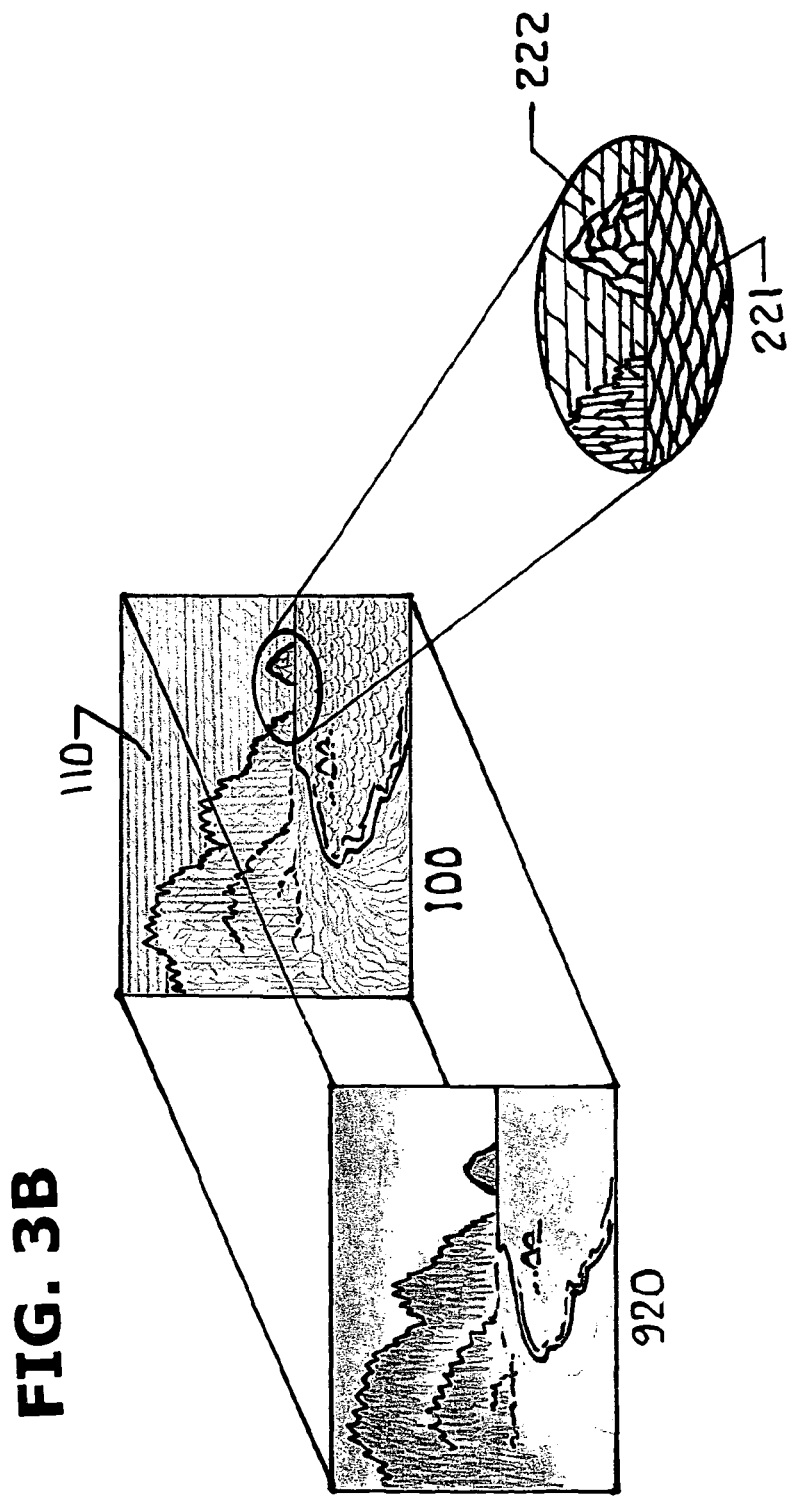

FIG. 3B shows how mirror tile element shape and size can be customized to the content of a specific display image.

Figure 4A:
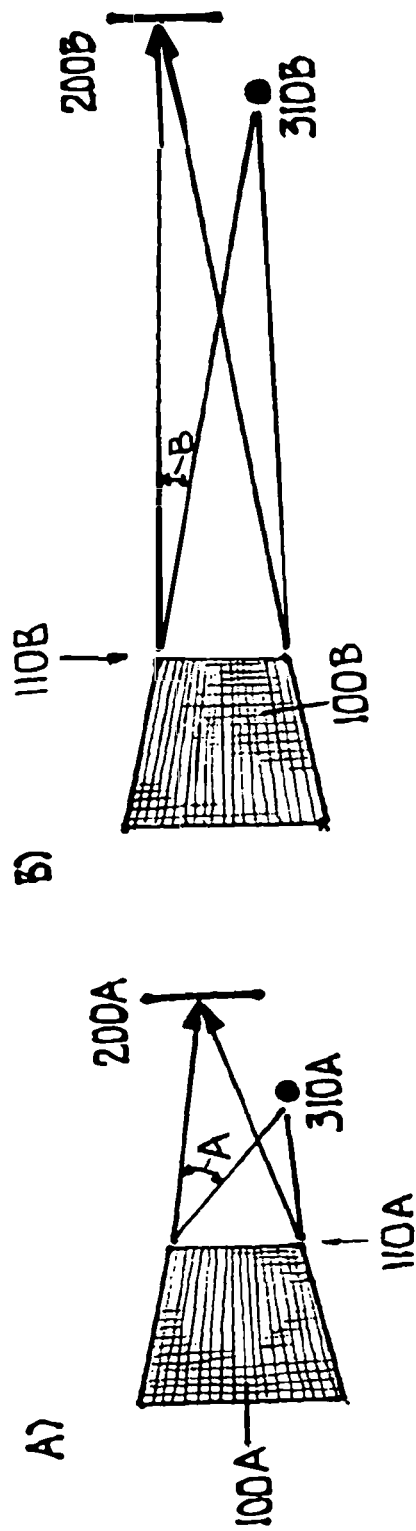

Viewer Positioning:

FIG. 4A shows how the distance from the reflective array, of the color reflection source and of the viewer, affects the angle variation across a display for reflecting given color swatches.

Figure 4B:
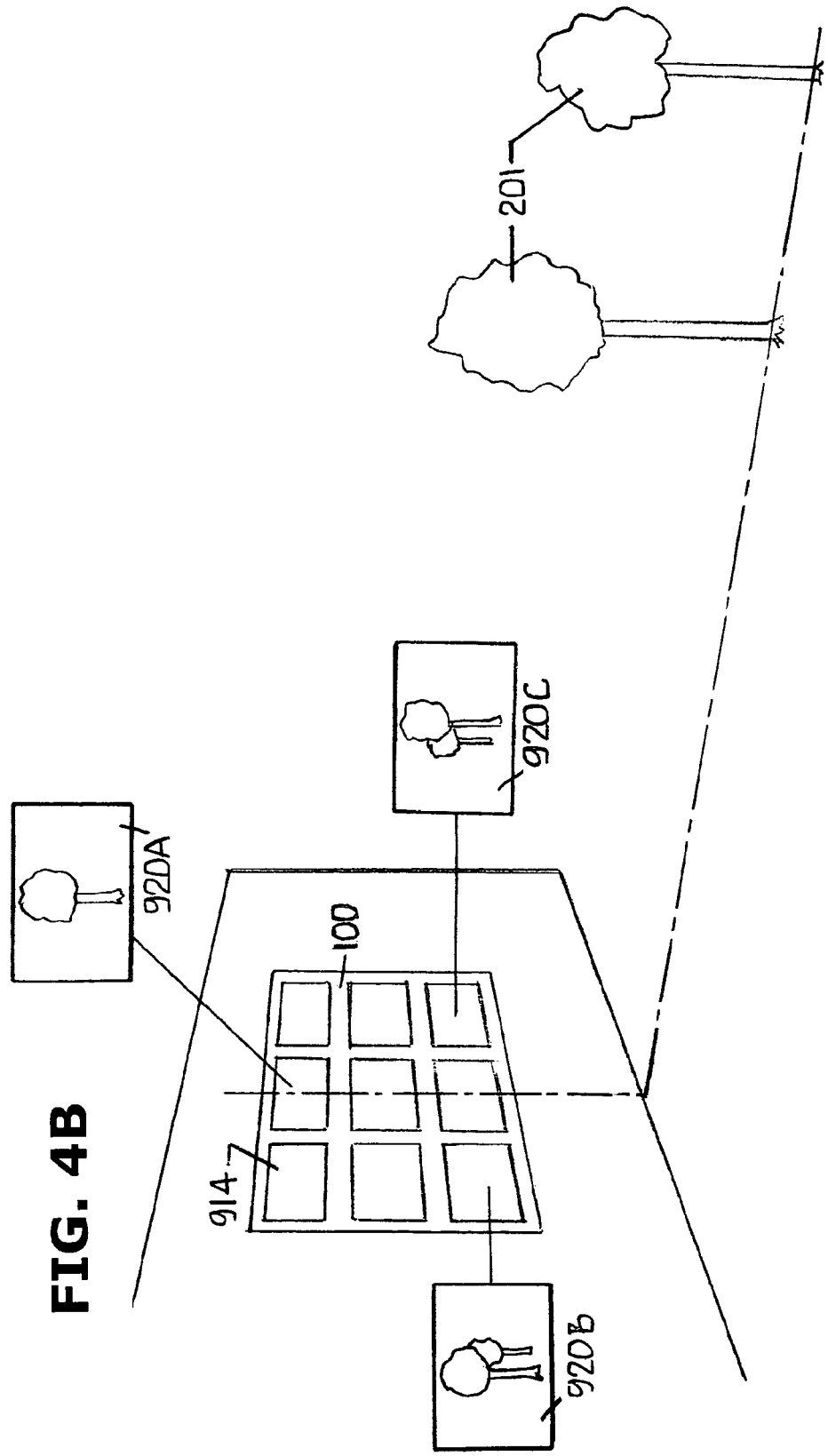

FIG. 4B shows how different sections of a given array will, due to parallax, "see" a different reflective environment.

Figure 4C:
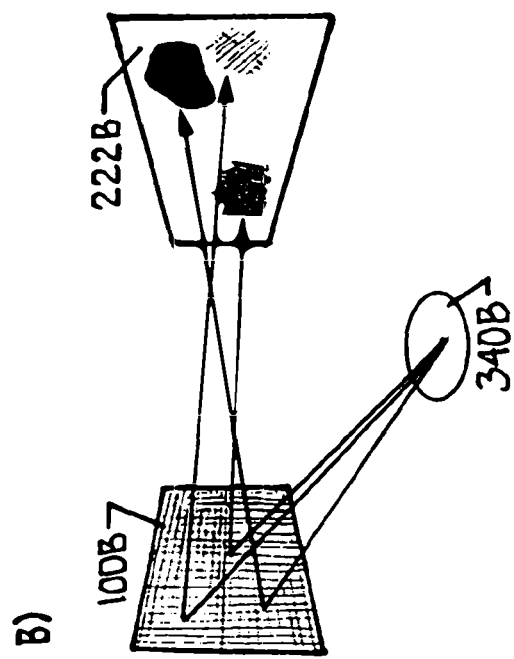
Figure 4C:
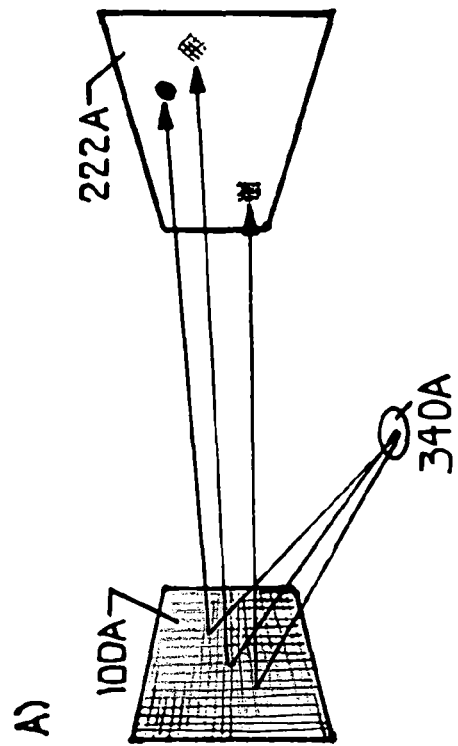

FIG. 4C shows how the size of the color reference correlates to the size of the viewing area, for that given color.

Figure 4D:
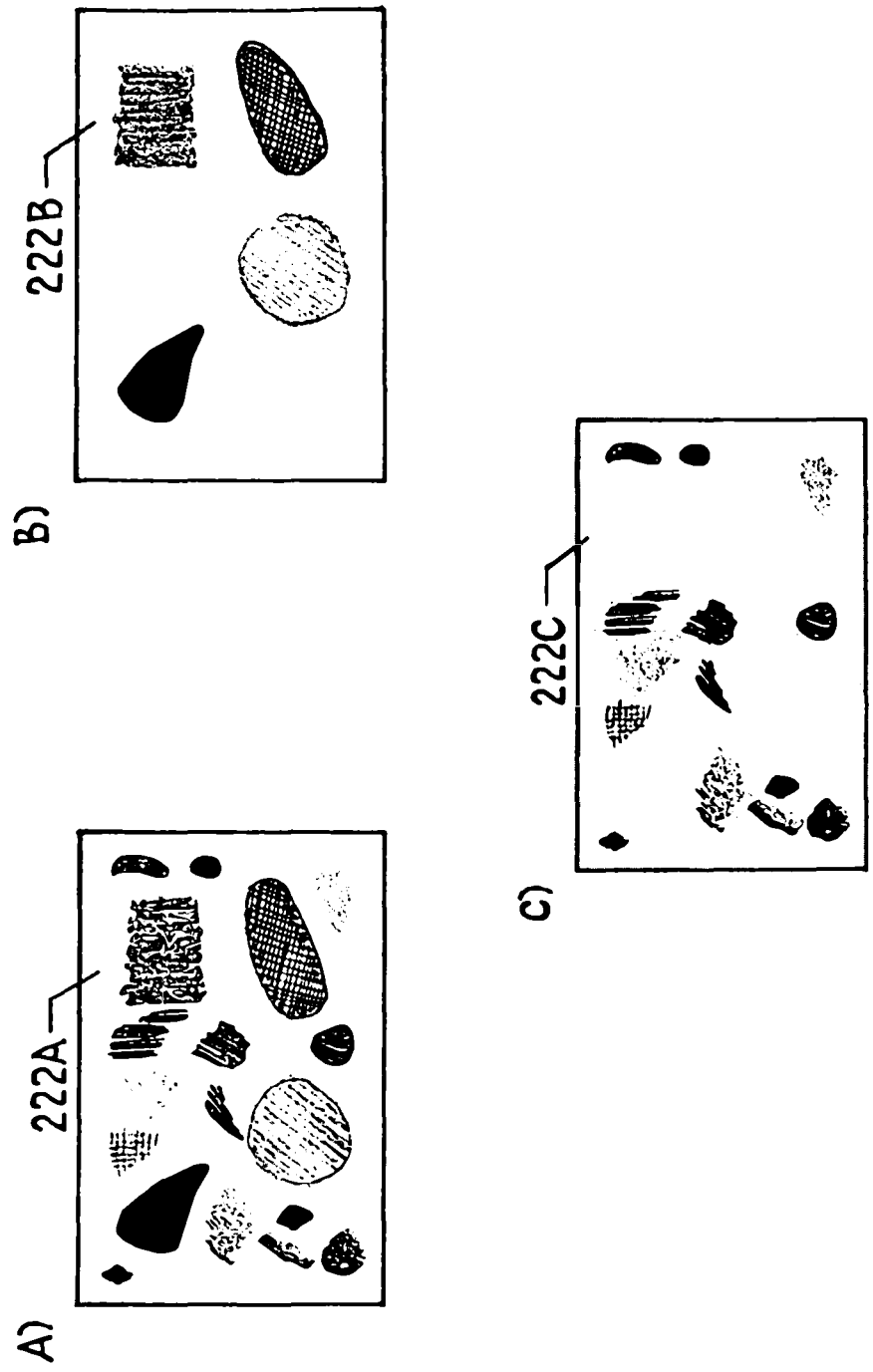

FIG. 4D shows how a given color reference list can contain color swatches of different sizes, or subsets of specific like sizes.

Figure 4E:
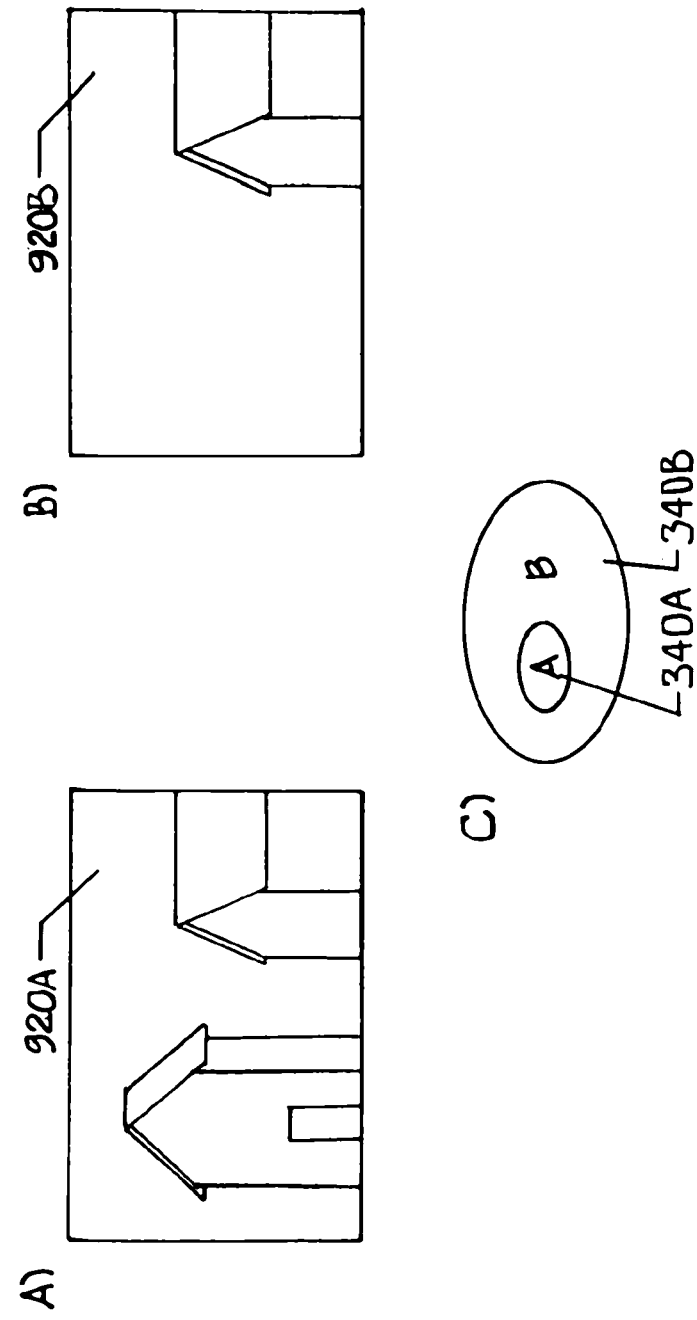

FIG. 4E shows an image with progressively visible elements.

Figure 4F:
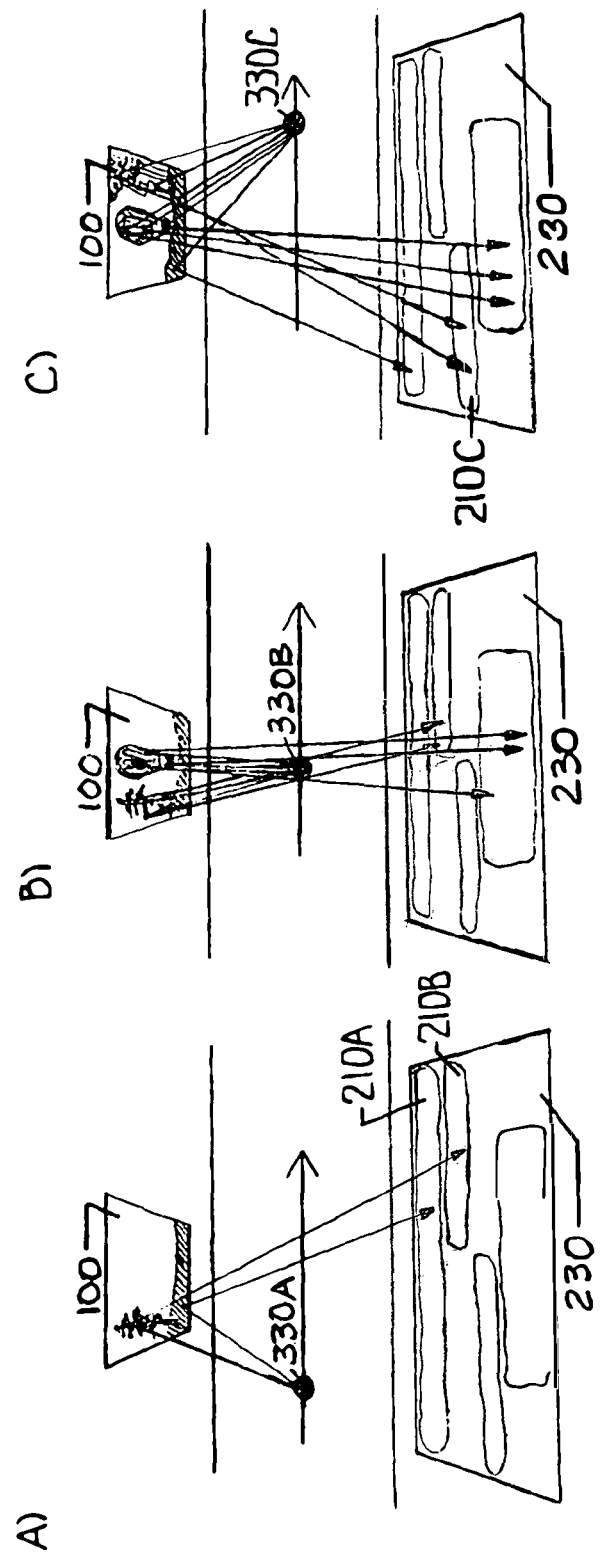

FIG. 4F shows a detailed analysis of an image with multiple overlapped progressively displayed image elements.

Figure 4G:
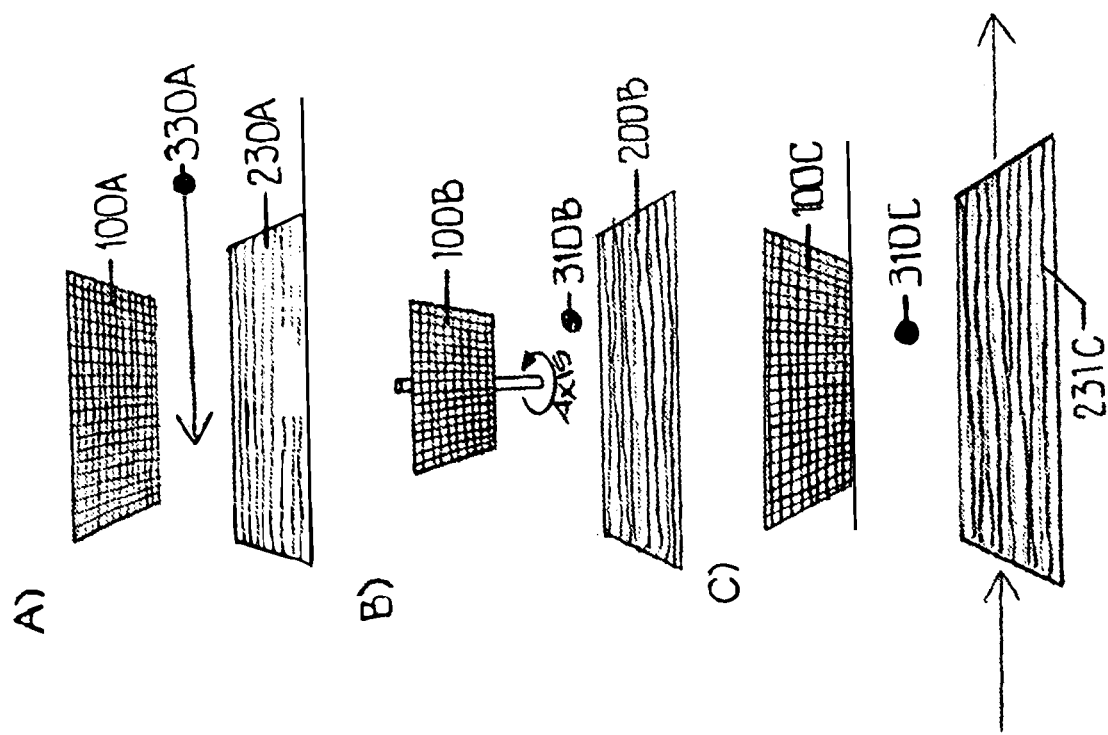

FIG. 4G shows three examples of relative movement between array, viewer and color source.

Figure 5A:
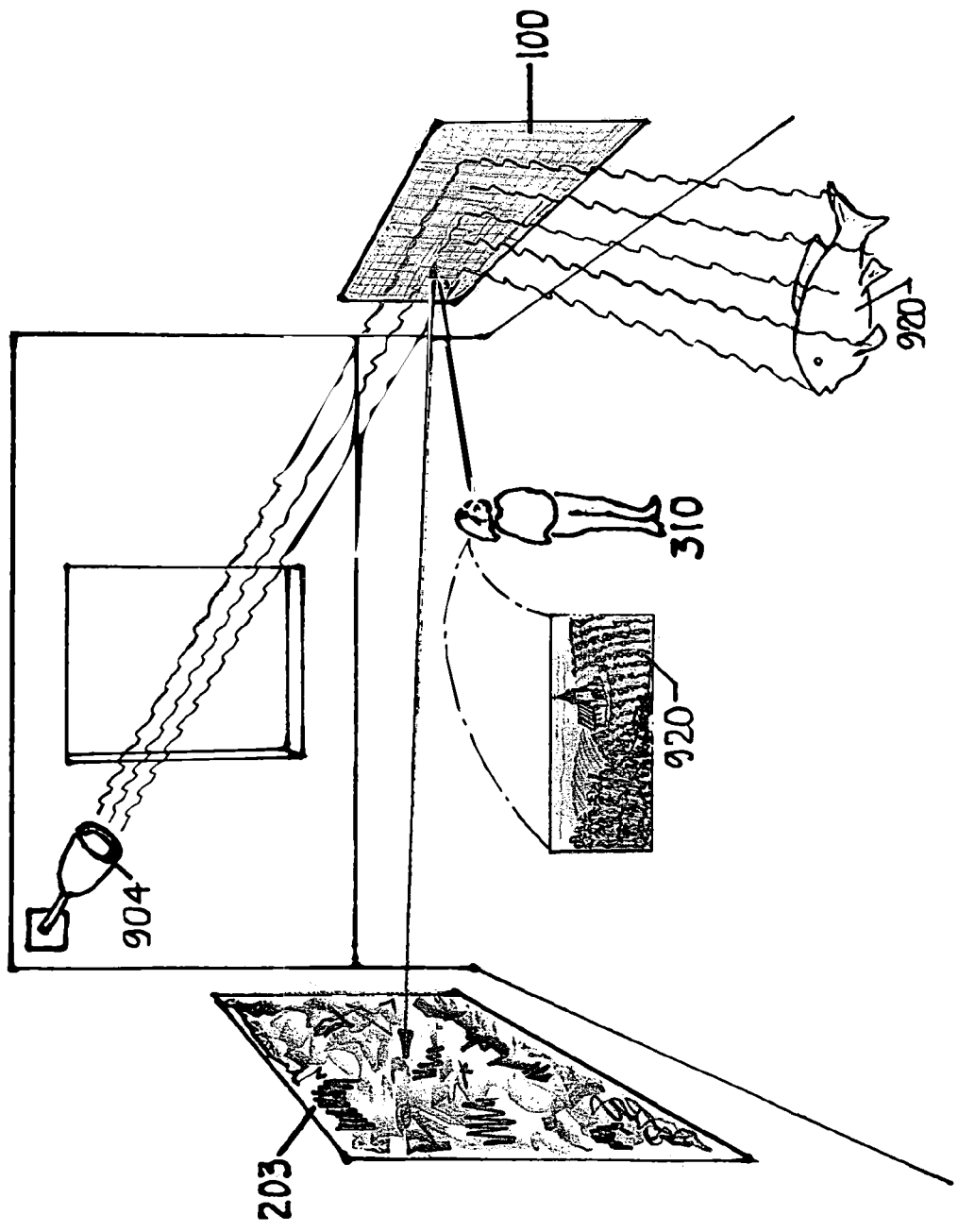

Complex Displays:

FIG. 5A shows a display reflecting a pictorial pattern of radiant light on the floor, while at the same time a full color image is presented to a viewer.

FIG. 5B is a detail view of a simple four-branch reference shape.

Figure 5C:
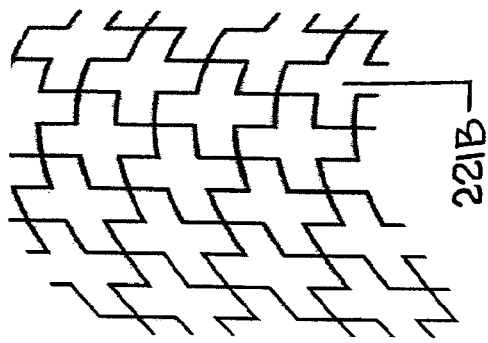
Figure 5C:
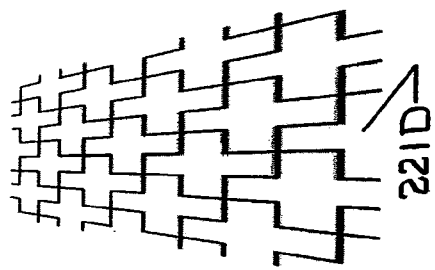
Figure 5C:
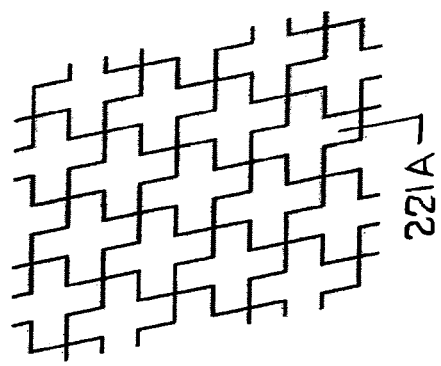
Figure 5C:
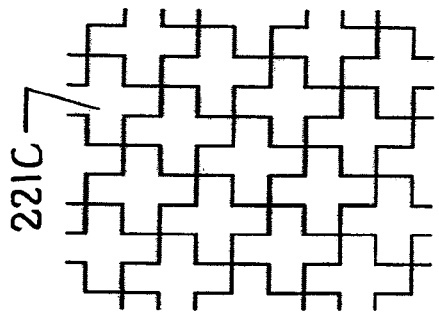

FIG. 5C shows how a 4-branch pixel/mirror color source encoding scheme can be tiled when printed.

Figure 6A:
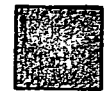
Figure 6A:
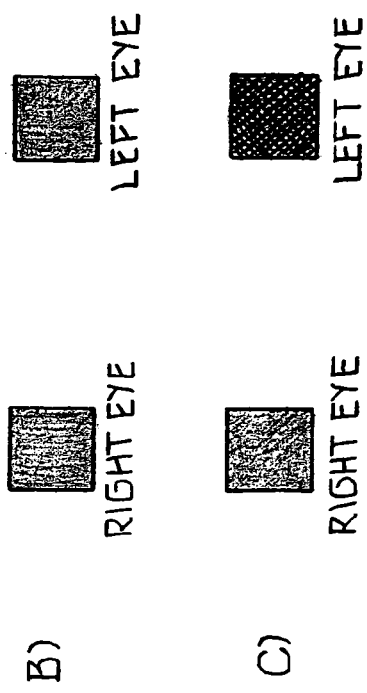

3D Applications:

FIG. 6A shows that when a color reflection source is small, it can only be seen by one eye at a time, and that therefore two are needed, and that those two color sources can be identical or different.

Figure 6B:
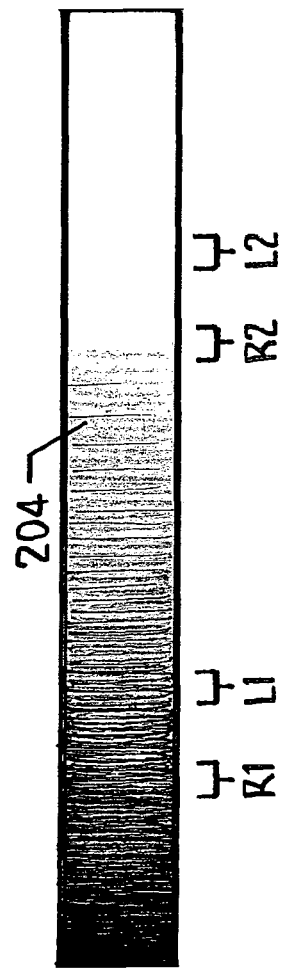

FIG. 6B shows how when a horizontal gradient color reflection source is used, each eye perceives a slightly different color.

Figure 7A:
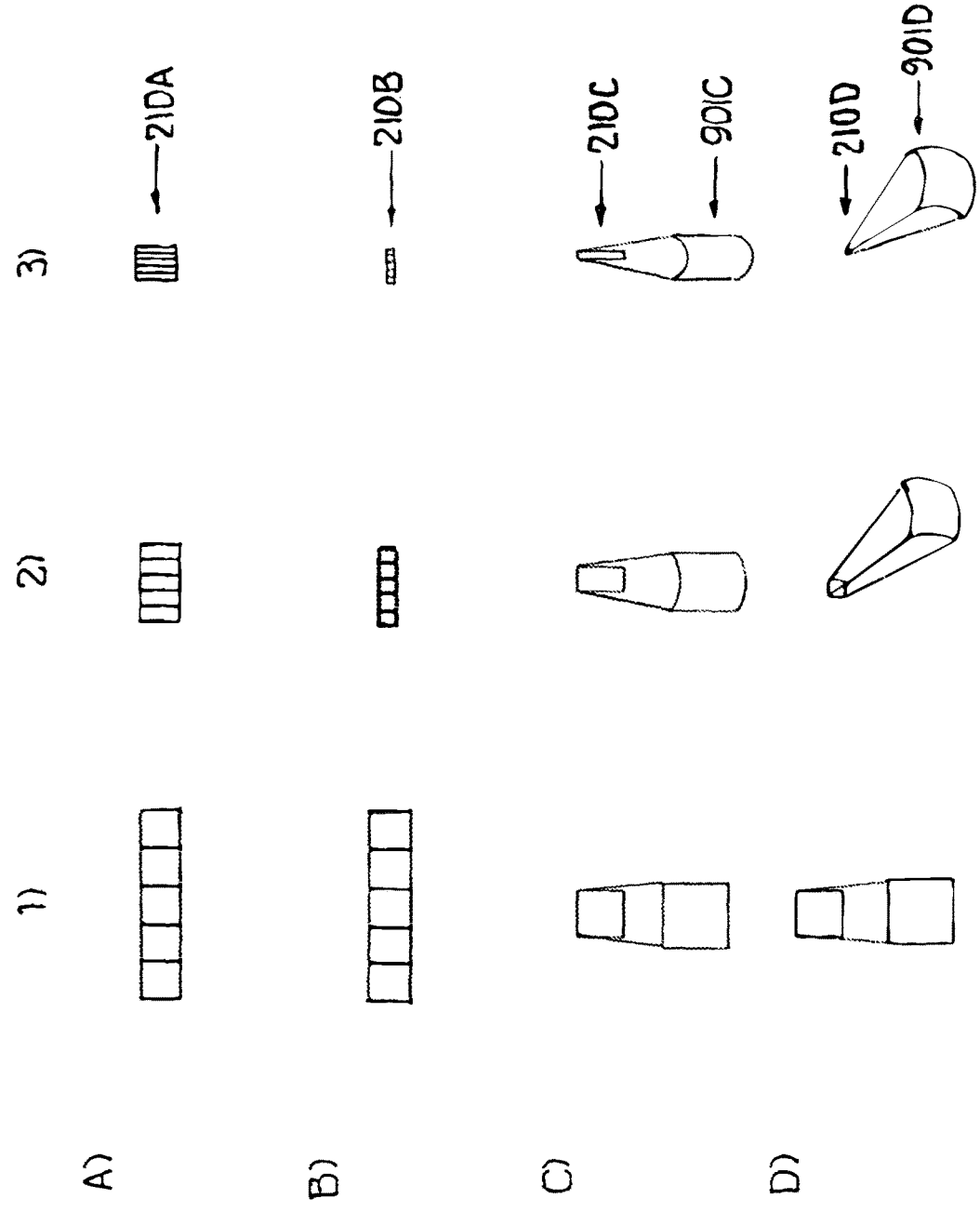

Focal Compression:

FIG. 7A illustrates concave, focusing mirror tiles and the correspondingly smaller reference graphics swatch sizes thus enabled.

Figure 7B:
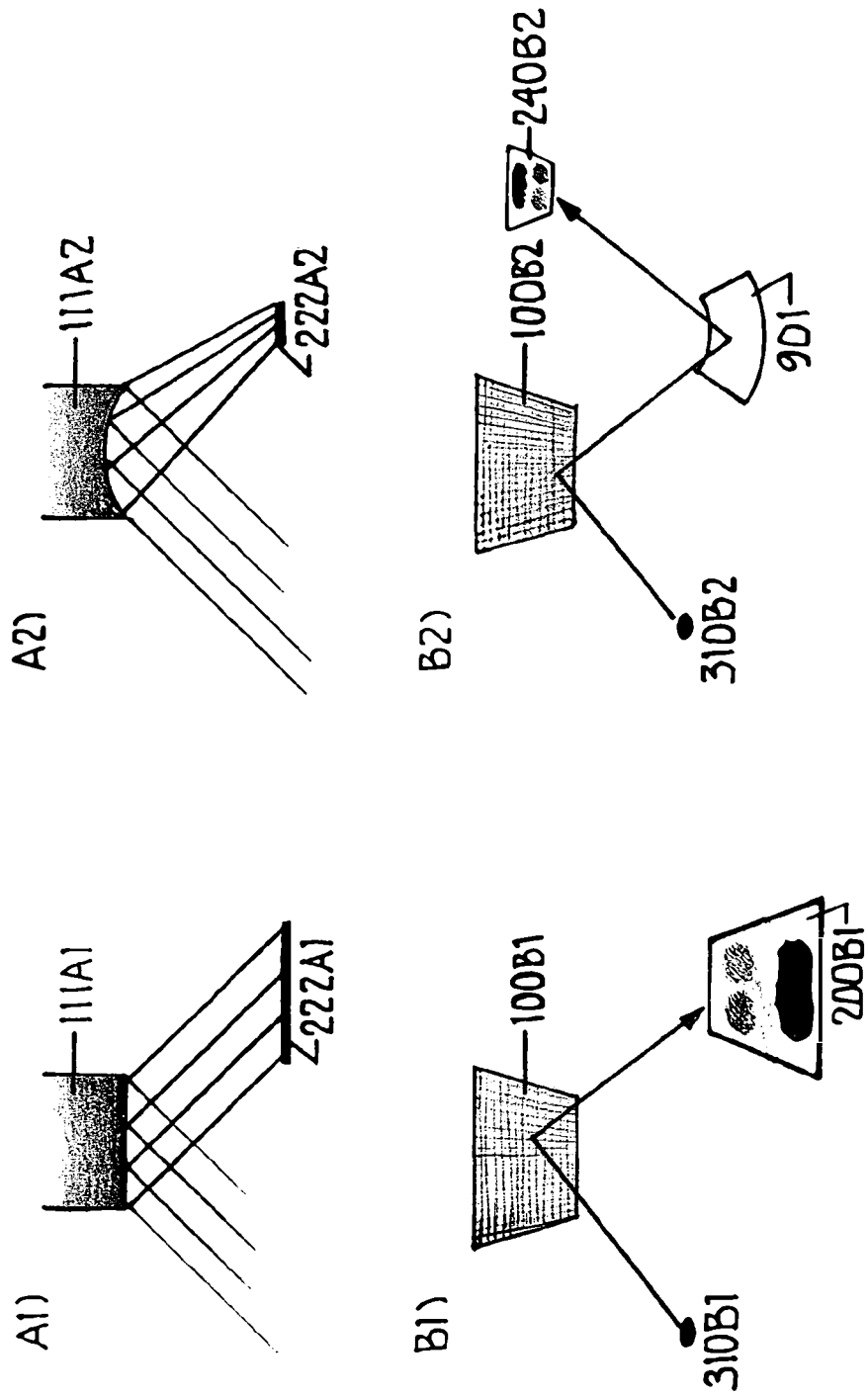

FIG. 7B shows in A1 and A2 a concave mirror tile surface compared to a flat mirror tile surface. B1 and B2 show an entire array focused wholesale, by a large concave mirror.

Figure 8A:
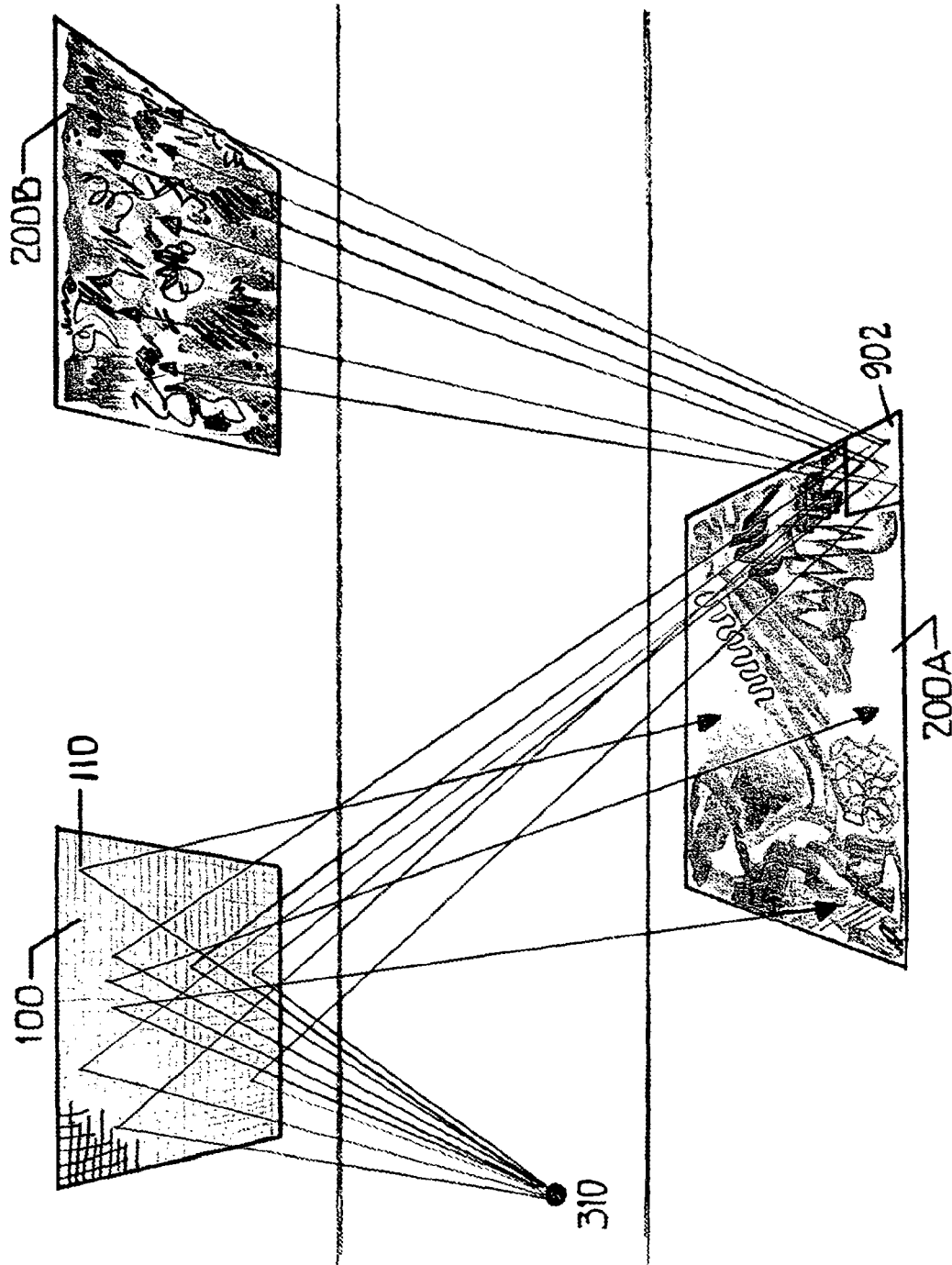

Re-reflection:

FIG. 8A shows how a secondary reflector can be incorporated into a color reference field to allow additional color reference graphics to be mounted in an area that would not otherwise be directly reflectable from the mirror array.

Figure 8B:
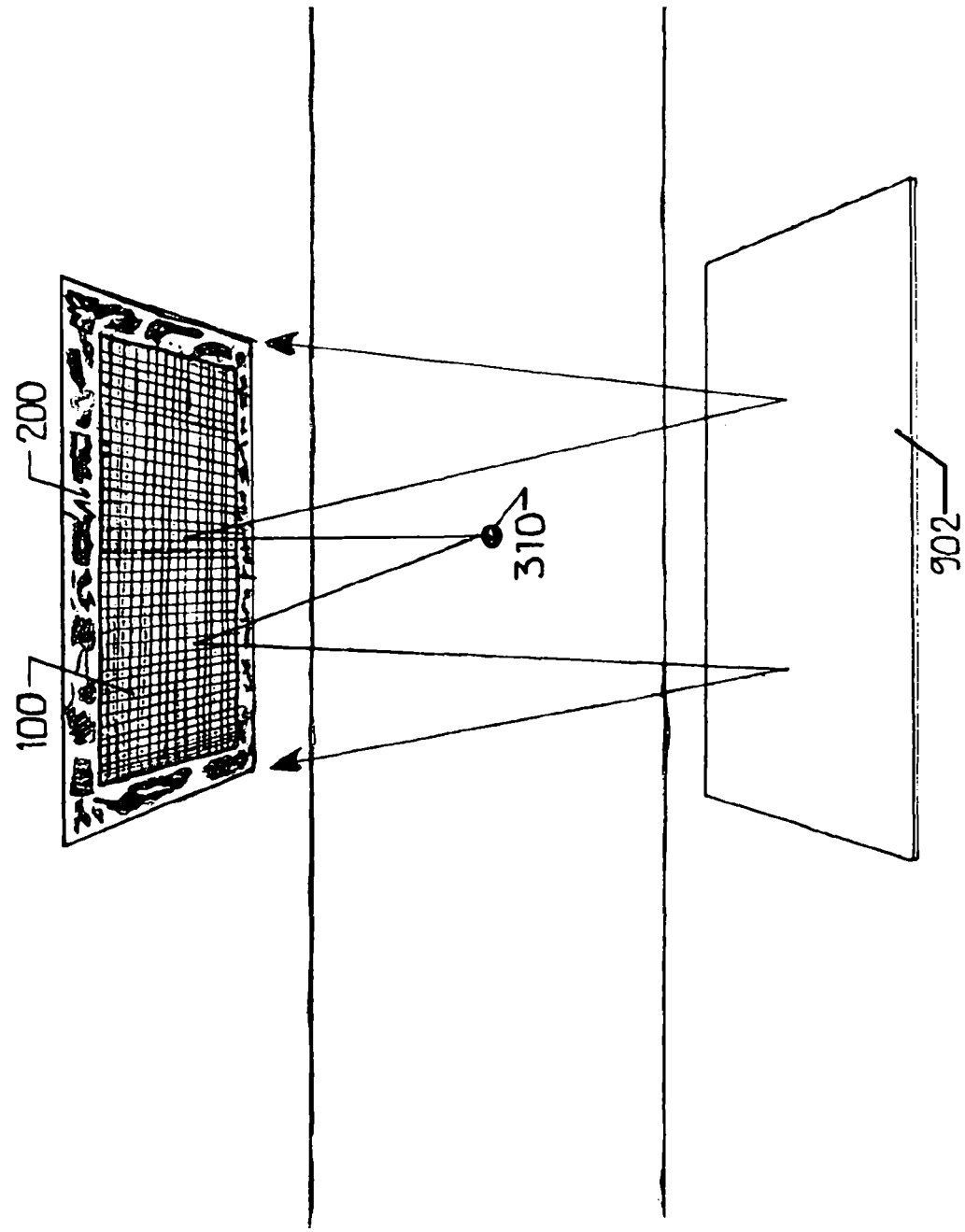

FIG. 8B shows how a mirror behind the viewer can re-reflect reflection vectors back toward a color reference source mounted near or integral with the mirror array.

Figure 9A:
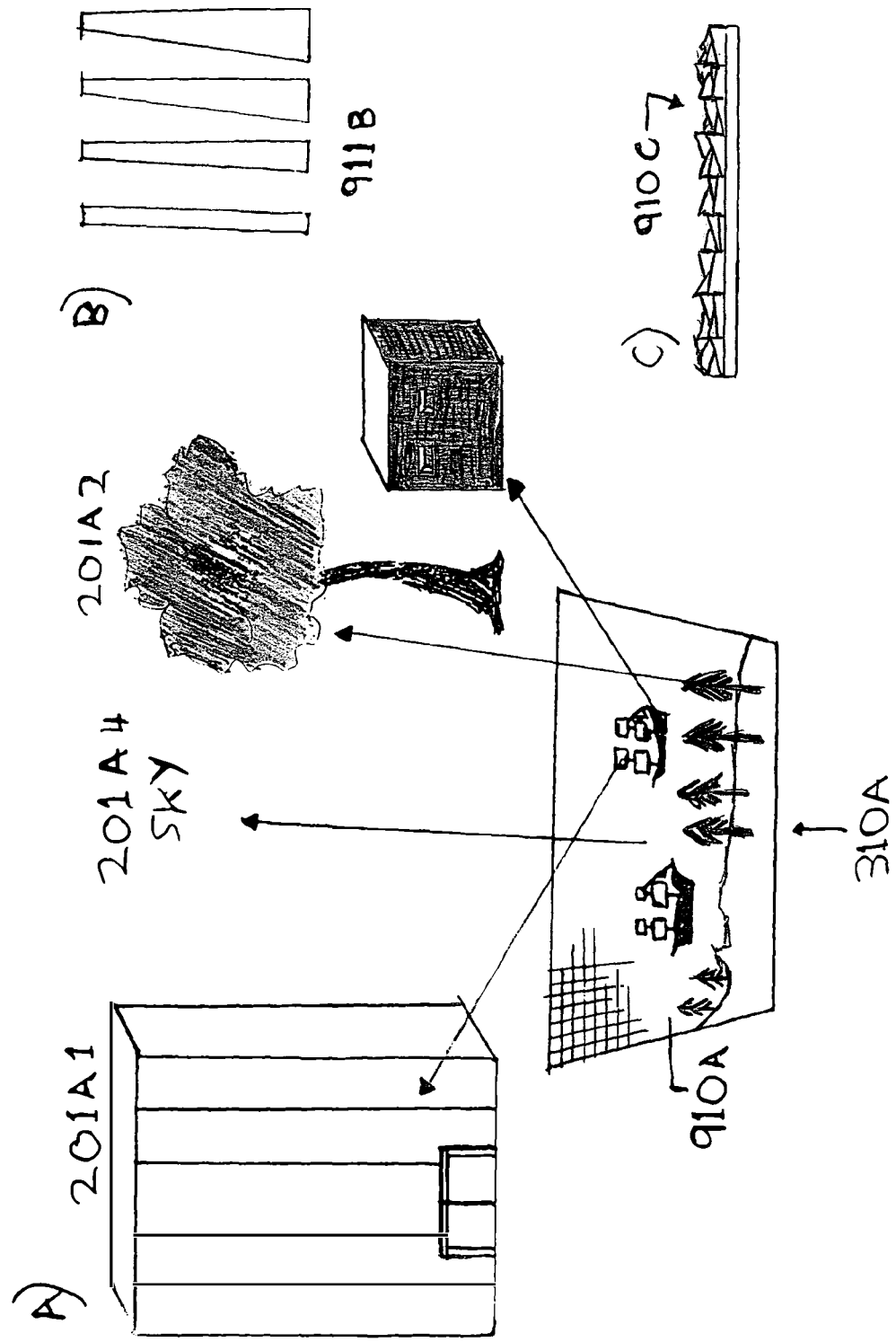

Miscellaneous:

FIG. 9A shows a simple example of refractive elements being used in place of reflective elements.

Figure 9B:
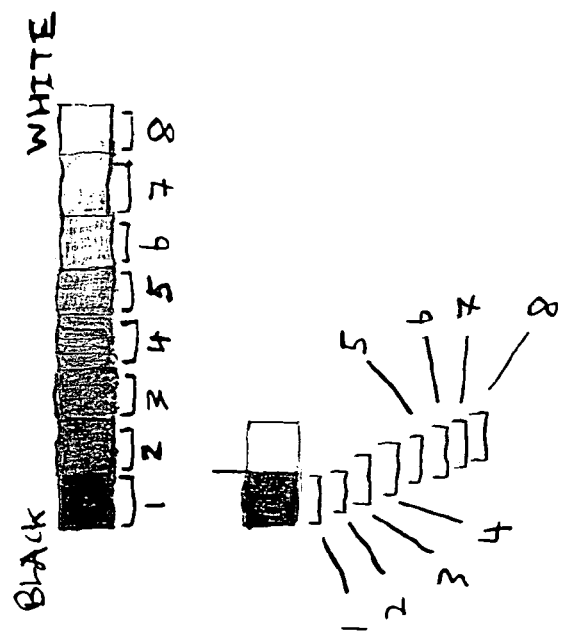
Figure 9B:
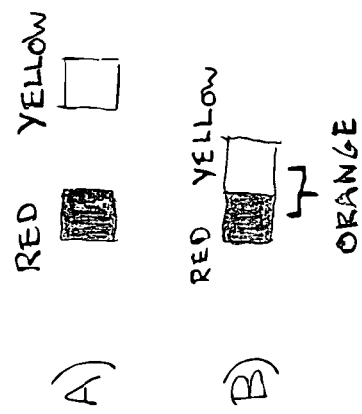

FIG. 9B shows how a mirror can target swatch borders to mix colors, giving a similar effect to reflecting sections of a color gradient.

Figure 9C:
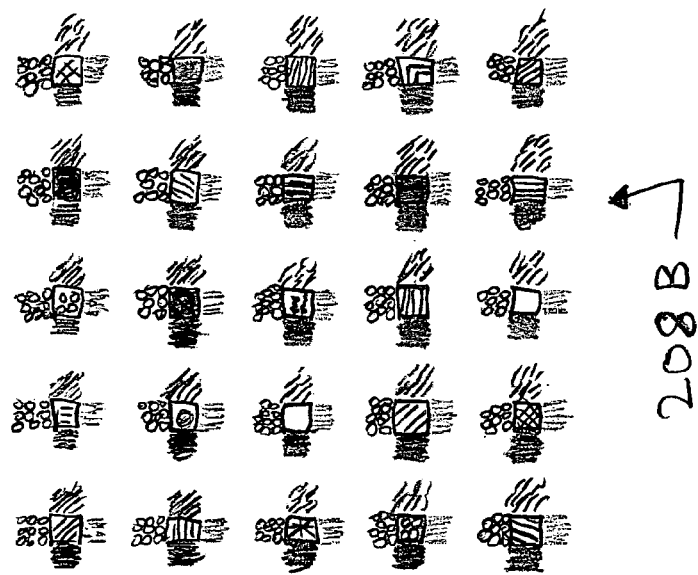
Figure 9C:
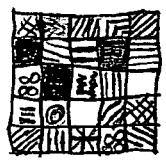

FIG. 9C shows individual mirror tile color references in a "+" pattern.

Figure 9D:
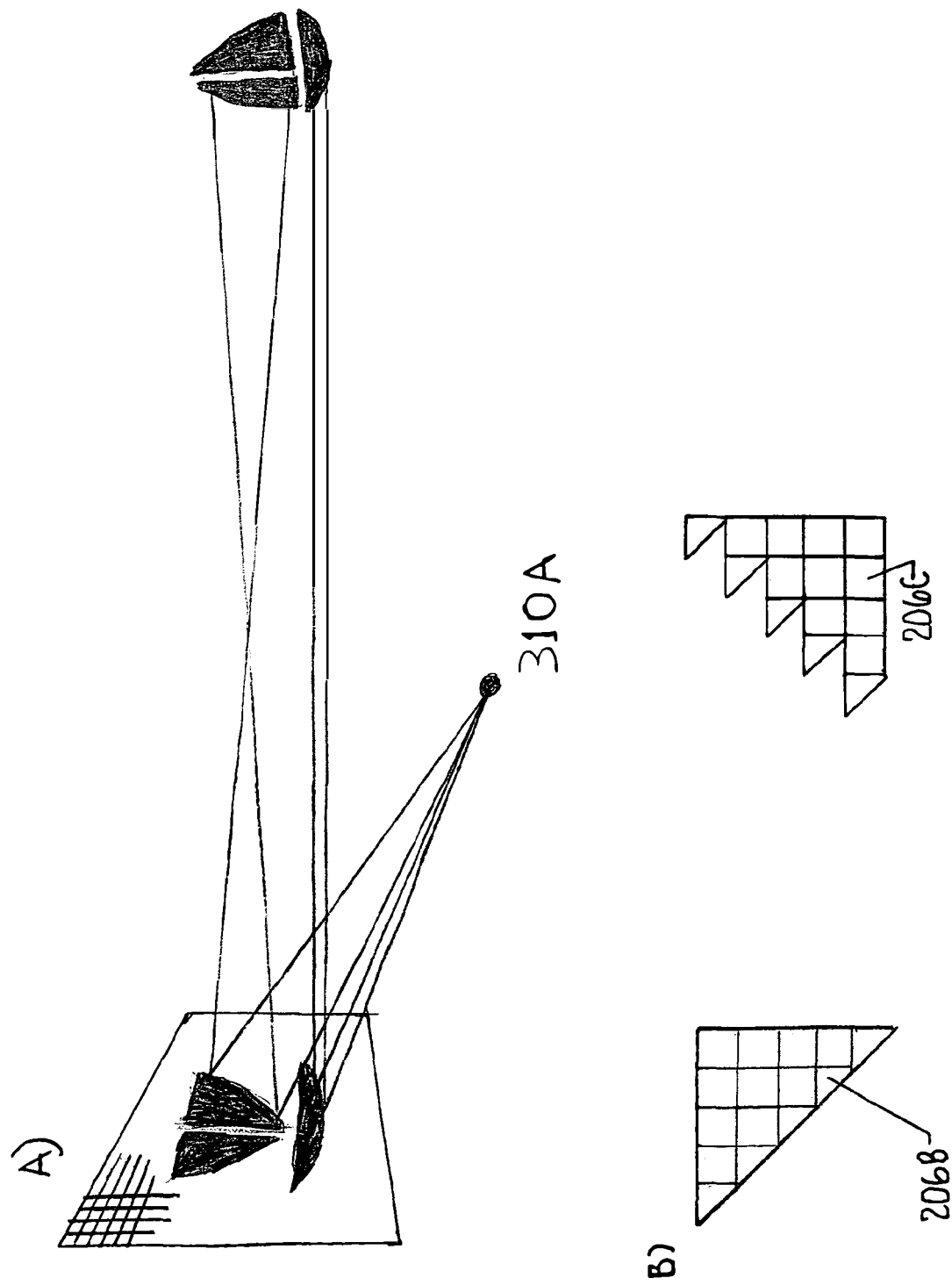

FIG. 9D shows an example of a mirror array set up to selectively invert a horizontal section of an image, using a line by line inversion technique.

Figure 10A:
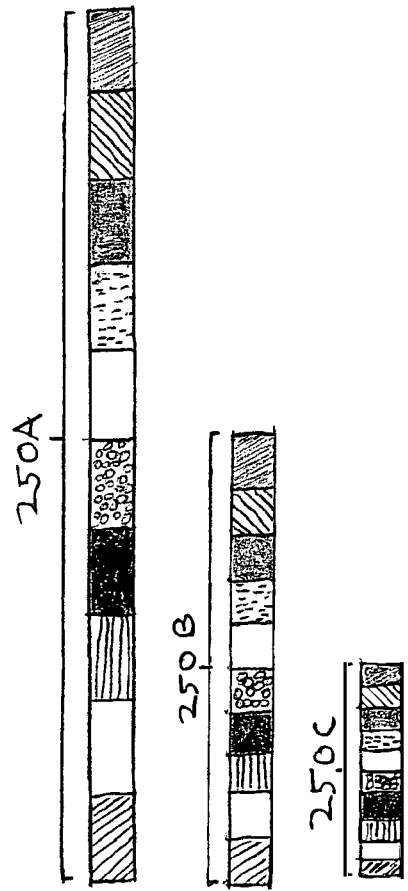

Animation Stripe Details:

FIG. 10A illustrates the same animation mirror tile reference color stripe progressively more compressed.

Figure 10B:
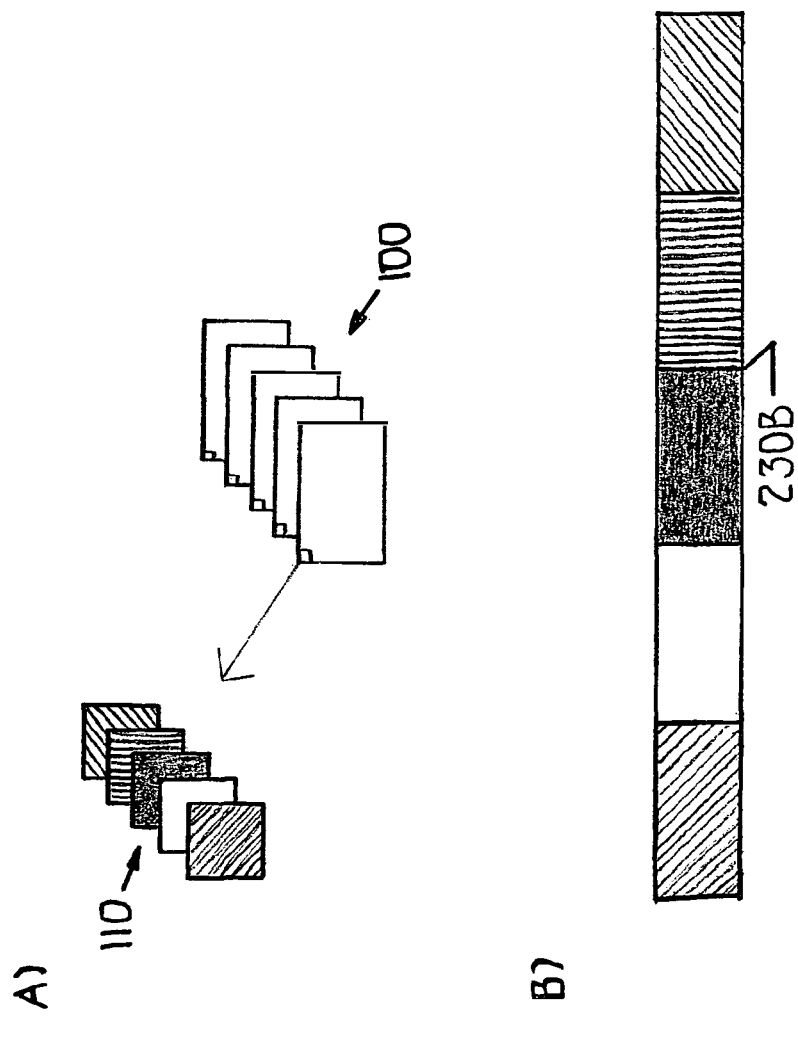

FIG. 10B illustrates how each segment of an animations pixel/mirror reflection swatch stripe corresponds to a single animation frame.

Figure 10C:
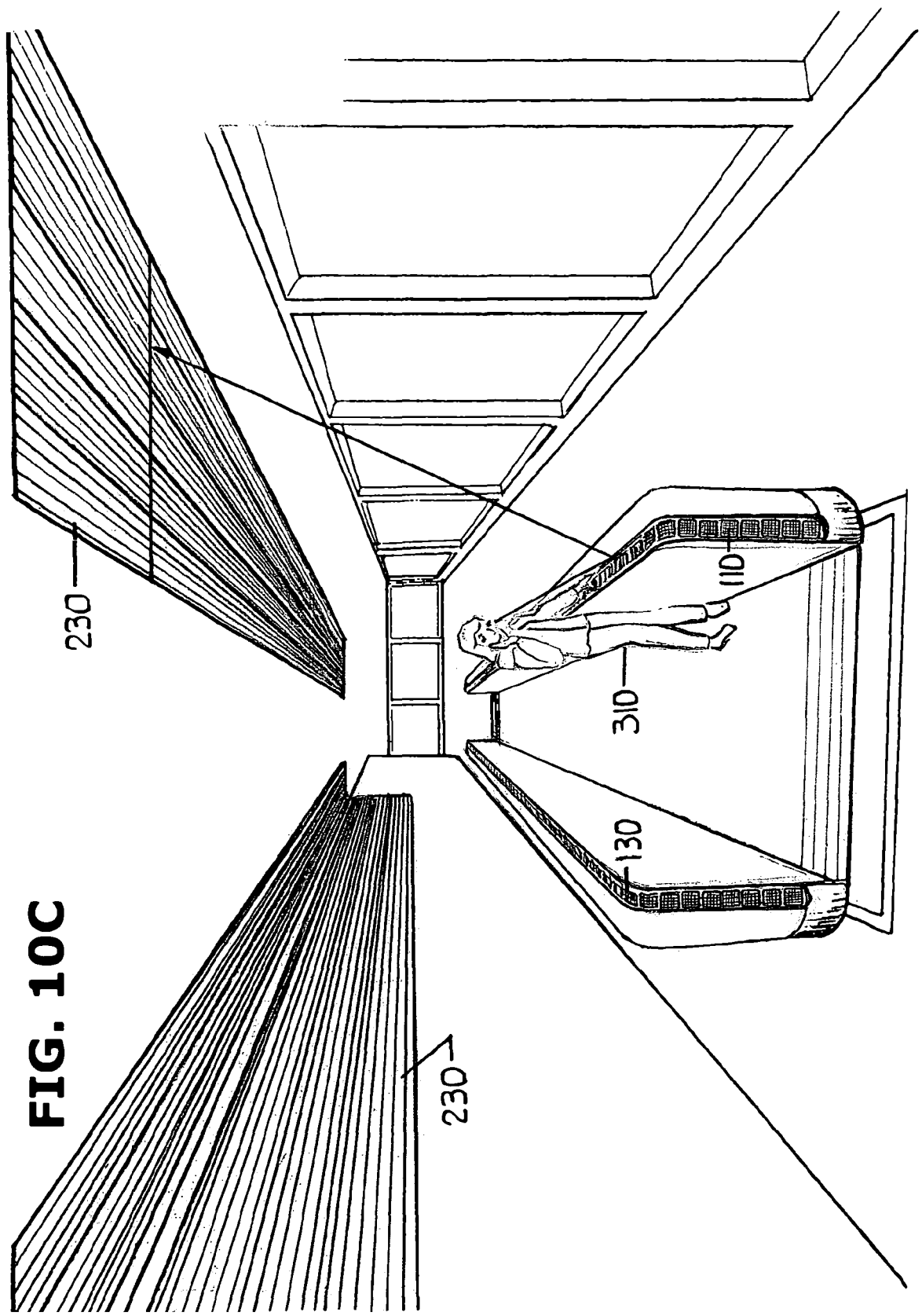

FIG. 10C shows an embodiment utilizing a mirror arrays embedded in a moving sidewalk handrail, and source graphics mounted on the ceiling and wall adjacent to the sidewalk.

Figure 10D:
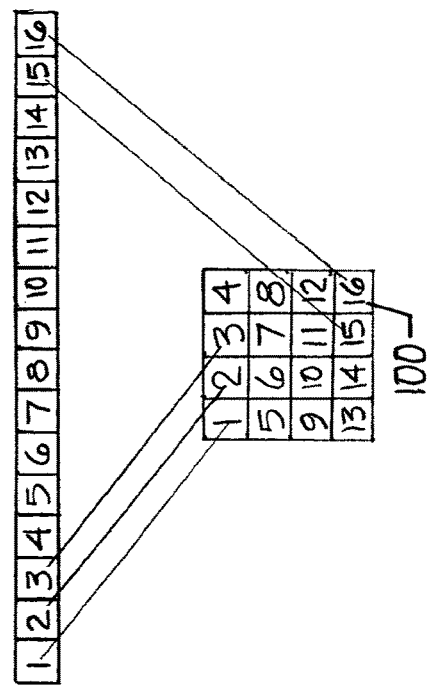
Figure 10D:
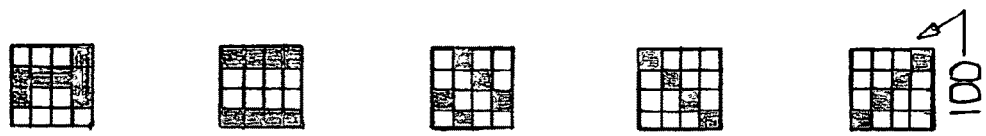
Figure 10D:
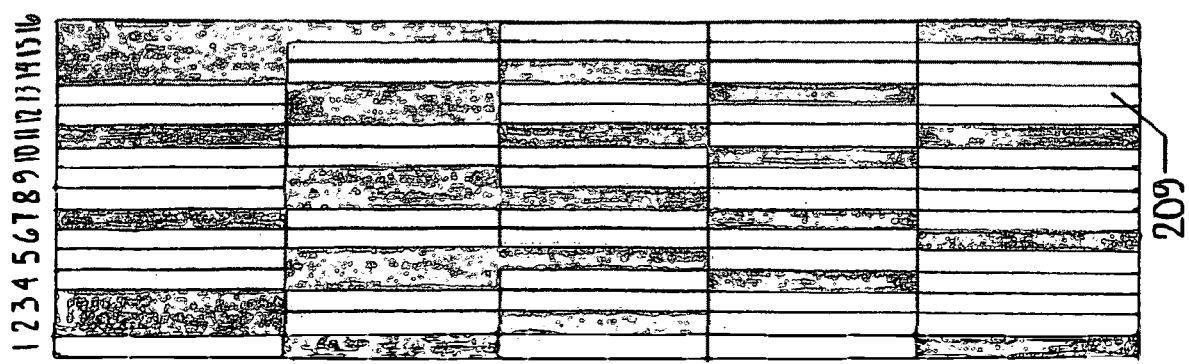

FIG. 10D illustrates a simplified case of a static mounted animated source graphic and a schematic of a corresponding 4×4 mirror array.

Figure 10E:
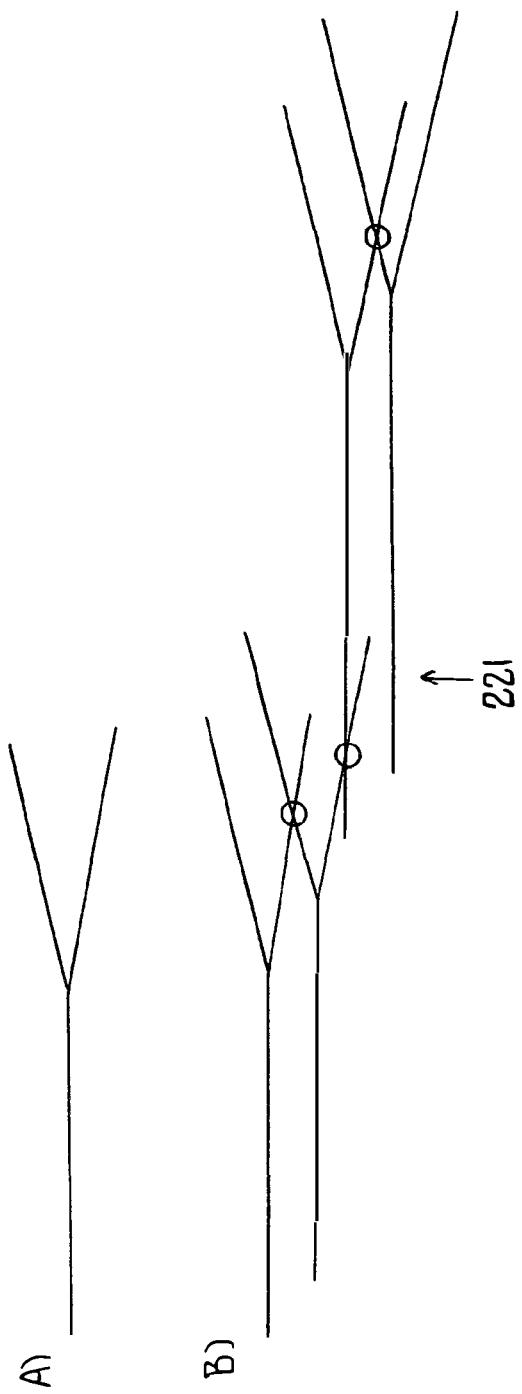

FIG. 10E shows in schematic that when a long animation branches, all the individual reference stripes branch, and can be overlapped according to certain methods.

Figure 11A:
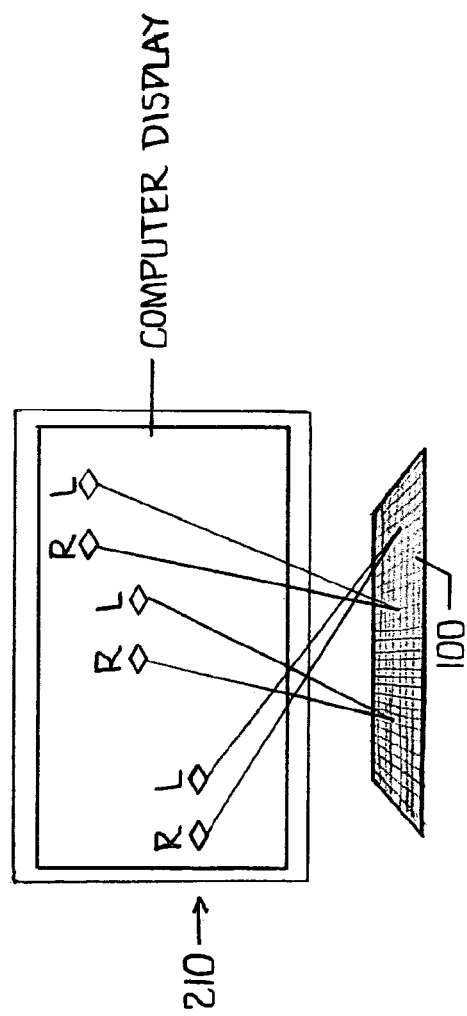

Computer-based Graphics:

FIG. 11A shows a live computer display used as a reflection reference graphic for a 3D images display.

Figure 11B:
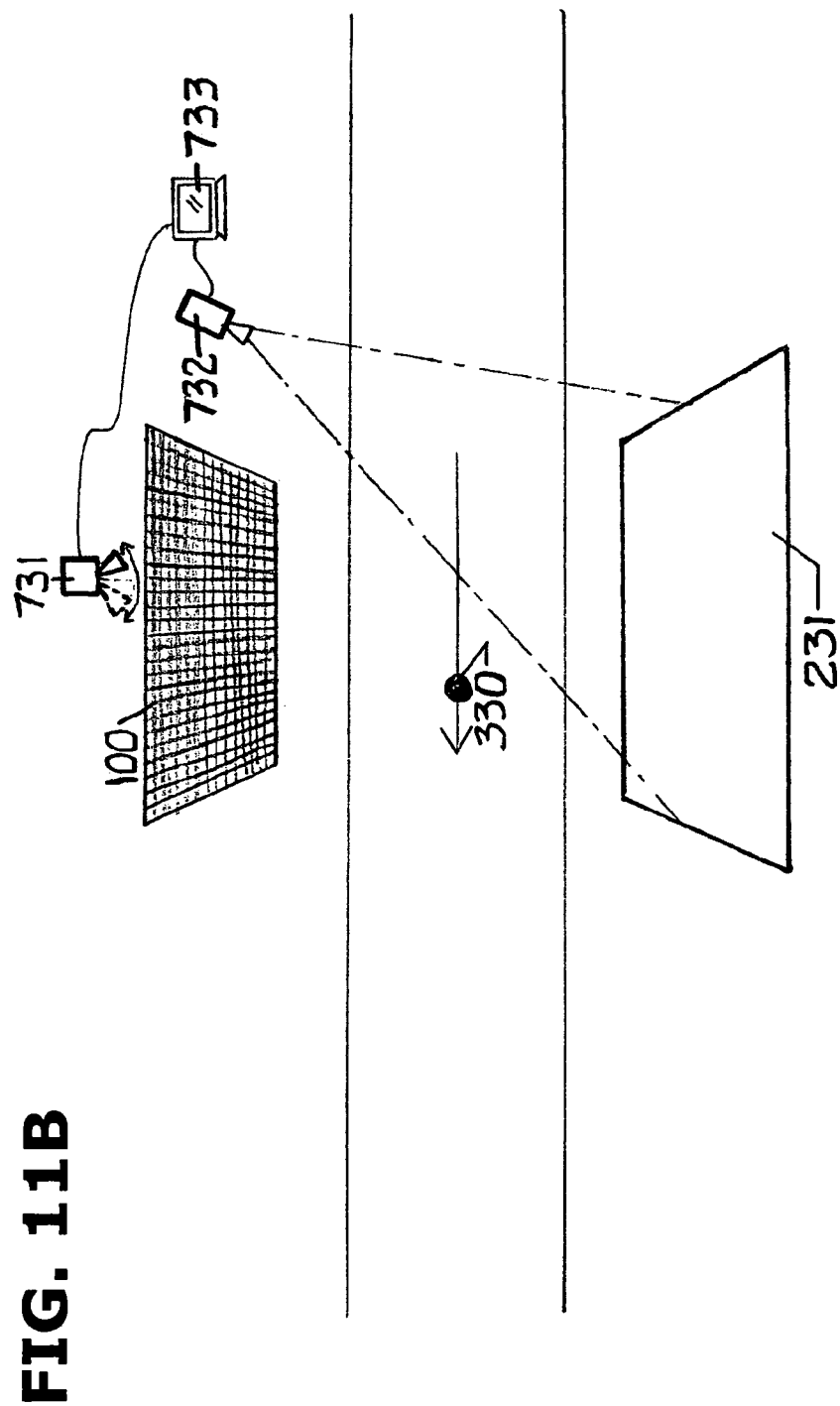

FIG. 11B shows a viewer tracking system in which a video camera allows a computer to track a viewer's position and responsively adjust a video projection of source graphics.

Figure 12A:
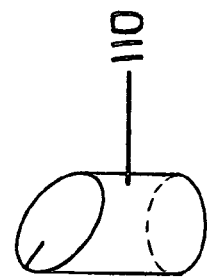
Figure 12A:
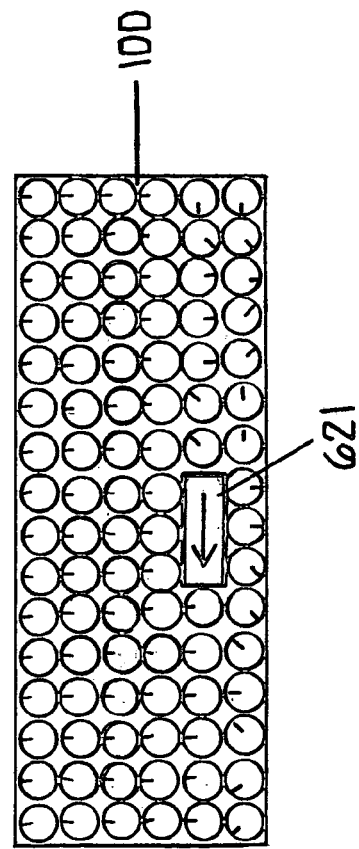

Structures and Manufacturing:

FIG. 12A illustrates a simple machine that crawls along a mirror array to adjust the angle setting of the individual mirrors, thus progressively changing the overall display image.

Figure 12B:
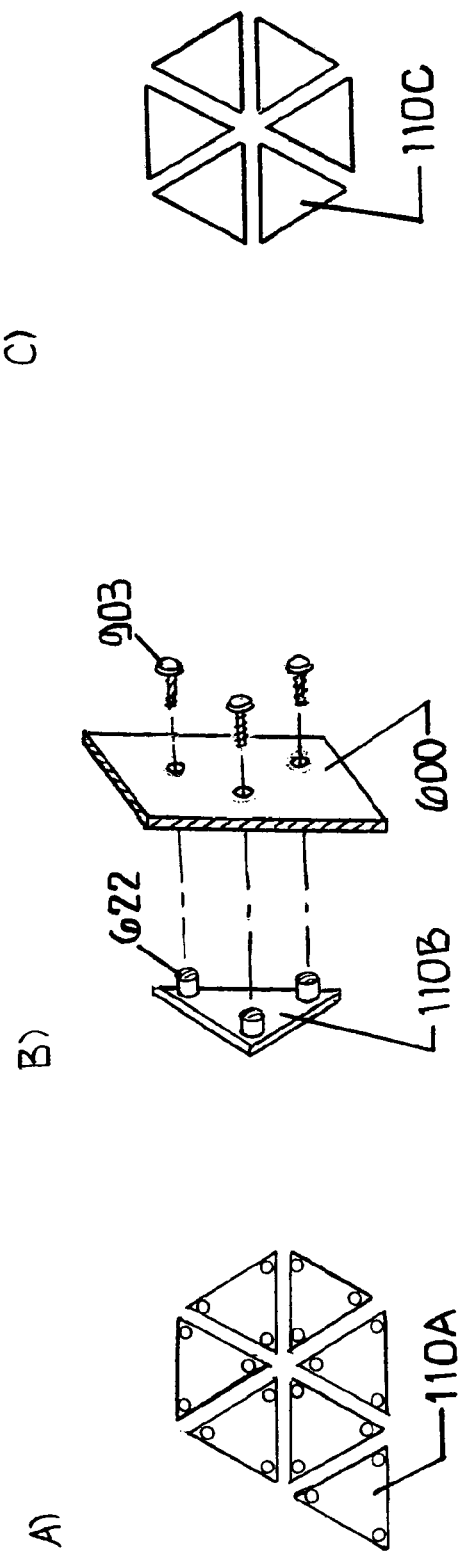

FIG. 12B shows a method of constructing a static array of triangular mirror tiles whose angle settings are screw-adjustable.

Figure 12C:
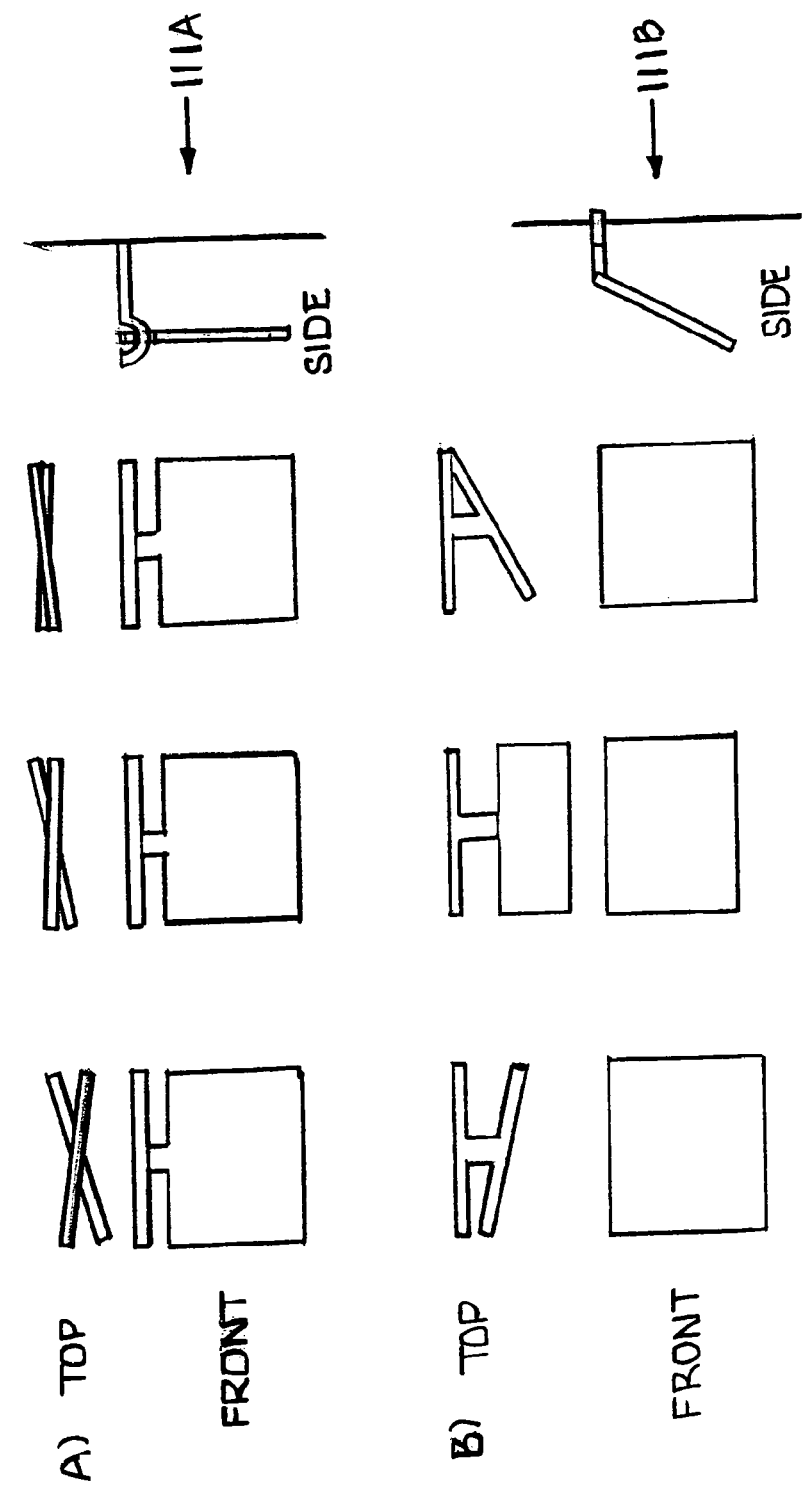

FIG. 12C shows two alternate methods of constructing an array from metal mirror tabs, whose angles are set by bending their necks.

Figure 12D:
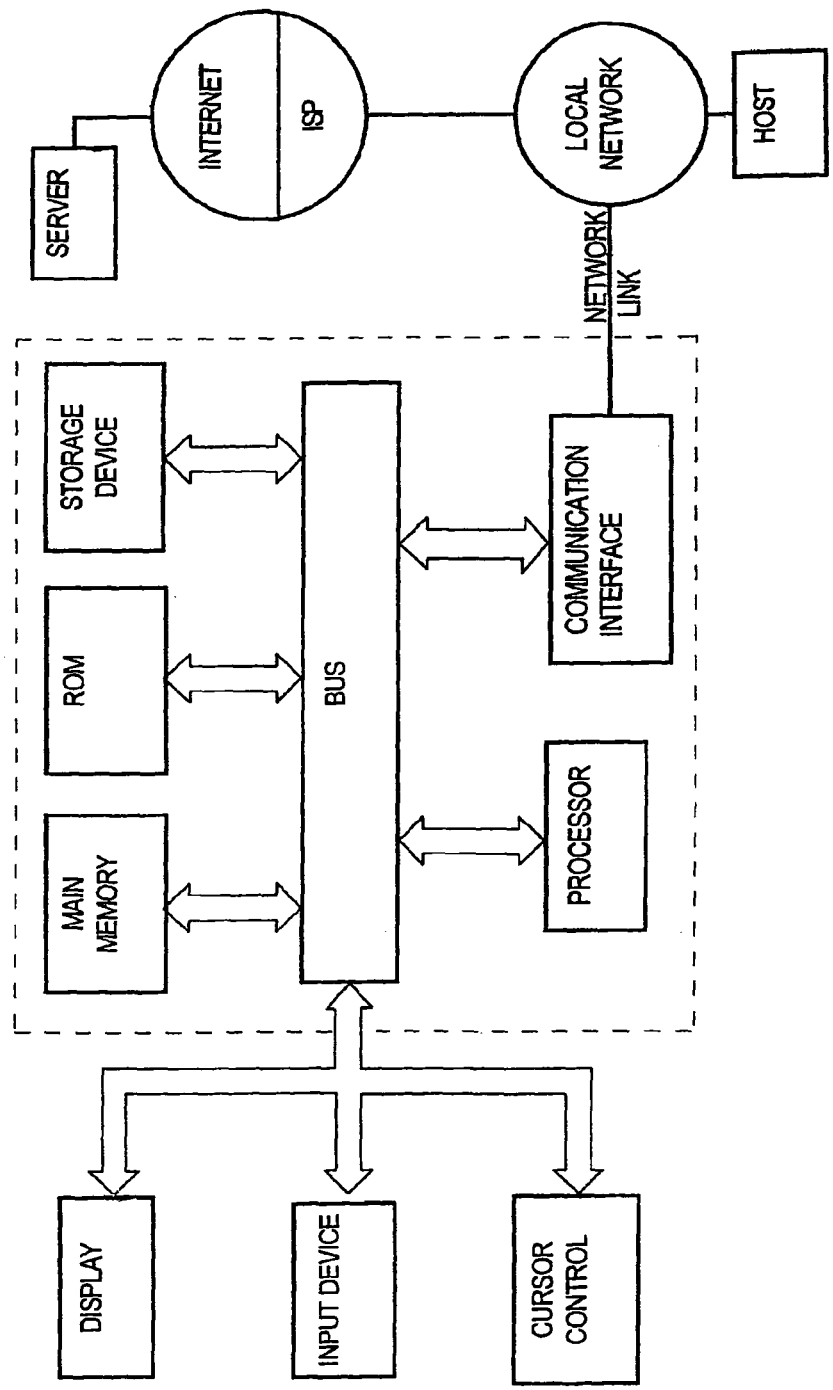

FIG. 12D is a schematic of a typical "computer", as referred to in this document.

DETAILED DESCRIPTION and OPERATION

FIG. 1A: A Small Two-Color Reflectively Constructed Image

Referring now to the drawings, in FIG. 1A is shown a reflective array 100 in which each reflective element 110A and 110B reflects toward a viewing position 300 a reflection source color 210A or 210B. Each reflective element 110A or 110B can, by the art of the setting of its reflection angle, present to the viewer 300 either one of the two available reflectable colors 210A and 210B and thus the shown reflective array 100 can present images constructed of two colors, in this case the letter "T". Additional reflectable colors can optionally be incorporated into more complex displays, allowing for images of greater color fidelity. Likewise, larger reflection arrays with more reflection elements can present more detailed, higher-resolution images.

FIG. 1B: A Four-Color Reflectively Constructed Image

In FIG. 1B is shown a more detailed reflective array 100, with a much larger plurality of reflective elements 110 than in FIG. 1A, each one of which reflects one of four available reflectable reference colors 200. In the circular enlarged section is shown details of seven of the mirror tile array's mirror tiles, also called reflective elements 110, the first two reflecting green, the next one reflecting blue, and so on, as apparent to a viewer in the position as shown. The angle setting mechanism 620 allows any reflective element to show any of the four available colors, as a function of the adjustable angle setting.

When the source colors are primaries or mixable colors, in general, adjacent mirrors can be treated as sub-pixels in a larger picture color element, analogously to how a pixel in a common computer display consist of pixels with red, green and blue sub-components, where those components are mixed a varying respective brightnesses to produce a full gamut of colors. In this depicted mirror array display a bold color graphic of solid blues, reds, blacks, etc. could, it may be easy to see, be constructed, by angling large sections of mirrors towards those respective source colors. Alternatively, by grouping these mirrors to mix colors in mirror groupings, a wide gamut can be represented, though lighter shades would not be possible, due to the lack of a white reflection source. Mirror tile-based sub-pixel color mixing can be free-form and arbitrarily complex, as distinct from the rigid RGB, 3-component color grid of a typical computer display. If the mirrors were small enough in a display such as depicted, the color mixing could be very subtle and support very high color fidelity.

FIG. 1C: Image Translation.

In FIG. 1C is shown a realistic existing image 202, which by virtue of the small and large patches of flat color therein is used as a color reflection source, in place of simple color swatches, as in FIG. 1B, behind the viewer 310. The mirror angles in the reflective array 100 are angled to translate or reflectively rearrange the source image 202 colors into a completely different image, 920, as apparent to the viewer 310. The "translated" presentation image is palette-limited to those colors present in the source image 202. In addition, the source color patches must, typically, be of sufficient size so as to reflectively fill a full mirror reflective element 110 with solid color, from the viewing perspective 310.

FIG. 1D: Dual Image Translation

In FIG. 1D is shown the same realistic source image color reference 202 as shown in FIG. 1C—a house—but this time being used as a color reflection 202 by two mirror reflective arrays, 100A and 100B, both of which direct their reflection grid-translated images to the same viewer 310, who sees two different apparent images 920A and 920B, an elephant and a car, reflectively translated from source image color reflection 202, a house. Any number of different reflective arrays can simultaneously translate a given image into multiple different other images.

FIG. 1E: One Array, Two Viewing Positions/Display Images

In FIG. 1E are shown two viewing positions 310A and 310B from which different display images 920A and 920B are visible in the same reflective array 100. Reflective array 100 was initially angle-set in order to translate a house image 202A into a car image 920A, as apparent to viewer 310A. The mirror angle settings to translate a house into a car are, for other purposes, effectively a random selection of angles. The only way that the new display image 920B can be made apparent in reflection in a pre-set reflective array 100 such as this is for that new image's color reference 203B to be a print out of a backwards projection through the existing array of the desired display image 920B, an image of an ocean shore. That backwards projection when viewed in the array from the backwards projection starting position, 310B, appears as the ocean shore image, 920B.

In order for an existing mirror array angle setting to be used to display a second image from a new perspective and new source color graphic, each mirror tile in that array must be configured so as to reflect a different position in the original source image, or be set at a vector that will result in a different reflection position, on the second image. In one image more than one mirror may refer to the same reflection color, a correspondence not shared in the second image. Therefore, when two mirrors need to reflect the same color, they need to reflect it from a different area of the first image, or at a vector that, by crossing the vector of the first reference to that same source, will result in a different reflection source in the second image, from the second viewing perspective. Two mirrors that don't in fact reflect the same point in the first image may, due to the changed geometry of a second viewing position and source image, reflect the same point. If they did, an incorrect color reference would be imposed on the pixel/mirror of the second image. If there were many such unintended individual mirror tile color source overlaps, forcing one or the other tile to reference an incorrect color, a kind of interference pattern or multiple reference conflict noise will result, degrading the 2nd (and 3rd and 4th, etc.) images decoded from an existing angle array. To avoid such conflicts the exact angle pattern set for the first image would ideally be set at the same time as the additional parallel image presentations.

Even images which reflect the same point in a reflection source color graphic multiple times can be reused to present other images, since even 1,000 vectors that converge at a certain distance from the color source graphic, can be configured not converge at a slightly different distance. Management of color reflection vector overlap and coincidence from one display image to the next, is ideally, if not necessarily, handled by software.

FIG. 1F: Different Perspectives, Different Images

In FIG. 1F we see again that a single mirror array, 100, can display different images to viewers at different viewing positions. Viewer 310A, when looking at mirror array 100, sees thousands of individual tiny mirror tile color reflections drawn from source color map 203A, which together form the image of a mouse on a tree 920A. Viewer 310B, when looking at mirror tile array 100 sees, in reflection, source graphic 203B decoded into image 920B, an elephant. Viewer 320C sees nothing in the reflective array 100, except white, since from her perspective only a white ceiling and white wall behind her is reflected in the array. In this gallery, there are two viewing positions, for this array, as indicated by two viewing position indicator arcs on the floor, labeled 350A and 350B.

When the viewing position of a given display is very narrow, as might be the case in this depicted scenario, a more accurate view positioning cue may be necessary. A pair of armatures that extended from the wall and identified a specific point in space, from which to see the display, might be helpful or necessary. Other types of positioning cues could be small direction-indicating mirror displays, with arrow and other graphics as their sole content, said arrows displaying in one direction or another or one intensity or another to cue viewer movement into and towards proper viewing position for an associated larger display.

In some mirror array situations a positioning indicator is necessary, in some cases optional and in some cases unnecessary. When the viewing position is small, it is more likely that the location of the position need be indicated. In some instance the display may be designed so that the proper viewing position is best discovered fortuitously. In some cases the viewing position may be directed toward a entry doorway, or other traffic area, and designed to fill it, so that the image cannot be missed. In other cases the viewing position may be constrained and customized to restaurant seating, booth by booth, to the driver of a passing car, so that the display image is made apparent and obvious where needed, and invisible otherwise.

When it is necessary or desirable to indicate the viewing position for an image, there are many image-extrinsic ways to do it: arrows, armatures, floor markings, signs, lights, etc. There are also various ways to indicate viewing position and movement options and movement intrinsic to the display. Though discussed elsewhere in this document, these intrinsic view positioning indicators include differential shading of the content of the image, by offsetting the mirror angling in certain portions of the display, so that the edges, for example, of a display begin to fade first—lose color targeting—to cue the viewer to make a position correction. Another technique is include arrows in the display, that only appear as a viewer or his eye position begins to drift outside of ideal viewing position.

FIG. 1G: An Image Physically Rearranged . . .

An image can be physically rearranged into another images, by converting it into color tiles, from which to then construct a new image. This method can be emulated by mirror tiles, reflectively, as illustrated in the following comparison:

A) The process begins with a photograph of a colorful city scene, containing a rough approximation of all colors and shades, though many only in small patches.

B) Several copies of this photograph are cut into small squares.

C) The pure color pieces of the diced photograph are sorted into a palette of thousands of different colors and shades, in preparation for use as mosaic tiles.

D) The reverse side of each tile (shown magnified) identifies the position in the photograph from which it was cut.

E) These mosaic tiles are used to construct an image of a fish, which is then hung on a wall opposite the original photograph "A".

An Image Reflectively Rearranged . . .

F) All fish image colored mosaic tiles (cut from the city scene photo) are overlain with mirror tiles. Each mirror tile therefore inherits the photo location notation that is printed on the reverse of each color tile from the photograph. Since this mosaic mirror hangs opposite the city scene photograph, from a certain perspective that photograph can be seen roughly reflected in the mirror tiles.

G) One by one (and very laboriously, by hand) each mirror tile 110 within reflective array 100 is angled so that it reflects, toward a given viewing position, the exact coordinates from which the associated colored tile was cut in the original photograph hanging opposite. The original fish image 920 thus again appears, though this time as a reflection, and only apparent from a given viewing perspective.

FIG. 1H: In 2 Mirror Arrays 3 Viewers See 6 Different Images

Viewer 310A sees image-based color reference 202A reflected in both reflective arrays, 100.1 and 100.2. To this viewing position, 310A, reflective arrays 100.1 and 100.2 display a fish image and a desert scene, respectively.

Due to the given geometry, the two overall image tile array reflection source areas don't converge for viewer 310B, as they do with respect to viewer 310A. Viewer 310B thus sees the two reverse-encoded color references 203B.1 and 203B.2 in the same two reflective arrays 100.1 and 100.2 in which viewer 310A sees a fish and a desert (both translated from the one 202A factory scene). From perspective 310B reflective arrays 100.1 and 100.2 display photographs of Abraham Lincoln and Frederick Douglass, respectively.

Viewer 310C sees reference images 230C.1 and 230C.2 in the two mirror arrays. From this perspective mirror arrays 100.1 and 100.2 display photographs of a colorful marble and a planet in space, respectively.

This theoretical gallery is configured to illustrate one of the many possible combinations of permutations of different mirror array image translation species. Also illustrated is the fact that the abstract appearance of reflection source images of secondary display images viewed through a previously configured array will be abstract and random. This randomness, however, will not typically cover the entire reflection source graphic area. Therefore, there is some freedom to complete and shape and artistically modify even such deterministically constrained reflection source graphics, to overlay artistic choice, as roughly suggested in the stylistically different patterns in source images 203C.1, 203C.2, 203B.1 and 203B.2.

FIG. 1I: Flashlight Laser

In FIG. 11A a method is shown for determining the overall extent of a mirror array's reflection source graphics, on an adjacent wall, from a given viewing location. A wide field light source, 916A, is simply shone on the overall array, 100A, and the position of all the mirror tile reflections of that light source is revealed. In this case, they all fall within a rectangular area on the adjacent wall. In the illustrated scenario, this is a suitable location on which to place the desired source graphics 200A, and no adjustments to the viewing area or tile angles are required, as might otherwise be the case were the reflection source position in a convenient area to place color source graphics.

The next step is to place each source color in the position required for each individual mirror tile. Three methods are shown for determining the reflection location of any given tile. In 11B a laser pointer 915B is shone at the center of a mirror tile, and the center of the required source graphic position is thus revealed by the reflection of the laser. This method does not readily show the entire area and shape of the tile's source graphic color source location, just the center.

Shown in 11C is a method for revealing the full size and shape of mirror tile's source color location. In this method, a narrow-beam flashlight is shone at the mirror tile in question, and thus in reflection is seen, at 210C, the size and shape minimally required to fully color that tile, for the exact viewing position occupied by the shining light. To allow some viewing position leeway, a source graphic would normally be of the given shape as so revealed, but of a larger size—typically enlarged as much as possible, to enlarge the viewing area as much as possible, but constrained by the proximity of other tiles' reflection source locations. 918C shows a mask with a tile-sized hole in it, to assist in shining flashlight 916C just at one tile at a time.

11D shows a hybrid method to find tile reflection source locations, but without the added complication of needing to mask off adjacent tiles. In this method, a combination flashlight/laser, 917D, is directed at the desired tile. In reflection, as shown in 210D, several tiles reflection source positions will be shown, but the correct one will be marked by the laser pointer.

To discover the source color mounting surface for an animation, when working with an array set up for animation, then a light source would be pointed at the array from along the viewing path, and the resulting reflection vector sweep could be captured in a video camera pointed at the surface swept by the reflection, and registered to the geometry of that given wall. The required print shape and placement location of each mirror tile's source graphic could thereby be discovered, along with the print size parameters.

A more useful and preferred method to set up mirror tile and tile array source graphics and site them, and print them, is for the entire process to be done in software, often in parallel with the design of the mirror array angle settings, and the design or choosing of the display image or images. The above methods are presented to show that there are multiple alternative methods to set up the arrays and their associated graphics, in this case so as to reuse an existing array with unknown tile angle settings. One computer-based method would be to scan a computer arm controlled laser across a mirror array, tile by tile, while at the same time a camera photographed the reflection source position, and logged each mirror tile's reflection position.

FIG. 1J: Reference Graphic Mutability

A) To construct the fish image in FIG. 1G, only several different colors from the city scene photograph were used. For the blue water background, for example, there are only a few dozen shades of blue, used over and over again, to produce a background gradient from light to dark blue and the shafts of blue light from above. These blues are reflected mostly from specific portions of the sky in the photograph, but also partly from a blue car. There is, in contrast to the prevalent blues, only one tiny red spot on the fish, and the mirror tile at that position is the only portion of the image that reflects red from the photograph, (and this red happens to be in an awning above a store window). The fish is primarily yellow, though there are just a couple of small sections of yellow in the photograph. There are therefore many mirror tiles that make up the fish all reflecting different portions of one or the other of those few yellow color sources, to derive the various shades of yellow necessary to construct the fish. If all sections of the city scene photograph in previous FIG. 1G, that are not reflected by any mirror are removed, just a few patches of the photograph remain, as shown in 210A.

B) Many of the blues and yellows in the fish are identical, but are not reflected from the same coordinates in the photograph, though they could be. These duplicate color references 210A are consolidated, so that the total number of photograph coordinates reflectively referenced by the mirror tiles is reduced, as shown in 206B. All tiles that were angled toward the removed coordinates are re-angled so that they will reflect the consolidated instance of the necessary color.

C) The remaining minimal set of color references necessary to construct the fish can be freely rearranged, as long as the referencing mirror angles are adjusted accordingly. Shown in 206C, the color swatches are arranged in a column.

D) Once the referenced color swatches are vertically separated, they can be widened, as in 221D, thus widening the area from which the reflected image, the fish, can be viewed.

FIG. 1K: Viewer's Own Face Used as a Color Reflection Source

In FIG. 1K a face is being color source mapped, 200A, with areas of color and brightness being identified and angle located with respect to stable facial features, such as pupils, nostrils, etc. Several images of the face will be mapped, during different facial expressions, to identify how certain color areas change during facial expression change. Those that change from bright to dark, from dark to bright, from one color to another color, etc., will be mapped and identified, to become part of a time-aware facial color zones map. This color map will be referenced in the design of this user's desired reflection image.

If, for example, the viewer opted to be seen in this self-referencing reflection as a clown, then color sources not already present in his face must be made available. These colors, bright white, red, blue, etc., could be printed on an eye patch, 200, which would be worn while viewing mirror array, 111, a custom-fabricated static mirror array designed from this viewer's facial coloring, his choice of display image. The eye patch has other advantages in simplifying the construction of a self-referencing facial array, in that it resolves otherwise complicated binocular reflection issues. Tracking and setting up a color reflection map of the viewer's face is much simpler from the single viewing perspective of just one of his eyes, as compared to doing it for both eyes.

FIG. 1L: Famous Person Face Morphing

In one embodiment of a self-referencing facial image transformation array, the prospective viewer of his own facial color map 205.1 and 205.2, array will be asked to choose whose face he wishes to see in reflection in mirror reflective array 100.1 and 100.2, which is to be custom fabricated for him. Using the time-aware palette of his facial colors, a display image 920.1 and 920.2 will be reflection translated from the users' own face, his face used as the color source. When he views the custom mirror reflective array 100.1 and 100.2, he will see a face not his own—perhaps the face of Albert Einstein, if that is the display face he chooses. Einstein's facial likeness, as translated by the array, having been designed based on the time-aware palette derived from the viewers own face, will smile when the viewer of Einstein-in-reflection smiles—if a smile is the specific expression that the viewer will also have chosen to be implemented in this custom facial translation array.

It is not possible to accurately map multiple viewer expressions to reflected facial expressions, but the user can choose at least one expression mapping to optimize (a smile, in this example). The basic principle for the mapping is that a comparison is drawn, mirror tile by mirror tile, between the user input reflection source expressions and the desired resulting display images. A comparison and mapping is made, specifically, between a) the list of areas on the user's face that change from light to dark, or dark to light, or undergo any specific observed color changes, or no change at all, during the mapped expression change, and b) the colors and color changes needed, mirror/pixel by mirror/pixel, to thus produce the desired display face expression change.

"A" on 205.1 and 205.2 might be an area that does not change color between smile and a face at rest, for this person. "B" might be an area, near the eye brow, that changes from black (eyebrow color) to light beige (temple color) and "C" an area that changes from middle pink to beige. These areas would be mirror reflection mapped to become areas on the display face that exhibited these color changes during the chosen display face expression change.

Note that 205.1 "A", "B" and "C", color zones on the input face, map to different areas on the output face. "A", for example, on the input face, during expression change, does not change in color, because the forehead does not wrinkle, on this person's face when he smiles. Therefore, "A", in the Einstein output image will, perhaps, use "A" as the color source for parts of Einstein's cheek, a portion of his face that likewise does not change color when he smiles. "B" on the input face, above the eye, changes from light to dark during a smile, and "C" the reverse. Mirror tiles that underly areas on Einstein's face that undergo these color changes, when he, smiles will reflect their colors from these areas. More than dark to bright and bright to dark shading changes will be tracked in the time aware palette of the user's face, and in the time aware palette of the Einstein face smile transition, because a subtle palette of many such changes will need to be compared and mapped to recognizably reproduce the facial expression change mapping.

Accurate viewer positioning is critical when viewing such a display. There are many possible methods for aiding viewer positioning. One is to provide small targeting armatures extending from the display, dual sights like gun sights, one on the left and one on the right, pointing to the viewer, which both line up when positioning is correct.

Generic facial translations are possible, not customized to a given viewer. Such translations would be less accurate, but would be nonetheless entertaining. They could be optimized for certain viewer types, like children or other groups with certain facial likenesses, upon which translation effects can be based. Such generic translations could be collected in books of interactive face translations. The manufacturing technologies applicable for this class of embodiments would be perhaps a stamping or other mass-production method, customizable to a shaped mirror fabricating technique, producing small-scale readily distributable mirror array in rigid thin sheets.

FIG. 1M: Identifying Reflectable Color Zones

Scene 201A is digitally imaged from the point of view of the mirror array. This image is image processed to determine and list the areas of flat colors and their angle location in the scene. This list then provides the angle data necessary to set the mirrors in the tile array to be sited at this location, and access any of these colors. The color list would, as simplified in 201B, list 1: light green; 2: blue; 3: dark brown; 4: dark green, etc., and also minimally provide angle position data for the center of each of these identified color patches. Additional typical information would be the size of each patch, the shape and other parameters. For use when composing images using this palette, the color list would be sortable and displayable based upon these many parameters, for many display effect purposes, discussed elsewhere. The "flat" colors shown as sensed in this scene, including for example the entire sky, constitute an oversimplification. In reality, the sky is perceptibly close to flat color blue near the zenith, but is more of a changing gradient at the horizon, and thus would not register as a flat color except at perhaps the top of this image.

FIG. 1N Rotatable Angle Cut Round Pegs Reflecting an RGB Color Source.

The round pegs in this embodiment are grouped to combine their color reflections from component colors (red, green and blue in this case) to form a full gamut of colors. One gradient each of red, green and blue is printed and mounted to the side of the display. Peg angles for each color peg differ, so that their reflective surfaces will reflect toward the viewer only one of the component color stripes, which are located in angle accessible strata, as shown. The pegs are not necessarily all of the same diameter. They can be varied in size in correlation with the needs of different display images, or for creative reasons, for example. The RGB scheme is also not rigid. In sections of an image that display as pure middle blue, only pegs of the blue variety, those that are angle-cut so as to be able to reflect the blue color source gradient, can be used.

FIG. 2A: Viewer Movement Direction, in Reflection
  A) When the viewer 330A moves laterally in relation to the reflective array 110A, the positions reflected by each tile, likewise, move laterally, Left or Right.
  B) When the viewer 330B moves vertically in relation to the reflective array 100B, the positions reflected by each tile, likewise, move vertically, Up or Down.
  C) When the viewer 330C moves toward or away from the reflective array 100C, the positions reflected by each tile, more complicatedly, move radially, Away from or Toward a common center point.

Graphics array graphic elements viewed in reflection in a mirror array change in position in response to viewer position as illustrated in these simple vector examples. Complex repositioning for thousands of reflection vectors is only possible in software, but the architect of reflective array displays should understand the general reciprocal directional relationship of viewer position and reflection source graphic position.

FIG. 2B: Still Image Sequence Transition Effects

Reflection color reference sources 230A-230E consist of horizontally elongated color reference swatches for five successive images, each swatch fading in from black and then out to black, from the point of view of a viewer moving through viewing positions 330A-330E moving laterally between the mirror reflective array 100 and the reference graphics. In this sequence of images each image is a full color image. Each source color is a horizontal stripe, supported by the fact that each mirror tile 110 is aimed at a different height, allowing the source color swatch for each to be horizontally extended, as shown. To invoke the fade-through-black effect, the beginnings and ends of each source color stripe are darkened, as shown.

FIG. 2C: Sequential Frames Presenting a Related Series of Images to a Moving Viewer.

In 2CA is shown a series of independent mirror reflective array 100 images, all using, a vertical greyscale gradient, as their color reference source 204A. Viewer 330A is in the progression of sequential viewing positions 340A, for sequential frames. As shown the progressing viewing positions 340A slightly overlap, creating continuity in the overall presentation to, in this case, a pedestrian 330A walking through this series of viewing positions 340A.

2CB is identical to 2CA except that the color source 204B is a horizontal gradient, instead of vertical. Because it uses a horizontal gradient, images in 2CB are lighter from the perspective of the viewer 330B upon first entering the viewing area 340B. The image is only at true brightness at the center of the viewing area, after which it darkens. Each image fades in from white and then out to black, in cascading sequence. Alternating panels could, for a slightly different effect, use alternating grey gradients, with reversed gradients, so that odd number panel images fade from dark to bright, and even number panels fade from bright to dark.

These two gradient effects are shown to illustrate two related simple cases. Typical reference graphic designs will more commonly combine these two gradient effects and others, with other source graphic effects for much more elaborate effects.

In both 2CA and 2CB a secondary (and tertiary, etc.) display is possible, shown here in 2CB as a mountain range stretched across all displays and visible as a single large image by viewer 310B. This image is based on a wide color reflection source that would be mounted opposite the gradient shown on the right.

FIG. 2D: Pivoting Array and Animation

FIG. 2D shows a viewer, 310, on a bench, which is in the viewing position of an animation that displays in a slowly pivoting array, 100, on the opposite wall. The reference colors 209 are stripes on a long section of wall above the viewer. Each mirror tiles sweeps out a unique latitude on the wall, wherein is printed the animation pixel history of the animation being viewed in reflection.

FIG. 3A: Mirror Tile Shape and Size are Freely Variable

Shown are a few examples of standard mirror tile shapes ("A" and "D") and a selection of specialty mirror tile shapes.

Each example is a small detail section of a larger mirror tile array. "H" example is a shape pattern where smaller mirror tiles are concentrated in an image's areas of greater detail. "F" is an example of a pattern where mirror tile shapes vary with the colors and shapes in the underlying image.

FIG. 3B: Mirror Tiles Shape Matched to Display Image Content

Illustrated in FIG. 3B are mirror tiles reflective elements 110 designed in conjunction with the reflective array 100 display image. For artistic effect, or to make an image read more clearly by concentrating small tiles at areas of image detail, or for many other technical or user preference reasons, mirror tiles can be freely size and shape customized to match, enhance, complement or otherwise interact with display image content, 221 and 222 for example, with respect to sea and sky.

FIG. 4A: Color Source Distance Affects Angle Variation

Mirror tile angle, when referencing the same color, varies greatly or minimally, across the display, depending on proximity to the display:
- A) When a viewer, 310A, near a display views a nearby reflection reference color 200A, the color targeting angles vary greatly, from one mirror tile to the next, across the reflective array 100A, as shown by the wide range angle "A".
- B) When a relatively more distant viewer, 310B, views a relatively more distant reflection reference color 200B, the color targeting angles vary only a small amount, from one mirror tile to the next, across the array 100B, as shown by the narrow range angle "B".

FIG. 4B: Ambient Color Environment Mapping

In FIG. 4C the mirror tile reflective array 100 is divided into 9 quadrants to illustrate how parallax will, for some reflectable environments, present different reflectable color sources 201 to mirror tiles on different section of the array. Looking at the array, we can see, in 920C, that from the perspective of mirror tiles at the bottom right, the smaller of the two trees in the reflectable environment is visible behind and to the left of the larger tree. In 920B we can see that, by contrast, from the perspective of tiles on the bottom left section of the array, the smaller tree is visible behind and to the right of the larger tree. Finally, as shown in 920A, from the perspective of mirror tiles at the top center, the smaller tree is not visible at all. Therefore, the list of available colors in a given reflectable environment will vary with respect to different mirror tiles across a display, in certain cases. One method to test for this situation, and accurately compile color lists and angle locations of colors in the list, is to photograph the reflectable scene from several points 914 across the display, and determine the reflectable colors at each position. In many cases it will be sufficiently accurate to take 9 photographs of the reflectable environment and then interpolate any color/angle map differences across the display. These 9 readings might be taken at the 4 corners, plus the 4 center edge points, plus the center. In scenes with many objects arrayed and distributed near and far in all 3 dimensions, many partly obscuring others, then more numerous scene sensing images will have to be gathered from points across the display. In reflectable environments that consist entirely of a distant tableau, with little or no parallax across the display array, then a single image will be provide usable color/angle information for the entire array.

FIG. 4C: Color Source Size Determines Viewing Area Size

Different image viewing situations may require different viewing area sizes, 340. Sometimes a small viewing area is required and sometimes a large viewing area is required. When composing a view image based on available ambient colors, it is desirable to be able to sort the list of available colors by size, since the size of the reflectable source color areas determines the size of the area to view the resulting display image. To see the color reference sources 222A reflected through reflective array 100A the viewer has a small viewing location, 340A. To see color reference sources 222B reflected through reflective array 100B, the viewer has a larger viewing location 340B.

FIG. 4D: Color Reference Subsets

Three views of one color reference environment:
- A) All flat color sources 222A;
- B) Wide-view sources only 222B;
- C) Narrow-view sources only 222C.

A comprehensive color reference survey will register many attributes of the locally arrayed colored objects beyond simply their position and distance. Color reference size correlates to the size of the viewing area of the resulting image. Therefore, when contemplating building a wide viewing angle image, narrow angle color sources, 222C, can not be used. 222B shows only the 4 large color sources in this particular color environment, a very limited palette, though still useful, especially if these colors are complementary primaries from which many colors can be mixed. 222A, the full selection of available colors could be used to construct images that did not require a wide viewing area. In many cases, however, as another consideration, it is desirable to construct images from color sources with similar sizes, so that all elements of the constructed image share a similar viewing area boundary, and would not partially degrade when some elements of the image are within viewing range and others not. In such a case where many colors were needed and progressive image degradation were not desired, then 222C would be the desirable palette subset to use, in this particular color environment.

FIG. 4E: Multiple View Angles in a Progressively Revealed Image

The Venn diagram below the two image views is a map of the viewing areas of a progressively revealed image and, equally, an indication of the smallest size color sources visible from those areas. From the smaller position 340A the complete image 920A is visible including both the wide and narrow view color sources. From the portion of 340B outside of A, just part of the image is visible, just the wide view elements, 920B.

FIG. 4F: More Detailed Progressively Revealed Image

In FIG. 4G it is shown that a viewer at 3 progressive viewing positions, 330A, 330B and 330C, sees 3 progressively different images in the mirror tile reflective array 100 display. At point 330A only the grass and the pine tree are visible. In the overall source colors 230 referred to by the mirror tiles, those that make up the grass in the image stretch in swatches across the full reference image area, as shown in 210A. The grass will therefore be visible from throughout the entire overall viewing area. The source colors 210B, those that make up the pine tree, only stretch halfway across the full reference graphics area, and thus to a viewer passing through the viewing area, the pine tree will only be visible for half the time. At the end of the viewing area, a viewer at position 330C will no longer see the pine tree, but will see new picture elements constructed of reference color elements only visible from this position, in 210C.

FIG. 4G: Relative Movement Invokes, Controls Animation

In static arrays, at least one of three components in a mirror tile display, viewer 330, mirror array 100 or reference graphics 230, must move in relation to the others in order for animation or image content change to be displayed to the viewer.

A) The viewer 330A moves along the viewing path while the array 100A and color reference source 230 remain stationary; B) The viewer 310B does not move, the color reference source 200B does not move, but the mirror array moves 100B; C) The viewer 310C and mirror array 100C do not move, but the color reference source 231C graphic moves;

In each case, A, B and C, the movement causes the reflection point of each mirror tile to move through the reference graphic.

FIG. 5A: Light Collage Plus Reverse Mapped Image

In FIG. 5A a reflective array 100 has been configured to reflect the light shone by spotlight 904 into a pattern on the floor that forms an image of a fish, 920, built of areas of compound reflected light and areas unlit by reflection. Very brightly areas are established by the combination of several mirrors directing their reflections to those areas. Medium bright areas are built by the reflections of a few mirrors compounded. The relatively darker areas around and within the fish are unilluminated by any reflected rays. This array, 100, built specifically to reflect radiant light to build up this light-collage image, is also used to present a reverse encoded scene of a church among some hills 920.

The method for reverse encoding an arbitrary image into a color reference source 203 graphic that will display the image to a viewer 310, is discussed elsewhere, also referred to as establishing a bi-directional mapping. The method for configuring a mirror reflective array 100 to cast reflections so as to build up a grey-scale image of relative brightnesses is, at its most rudimentary, to simply perform the mirror angle settings by hand, mirror by mirror, perhaps following a sketch set temporarily in the position of the final intended light collage image.

Alternatively, in place of relying on the high degree of artistic discretion required for the above method, an easier approach would be to place at the intended image location a negative of said image. Then, a technician—in place of an artist—could simply point reflective tiles at all the darkened and slightly darkened areas until the darkness is compensated, and the template becomes indistinguishable from a flat shade of grey overall. The darkest areas of the negative will not become sufficiently bright grey until illuminated by several mirrors. The just slightly darkened areas of the negative will disappear into the background shade with the illumination of just one mirror's reflection. Once the negative is no longer visible, all of its darkened sections fully compensated into flat even color, it can be removed to reveal the light collage image.

A similar method can be used to build full color cast images, provided red, green and blue, or other primary color scheme light sources, by following a similar procedure. This procedure requires that the red, green and blue color channels—or color channels as used in the given image—are provided in negative form, as above. Each negative is laid in place in turn, and lit with reflections from its respective light source until, as above, the negative is turned into a flat wash of even shade. When the next color channel's mirrors are to be set, the first light source should be turned off, and the negative image lighting compensation step should be performed. In a three-primary-color image, every third mirror is dedicated to one of the primary colors. In a five source color image, every fifth mirror is dedicated to one of the primary color channels, and so on. The reflection setting process is repeated for each color channel and then all lights are turned on, to reveal the full color image.

FIG. 5B: Detail View of a Simple Four-Branch Reference Shape

A mirror tile array in which all mirror tiles refer to cross or "plus sign" shaped color reference source a single swatch example as shown, 221, will have an equivalently shaped viewing area. One effect possible with such a reference shape is to divided these swatches into color zones or separate image zones, to construct present different images to those corresponding parts of the viewing area. One could present a primary image at the center of the viewing area, by placing that image's mirror tiles' reference colors at the center, "A", and the source colors for variations to that image on each of the four branches "B", "C", "D" and "E". To view these alternative images the viewer, when viewing "A", would either move slightly right or left, up or down.

In one scenario "A" could contain the colors that contribute to the image of a front view of an object, zone "B" could contain the colors that contribute to the bottom view of the object, accessible by the viewer by slightly lowering his viewing position. The side views of the object are encoded in the left and right zones "C" and "D" of each mirror's reflection source, and the top view in the remaining zone "E".

FIG. 5C: Tiling of Four-Branch Color References

This color reference swatch shape tiles space-efficiently. These representations are idealized, since in actual usage each mirror tile color reference shown here will be referred to from a slightly different angle, from mirror tiles across the referring display. Each reference swatch, each "plus sign", will thus be slightly distorted, thereby upsetting the perfect packing pattern shown here. This shape, nonetheless, makes efficient use of reference graphic space. The overall tiling pattern will be warped when mounted on a wall that is obliquely angled from the point of view of the mirror array, as in 221A, or when mounted on a curved wall, as shown in 221B, as shown in some of the representations.

FIG. 6A: Binocular Reference Swatches

When a color reflection source is small, it can only be seen by one eye at a time. Therefore two color reflection sources are needed. When each eye requires its own reflection source, each eye can be shown a different color for each mirror tile/pixel, thereby allowing presentation of a different image for each eye, thus supporting true binocular 3D, and other binocular effects. A: When a reference swatch is close to, or less than, the size of average eye separation distance, as in the case of this one-inch-square swatch, only one eye can see it in reflection at a time. B: To show the same color in reflection to both eyes at the same time, as seen in a small mirror, two swatches are necessary, one for each eye. C: Since every mirror tile in a display can have a separate color reference for each eye, two entirely different images can be presented to each eye. This allows true 3D stereo pairs and many other binocular vision effects FIG. 6B: Horizontal Gradient Binocular Averaging An entire greyscale image can be referenced solely from the single gradient 204. R1 and L1 show the reflection points of one mirror tile, one for each eye, right and left. R2 and L2 show the reflection points for a mirror tile set to a lighter shade of grey. These are just two of several thousand mirror tile color references in a full mirror tile display, each targeting a different point (or pair of points, that is) on this reference gradient, as necessary to color, or shade, the given mirror tile the necessary shade of grey to construct the given image. A viewer's movement to the left or right when looking at a display referencing this gradient will result in a darkening or lightening of the presentation image. If the reference gradient were reversed, the overall image would be changed from a positive to a negative, an interesting and quick color palette manipulation effect, one among many. Various alterations of this gradient can be placed above and below this one to allow the viewer's vertical movements or movements toward and away from the display to manipulate the image in various ways, such as to turn it to a 2-color image, a false color image and many more complex alternatives.

FIG. 7A: Mirror Tile Reference Graphics Focally Compressed

A) A2 and A3 show five frames of a mirror tile's animation color reference source 210A compressed horizontally, as would be enabled by focusing the mirror tiles that reference this graphic, as in C, below B) B2 and B3 show five frames of a mirror tile's animation color reference source 210B compressed both vertically and horizontally, as would be enabled as shown in D, below.

C) C2 and C3 show 1 frame of a mirror tile's animation color reference source, 210C, reduced in width by virtue of one-axis focal compression, using a concave mirror tile surface 901C.

D) D2 and D3 show the same frame of a mirror tile's color reference source 221 as shown in C, this time subject to two-axis focal compression, using a concave mirror tile surfaces as 901D.

FIG. 7B: Mirror Tile-Level and Array-Level Focal Compression

A) In this magnified view A1 shows a standard mirror tile 111A1, reflecting a color swatch 222A1 that has to be, in a simplified geometrical relation, approximately as large as the mirror tile. A2 shows that by focusing the reflective reference, the referenced color swatch 222A2 can be much smaller than the mirror tile 111A2. The size of the reference graphics for the overall display is thus similarly size reduced.

B) B1 shows a viewer 310B1 looking at a mirror array that color references 200B1 through a typical mirror tile array 100B1 for a still image. B2 shows a viewer 310B2 seeing an image in the same mirror tile array 100B2 with a concave mirror 901 introduced between the mirror array 100B2 and a focally reduced color reflection source 240B2.

When reflection color sources are reduced in size the incident illumination upon them must be increased proportionally to their size reduction, to maintain brightness levels in any reflection constructed images drawn from them.

FIG. 8A: Re-Referenced Graphics

In a typical mirror tile reflective array display each mirror tile, 110, references a color reference graphic 200A in the line-of-sight of the mirror array 100. In cases where, for one example, there is not enough wall space to display all necessary color reference source graphics on the directly reflectable surfaces, some mirror tiles' sources colors can be reflected twice, allowing them to be referred to from a wider area than directly referenced graphics. A plain mirror 902 incorporated into the primary color reference source 200A, reflects supplemental color reference source 200B information back the viewer 310.

FIG. 8B: Referenced Graphics in Mirror Array Frame

A self-contained mirror tile reflective array, 100, in which all color reference source, 200, graphics are mounted in a single unit with the mirror array can greatly simplify set up of a display. All that is required is a mirror 902 mounted opposite the display, at a certain distance to reflect the image to the viewer 310. A relatively simple template based on this arrangement could be produced by non-specialists, if they were provided with, in one embodiment, a standardized mirror array with an associated graphic transform and printer output presets, with appropriate registration marks built in. An end user could input his own graphic, the transform would be applied by the provided software and the resulting graphics printed according with the provided print template. The end user would mount the graphics and have is own custom mirror translation. His only geometrical calculation would be to site the re-reflection mirror and the array exactly parallel and at the proper distance. In a related system the user could pre-measure the site and the template and transform could be custom calculated and provided for his specific site.

FIG. 9A: A Simple Refractive Display

FIG. 9A shows a refractive array display, 910A, a window filled with small, square and slightly refractive glass tiles, their backs slightly angled from their fronts, in a series of accurate graduation steps of increasing refraction. The tiles are all clear—uncolored, potentially made using high index glass, though not necessarily. By redirecting exterior color reference sources 201A1, 201A2, 201A3, 201A4, they construct an image as apparent to viewers 310A from within the window's room. This refractive array 910A uses four colors; green derived from a tree, grey derived from a concrete building, brown derived from a brick building and blue derived from the sky, to construct an image of a harbor of blue water, green trees and brown-hulled ships with grey sails.

Shown in 911B are cross sections of the square refractive tiles, showing tiles with different degrees of refractivity. The refractivity of a refractive array tile is analogous to the mirror angle in a reflective array—a given angle is required to bring a given color to a given tile location, as specified the given scene's color survey, and on that basis a tile of the necessary refractivity and direction of refractivity is chosen. Shown in 910C is an oblique view of refractive array, the various clear glass tiles visible from the side, showing their various angles and orientations.

Refractive arrays can present images from multiple perspectives, using techniques as used for mirror arrays, that is by placing source colors as needed to construct images. Another method, applicable to both reflective and refractive arrays, is to take advantage of the targeting leeway for colors, when available, to allow a second image translation to be configured in terms of the choices in color targeting of a first image. For example, when reflecting or refracting blue for a given tile, when constructing a first image, if the blue color source is a wide lake, then for the purposes of that first image that tile may optionally be set at any angle within in a wide range. One setting within that range might be an angle that supports the display of a second image from a second perspective. When a given image is constructed with a great deal of such "play" in all the settings, a second image may readily be set up by taking artful advantage of this play. In the case of a refractive window display, the second image may be an image displayed from the opposite direction, viewable to those outside the building, and based upon colors inside the building. Secondary images in refractive displays that are based on the option of placing elaborate and detailed color sources inside of rooms containing out-looking refractive displays give a wide creative range to such images, but it is not always possible to place elaborate color source graphic patterns in any given room containing an out-looking refractive array. It is possible, though, as another alternative, to establish elaborate or interesting secondary indoor-directed refractive displays, by using point light sources as the indoor "color" or brightness sources for in-looking refractive arrays. These point light sources can be arrayed on ceilings unobtrusively in a normal office environment, for example, but be complexly organized and arranged, to serve specific image generation needs, especially for night-time versions of secondary refractive displays.

FIG. 9B: Targeting Color Borders to Mix Colors

FIG. 9B shows targeting of swatch borders to mix colors. When two reference colors, red and yellow, "A", or black and white, "D", for example, are contiguous, a mirror tile targeted partway between the two tiles will display a mix of the two colors, perceptibly the same, at a certain size, as mixing the two colors as if they were paint. In one case it is shown that red+yellow=orange, as apparent to a viewer of the given mirror tile, or collection of mirror tiles so mixed. In another case it is shown that black+white=grey, as apparent to a viewer. It is also shown that the level of orange or grey varies in proportion to the amount of red vs. yellow or black vs. white that is apparent in reflection, as determined by the exact targeting of the reflection between the two bordering colors.

- A) Two reference colors, red and yellow, by direct reflection.
- B) Three reference colors, red, yellow and orange, orange being the result of mixing red and yellow, by targeting between the color reflection sources.
- C) Eight shades of grey (including 100% and 0% black), by direct color reference targeting.
- D) Eight shades of grey, two of them by direct reference (black and white) and the remainder by mixing black and white, by reflection targeting various color reference positions (2 through 7) between black and white.

Color mixing by accurately targeting the border between two or more colors can greatly increase the available palette, but is typically only applicable when the viewing position is precise and stable. Border mixed colors can be wide areas, not requiring strict accuracy in one dimension, at least, along the border between the mixed colors, when that border is long.

FIG. 9C: Mirror Tile Halo Viewing Positioning Cues: Directional Colors

- A) Shown are the 25 reflection reference color swatches for a given image. The color palette of this image has been reduced to 25 colors by a compression process similar to GIF image compression. Thousands of mirror tiles reference these 25 colors to build a large full color image, with the typical slight apparent color fidelity reduction apparent in GIF images, resulting in a comparably very compact reference graphic. One purpose of such radical palette reduction compression is to free up reference graphic space for special effects, reference color halos, 208B, in this case, used as viewer positioning cues.
- B) The 25 reference colors have been separated from each other, providing space around each swatch for buffer colors, colors that will display to a viewer entering or leaving the viewing area. The mirror tile buffer colors in this case are configured to provide a visual cue, a color halo, to aid the viewer in positioning himself for optimum image viewing. The grey shades to each side of each mirror tile represent 4 different vivid colors, in this particular scheme. When the viewer moves to the left, and begins to exit the viewing area in that direction, the entire image will start to tinge one color, and if he moves in the opposite direction, another color tinge will result, in each instance allowing the viewer to make a quick subtle corrective movement to maintain his true color view of the display image. Edge mirror tiles may be configured to tint first, by extending their reference color's haloes inward slightly more than other tiles' haloes, thus providing a fine adjustment cue, before the entire image tints upon more complete viewer disengagement with the viewing area.

FIG. 9D: Row Transposition Inversion, an Image Distortion Effect

In a different family of angled mirror array effects, sailboats, 201, on a lake are reflected partially inverted, 920—only their sails inverted—from a certain viewing position 310A. While the boats' sails are inverted, the boats' hulls and the lake below and clouds above are not inverted.

No specific elements of the image is actually inverted. Each tile reflection in the reflective array 100A is a normal upright reflection. The mirrors are, that is, all flat. For a certain portion of the image, however, the order of the reflection vectors of rows of reflective element 206 mirror tiles is reversed, creating the apparent inversion 920. For a detailed example, 206B shows an upright triangle, and 206C shows a row transposition inversion, of the triangle. At this coarse resolution the inversion is very rough, and each individual row is readily recognizable as still upright, though the overall inversion illusion is already apparent.

FIG. 10A: Ten Frames of One Pixel's Reference, Under Three Compression Levels

FIG. 10A is a detail view of an animation color reflection reference graphic showing the encoding of just one pixel, over the color history of 10 animation frames.

- A) All other factors being equal, with respect to instances B and C, the viewer of graphic 250A is moving faster, resulting in a longer reference graphic that encodes no more image information than B or C, but uses 2 or 4 times the area.
- B) If the viewer of the same image as encoded in A were to be moving half as fast through the viewing path, the viewing speed-reduced animation reflection source 250B graphics would need to be encoded in half the space, a more efficient use of reference graphic space, thought still not ideal.
- C) A viewer moving half again as fast could be presented the same animation with each mirror tile referencing encoded pixel color reference source 250C graphics half again as long as in B, a further viewing speed-reduction, closer to an ideal minimal use of reference graphic display area.

The speed of the viewer is not the only parameter that can be adjusted in order to optimize animation reference graphic print area size. Another method is to optimize the geometry to adjust the reference graphic reflection indexing speed. For example, if a reference graphic at distance X encodes as shown in A above, then moving the reference graphic much closer to the mirror grid will result in the same display animation using version C above. Another method to optimize reference graphic geometry is to focus the reflections, and thus compress them in one or two dimensions, as outlined in FIG. 7A.

FIG. 10B: Animation Frames Become Mirror Tile Reference Graphics

"A" contains a detail view of the top left-most reflective element, 110, as it changes its reflected content over 5 consecutive frames, 100, of an animation.

"B" shows these same 5 pixels when printed as a color reflection source, 230B, which is reflected as shown in "A"

FIG. 10C: Moving Sidewalk Rail Animation

A series of small mirror tile reflective arrays 130, perhaps of a type that are stamped out of foil using a standardized reflection mapping, are embedded in the top of a rubber moving handrail of a moving sidewalk in an airport terminal. This particular standard reflection mapping is one which maps the two dimensional grid of mirrors to a one dimensional line of reference points. A pedestrian, 310, holding the handrail can see in reflection in one of these arrays, just ahead of her hand, a tiny slice of the long color reference source 230 stripes mounted on the ceiling. As the sidewalk moves, this visible slice of the ceiling reference graphic moves down the hallway, along the length of the long reference graphic, thereby playing back in reflection a long animation, visible to the pedestrian. Each of the hundreds of tiny reflective elements in each identical hand-rail mounted array, 130, is angled to reflect a different one of the hundreds stripes the long thin reflection color reference source 230 shown in simplified schematic on the ceiling (or ceiling and upper wall, with respect to another display on the opposite handrail). Each stripe encodes the animation history of the mirror/pixel for which it provides a reflection source, contributing thereby to the long slow animation viewable by the pedestrian viewer 310 for the duration of her moving sidewalk ride, provided she maintains her position within the narrow animation viewing position, steadied by her hand holding the handrail.

FIG. 10D: Moving Sidewalk Rail Animation Source Graphic Detail

In this simplified example of an animating array, the mirror array 100 is a small matrix of tiles, each reflecting to one position in a line of reflection color source stripes, 209. Each of the 16 shown stripes holds one mirror/pixels history over the course of an animation. In this animation example a series of 5 simple geometric patterns are displayed, one in the shape of a "1" at the top. This is one type of animation that would be viewable as illustrated in FIG. 10C.

FIG. 10E: Branched Animation Reference Graphic Packing Method

Animation color sources can branch into separate animations, viewable upon either of two paths. To support this branching, all color source stripes must branch. Such branched shapes take up much more space than simple one-dimensional stripes. They cannot be closely packed without overlapping each other. One way they can be overlapped without changing the color in one or the other reference, and thereby compromising display content, is to overlap them at points of near or coincident color. A) The shape of a single mirror tile's reference stripe for a branched animation. B) Several overlapping mirror tile references (out of thousands) shown overlapping only where colors in both references coincide. The 3 circles show the 3 overlap points for these 4 mirror tile references. The number of potential color coincidences, i.e. overlap points, can be greatly increased decreasing the color palette, as is possible using certain color compression methods.

FIG. 11A: Computerized Reference Graphics

FIG. 11A shows a mirror tile array, 100, on a table top using a live computer display as a reference graphic, each mirror tile reflecting two small reference swatches in the computer display, one for each eye, thus supporting true 3D. The computer display optionally incorporates viewer tracking, so that the reference graphics can be optimally minimized and moved as necessary to track viewer eye position movements and position with respect to the display. The mirror array, in some such embodiments, is constructed of real time actuated tiles, supporting substantial additional features and functionality.

In the illustration the reflection vectors of three mirror tiles are illustrated, showing the location on screen of the source colors that the viewer sees in those three mirror tiles. The viewer has no way of knowing the screen location of any given mirror tile. When displaying a coherent image in the mirror tile array 100, the source graphic, in this case a computer screen, shows an unrecognizable abstractly shaped reference graphic, a function of the display image and the mirror tile array mirror pattern. Since each eye sees individually different references for each mirror tile, each eye sees, potentially, and entirely different images. 3D images and other stereo vision effects are thus possible. Animated and still image 3D images and effects can be presented in static reference graphic mirror tile displays. In distinction, computer-based mirror tile array 100 reference graphics can be interactive and intelligent, presenting games, environments and various other computer interactive fare, enhanced with the added benefit of mirror tile true-binocular 3D.

FIG. 11B: Viewer Tracking Used to Adjust Projected Reference Color

A digital video camera 731 directed at the viewer 330 of a static-angled tile array 100 allows a computer 733 to track the eye position of a viewer 330, feeding that information to a video projector 732 which projects the live computer controlled reference source colors 231. The computer updates the reference color map positioning it projects to compensate for any movement by the viewer 330, and thereby maintain a stable and persistent image or effect, if desired, as apparent to the viewer.

FIG. 12A: Array Crawling Display Updater

"A" shows a single mirror tile reflective element 110 built from an angle-cut rod, with a polished flat mirror surface at the top. The notch shown on the reflective surface is not inherent to the mirror tile design, but to the illustration, as an indicator in front view of the rotation of each given mirror tile, and thus the direction from which it reflects, and thus the apparent color. In an array built of rotatable angle mirror elements, the palette is typically array in an arc around the perimeter of the array, sometimes in the very frame of the array.

"B" shows a reflective array of mirror tiles as shown in "A", their default rotation, as shown in the first few rows, pointing their reflective surfaces down, reflecting whatever color might be referenced there. A simple device, 621, that crawls over the array and resets each mirror tile's rotation, thus updates each tile's color reference and thus, gradually, updates the entire display image.

FIG. 12B: Screw-Elevated Triangular Tiles

A triangularly shaped reflective element 110A can efficiently be angle adjusted by an angle adjustment mechanism at each of its 3 corners. In this design a fine-thread screw angle enabler 622 is accommodated by a threaded sleeve at the rear of each angle tile 110B, said screw 903 embedded but freely turnable and slightly pivotable in a back mounting plate 600 to which all triangular mirror tiles 110B are attached. The elevation adjustments thus made possible for each mirror tile allow each tile to be aimed a certain number of degrees in any direction. Though an array of thousands of tiles could be screw-adjusted by hand, a computer controlled custom designed tool would be the desired method to adjust a large display. A display could be mounted so that these rear-accessible screws were accessible by such a tool, perhaps operated by robot arm, for example, to machine adjust each tile automatically at relatively high speed, under computer direction of the necessary screw set position, to establish the correct angle for each mirror tile. The mirrored front of such triangular tiles would typically not be as far apart from each other as shown in 110C. Just a small separation between tiles would be necessary, to accommodate the slight angle actuations.

FIG. 12C: Bendable Neck Mirrored Tabs

Shown in FIG. 12C are two related methods for mounting mirror-surfaced reflective element tabs, 111, with bendable metal necks between a hangable section and a reflective body section. The bendable neck can be bent to the required angle position to reflect a specified angle-located source color. In "A", the reflective element 111A tabs are designed to hang free, and wave in a breeze, which would cause them to lose their specified angle, and thus the display image to change or disappear. Once back at resting position, the image would reappear. In that embodiment the necks might only be twisted left or right, as shown from to top view. In "B" the reflective element 111B tabs are not free hanging but are mounted to a groove in a wall or mounting structure, or by some other solid fastening. As a result of their solid mounting, this type of tab can be neck-bent not just left and right but also up and down, as shown in the top view.

FIG. 12D: Computer Block Diagram

FIG. 12D is a block diagram that illustrates a computer system upon which different embodiments and elements of embodiments may be implemented. The computer system includes a bus or other communication mechanism for communicating information, and a processor coupled with the bus for processing information. The computer system also includes a main memory, such as a random access memory (RAM) or other dynamic storage device, coupled to the bus for storing information and instructions to be executed by processor. Main memory also may be used for storing temporary variables or other intermediate information during execution of instructions to be executed by the processor. The computer system further includes a read only memory (ROM) or other static storage device coupled to the bus for storing static information and instructions for the processor. A storage device, such as a magnetic disk or optical disk, is provided and coupled to bus for storing information and instructions.

The computer system may be coupled to a display, such as a flat screen monitor or a digital projector, for displaying information to a computer user or with an individual interacting with certain computer-integrated embodiments. Input devices, keyboards and machine vision-based data input and computer interaction devices can be coupled to the bus for communicating information and command selections to processor.

Embodiments are related to the use of a computer system for executing some of the techniques described herein. According to some embodiments, those techniques are performed by the computer system in response to processor executing one or more sequences of one or more instructions contained in main memory or in response to video camera input or other input from other elements of the particular embodiment. Such instructions and input may be read into main memory from another machine-readable medium, such as storage device. Execution of the sequences of instructions contained in main memory causes processor to perform the process steps described herein. Embodiments of the invention are not limited to any specific combination of hardware circuitry and software. The computer system can send and receive messages and data, including program code, through links to other digital devices. The received code may be executed by the processor as it is received, and/or stored in the storage device, or other non-volatile storage for later execution.

In the present specification, embodiments have been described with reference to numerous specific details that may vary from implementation to implementation. No limitation, element, property, feature, advantage or attribute that is not expressly recited in a claim should limit the scope of such claim in any way. The specification and drawings are to be regarded in an illustrative rather than a restrictive sense.

Regarding Color Source Tracking:

In place of actually tracking color source objects as a series of recognized changing objects, which is somewhat complex to do, the system simply frequently updates the entire reflection environment, by reading a digital image feed of the scene and identifying color patches—effectively thus tracking all the elements in the environment, such as a red truck moving through the scene, which would be temporarily useful as a red reflection source, and thus incorporated as a reflection source, as needed, for as long as it is present. The truck would not be recognized as a truck, or even recognized by the system as a persistent object. It would just be used as a color reflection source as long at its big red splotch were apparent, and no longer used once it were gone. Constantly sensing and updating the color environment is much simpler technically, compared to actually identifying hundreds of objects and individually tracking them, and is functionally equivalent for the needs of the mirror display system, live actuated-with-color-tracking version.

Regarding Viewer Position Tracking:

Viewers can be identified and tracked using visual processing algorithms similar to those used by digital cameras for smile detection, and those used in body tracking systems. Identifying a viewer or viewers and updating their positions frequently and accurately, and continually tracking the reflection targets toward a chosen specific viewer or group of viewers, is the basis for elaborate visual effects with a wide range of novel and unusual features. These features include free-form combination across a single display of still images, interactive effects, viewer-reflective interactive effects, true 3D images, animations and private presentation of all of the above, among other noteworthy characteristics. Viewer tracking and real-time array angle actuation enables a very high degree of synergy among these and other mirror array display features explained elsewhere herein.

Though low-resolution versions of the technique of the present invention have been possible for centuries, high resolution versions, quickly designed and fabricated, have only become recently possible, as the design and construction process involves precise and highly iterated measurements and calculations, digital imaging, 3D modeling and raytracing systems, and computer driven manufacturing systems.

Additional Illustrative Examples, Introducing Additional Technical Details:

In a photograph of a colorful city scene with cars, pedestrians, store fronts and window displays, to a certain rough accuracy all colors and shades are present, in greater or smaller abundance. If copies of this photograph are cut into tiny pieces, any image to a certain rough accuracy can be constructed with these pieces, mosaic style. Depending upon the size of the mosaic pieces this image can be crude, or photorealistic.

Picture such a mosaic, a colorful abstract image of a fish, constructed of tiles cut from this city scene photograph. Picture this fish image hanging opposite the original city scene photograph. This fish is mostly yellow, though there are only a few small patches of yellow in the city scene. Many copies of the city scene photo were cut up to obtain enough yellow pieces to build the fish image mosaic.

Assume that all mosaic pieces are cut in an accurate square grid pattern, and are numbered with their row and column location in the city scene photograph.

Now, assume that we replace each tiny paper fleck of the diced photograph, used as a mosaic piece to form the fish, with a mirrored tile. We now have a faceted mirror, but no more fish. Assume that we stand at a certain position from which we can see the city scene reflected in the faceted mirror, as they hang opposite each other. We look in the faceted mirror and we see a slightly, randomly distorted cityscape.

Now, and this is the key step, assume that we very precisely angle each tile in the mirror mosaic so that it (each tile) reflects, from where we are standing, the exact position in the photograph from where that tile's tiny photo section was cut. The mosaic image of the fish is now recovered, this time as an array of tiny reflections. From our particular viewing location, the cityscape is "reflectively translated" into the fish image.

Let's now follow the same procedure again, this time constructing a mosaic image of a car on a desert highway, from flecks of the same cityscape photograph, and hang that mosaic next to the mirror fish. Let's again convert each photo fleck into a mirror tile, angle-targeting each mirror tile to the correct position in the reflective reference photo, the cityscape, as before. At the same position from which we see the fish reflection, the second mosaic reflects an entirely different image from the same original. The first mirror grid reflectively translates the cityscape into a fish, and the second mirror grid reflectively translates it into a desert highway scene.

Additional images can similarly be derived from the city scene from additional mirror arrays. Instead of adding more arrays, we can also use these two existing mirror arrays to present different images, from alternate viewing positions. From only one position do these mirror arrays reflect the city scene photograph, and thus display a fish and a desert scene. From other positions these two arrays simply reflect blank spaces on the wall. If we hang further copies of the city scene at these blank wall locations they will not exactly reflect as a fish or a desert scene, because the geometry will be distorted, and most mirror tiles will reflect a slightly offset position in the city photograph. To retain faithful reflections of the fish and the desert scene the city scene reflection source image would need to be distorted to compensate for the changed geometry. However, more interesting than providing additional fish and desert scene images from the two mirror arrays, might be to derive entirely new images from these arrays, to be presented at the additional viewing positions. How is this done? Take for example a photograph of Abraham Lincoln. To display Abraham Lincoln to a new viewing position in one of the existing mirror arrays a specifically derived graphic pattern must be placed at the blank area of the wall that is reflected by the array from that given viewing position. That graphic pattern is derived, specifically, by projecting the image of Abraham Lincoln backwards through the given mirror array. This results in an entirely abstract image, unrecognizable except when viewed in the mirror array. The translation pattern that changes the city scene into a fish is a very specific pattern, a very specific arrangement of mirror tile angles. If we want to change the output image from a fish we must change the input image from a city scene, and that input image will not be recognizable, since that image is the function of a given output image (Abraham Lincoln, a satellite image of a river delta, a colorful glass marble) multiplied, in a sense, by the existing mirror array. The mirror array was originally a function of the color arrangement in the fish as compared to the color arrangement of the city scene. Though this resulting array may not be random in a perfect mathematical sense, for current purposes it is essentially random, and when used as an encode pattern for new images to be viewed in that array, the resulting encoded reference images are, to the eye, random patterns.

We now have a gallery with two mirror arrays on one wall and, on the opposite wall, one photo of a city scene, and several abstract images, the reverse encoded source images for a photo of Abraham Lincoln and several other images. Viewers stepping from one position to the next first see in the reflection grid the fish and the desert scene. Then they see the additional images from the additional viewing positions. The additional images are entirely distinct and different, none are visible from any position other than their assigned viewing position.

We've seen two illustrations of the general principle that any image can be reflectively translated into any other image, provided the original image is a palette super-set of the reflectively constructed image (the fish and the desert scene). We've also seen several examples of how any arbitrary reflection grid can be used to construct any given image, provided that this new graphic is produced with a reference graphic that was backward calculated, through that reflection grid, from this desired display image.

Let's look now at some image effects that can be generated when the reflection reference colors are freely configurable at the same time that the reflection grid mirror angles are also freely configurable, both taking their form from the needs of the desired image effect. Removing the constraints on the design of both the reflection reference and the mirror grid allows a wealth of display effects otherwise not possible. To explore one of these new effects, let's work with just the original cityscape and the fish.

Assume that we remove all parts of the reference image (the cityscape photo) that are not reflectively referenced to construct the image of the fish—those sections of the photographs not targeted by any mirror tiles—leaving just a few patches of the original photograph. Though most parts of the photographs are missing, leaving just a skeleton of patches, the reflected fish image remains completely intact.

Note that although there are only a few small patches of yellow in the city scene photograph, the fish is mostly yellow. When cutting up the cityscape it took many copies of the photograph to make enough yellow mosaic pieces to construct the fish. When extracting the same amount of yellow using mirrors, however, there is no shortage, since any number of the mirror tiles can simultaneously reflect the same small yellow sections of the original image.

The correlation between each mirror tile and its assigned color reference, and the reflection of that color back toward the viewing position, are reflection vectors. This elementary discussion treats the reflection vector simply, omitting certain complications like the fact that there are really two vectors, one for each eye when dealing with narrow-field reference color sources and we gloss over several other geometric subtleties. What is introduced here is the general notion that the reflection vectors from viewer to mirror tile and mirror tile to reference color are based on easily computed geometry and this simple geometry is at the center of this system and simple adjustments of this geometry are the basis for various image effects. Three elements in this system—viewer, mirror, source color pattern—form a single reflection, a single V shape, at the individual mirror tile level, and a flock of variously angled Vs, at the image level.

For our next example we'll stretch both ends of all reflection vectors from points into lines. The reference graphic swatches become lines or stripes and the viewing positions become paths. These paths can be vertical, lateral or any shape. If each reflection reference is extended into a lateral line then the viewing position is thus extended laterally. The viewing area shape and the reference graphic shape are, simply, reciprocal mirrors of each other.

If we change the color of each mirror's reflection source as it moves along its path, that color change can be seen by the viewer of the image as he or she moves in either direction along the viewing path. For example, the reference image stripes can be darkened gradually to black, and this darkening will be seen in the reflection as the viewer moves along the viewing path. With this in mind, we can start to explore time-based image effects. In order to do so, we'll first need to change the geometry of our color reference graphics, to allow all tile color reference sources to be extended into lines, but without those lines crossing and obscuring each other.

After all portions of the cityscape that are not reflectively referenced as source colors from which to construct the fish are removed from the cityscape image, all that remains is the fish image palette, though possibly with duplicate colors. If we remove all duplicate colors, we'll need to re-aim all mirror tiles that referenced the duplicates, to now reference the single instances of those colors. If we then stack these colors in a vertical column, in a series of spectra, sorted by brightness, and then again re-aim all the tiles so that they still retain their reflective reference target colors, the reflectively constructed image still remains intact.

Generally, we can move the fish's reflection reference colors anywhere, into any pattern, either contiguous or widely scattered, and retain the fish image, provided that we maintain each mirror tile/reflection reference correlation, by angle adjustment of the mirror tile angles.

With our fish reference swatches oriented in a line, we can now change the swatches from zero dimension to one dimension or from point to line (or from swatch to stripe). This makes our image viewable from any point along a line. The former viewing "position" will become viewing "area" or viewing "path". To change the viewing spot to a path we just need to spread each color swatch into a horizontal stripe. Let's make these reference stripes 6 feet wide.

Instead of a thin vertical stack of swatch patches we now have a colorful 6 foot wide vertical stripe, made of small horizontal swatch stripes, a series of partial vertical spectra of varying brightness. From the original viewing position we still see the fish reflection, but we can now also move laterally through a long viewing path, and see the fish reflection from any point along that path.

If, however, we move our viewpoint up or down (by stooping slightly, or stretching upward), the image's overall hue will change, as each reflection color will be replaced by its spectrum neighbor. By moving our head further vertical distances, up or down, we can more or less radically alter the hue of the image. The purpose, in this example, of sorting the reflective reference colors in a vertical spectrum was to set up this example of a viewer position interaction effect: vertical movement controls image hue.

We have just expanded the viewing area along the x axis, the horizontal, but expansion of the viewing area is possible along three axes: X, Y and Z, or along any combination of the three. The reciprocal of a viewer's Y or X axis movement, reflected in the source image position, is a simple reversal: a higher viewing perspective corresponds to a lower positioned reference color position. A viewer movement to the left corresponds to a rightward movement of the reference image position. Viewer movement on the Z axis is a bit more complicated, including the fact that the pixel reflection positions move radially, rather than in parallel, in response to Z axis viewer movement. However complex a given viewer movement, this movement traces its reciprocal shape in the reflection reference.

When some or all pixels' color swatches are extended into elaborate stripes and other shapes, to allow them to be visible to viewers moving along elaborate paths geometric allowance are necessary to provide room for these elongated graphics to be printed, without overlapping each other. For example, when we have an image with 100,000 mirror tiles, each with its own reference swatch, and we want each of these reference graphic to be converted from a swatch to a stripe, there will likely not be sufficient room for such a large reference graphic. It would be necessary to, perhaps, compress the color palette of the image to, say, 100 colors, and let all mirror tiles reference these 100 swatches. These 100 swatches could then be converted to stripes. The geometric strategy necessary to change these 100 swatches into stripes could be to stack them, since if they were all packed in a grid, there would be no way to draw most of them out into stripes.

For another example, when a viewer approaches a mirror display, the reflection vectors all move radially away from each other. For an image to remain visible during this viewpoint change one option would be to arrange the reference colors in a circle, so that each swatch can extend outward, following the radial movement of the reflection vectors as the viewing position moves along the Z axis (toward or away from the mirror array).

Our fish image's vertical reference color pattern consists of a stack of 6 foot wide stripes, each stripe corresponding to one or more fish image mirror tiles. Let's fade the stripes to black, from full color at the center of each stripe to full black at each end of each stripe. This results, as apparent to a viewer moving laterally through the viewing area, in a black reflected image gradually fading into a full color fish and then fading back out to black, a simple visual effect apparent only to a moving viewer. The speed of the viewer's movement along the viewing path establishes the speed of the effect. As before, vertical viewer movement adjusts the hue of the fish but, now, in addition, lateral movement scrubs the image along the time line of this fade-in, fade-out transition.

Implementing image transitions on a series of images presented along a gallery wall can lend a cinematic quality to the viewing of what remain still images—an effect category subject to many variations. There are many other and in some cases much more interesting ways to make use of the ability to vary an image over time. Instead of a simple fade-in from black we can, for example, present an animation, though this is a bit more complex than a simple transition. Let's animate the car in our desert scene, let it speed along the highway.

To simplify the implementation of this effect, lets move our desert display into a different environment, one where there are passersby moving at a regular speed, with stable eye height in a spacious hallway (to provide ample space to display reference graphics). Let's therefore put the desert car image mirror array on the wall of an airport terminal walkway, our reference graphics on the opposite wall and our viewers onto a moving sidewalk between.

The reflection reference for the fish image required perhaps a few dozen color swatches, the number of colors in the fish's palette, and these few dozen colors served as references for thousands of mirror pixels. Reduction of the required reference colors by first constraining the color palette and then consolidating the references is a form of "compression". Compression is helpful, and often essential, to reduce the area required for the reference color graphics. Without compression the color reference required by a simple still image, like our fish, would generally be larger than the presentation image, unless the viewing area were severely constrained. With the benefit of compression, the reference color graphic can be much smaller than the fish image, allowing us to add the fade-to-black effect, which would not have been possible without compression. There are many compression methods that can be used to minimize the amount of space required for reflection reference graphics.

Different compression methods apply in different situations. An array of reference stripes for an animation does not compress in the same way as a series of reference swatches for a still image. In a full frame animation, where each pixel changes color over time each pixel's reference stripe will, likely, be unique, which limits the scope for consolidating animation reference stripes as we previously consolidated fish image swatches, where many swatches were duplicates of each other. Compression is essential, however, for our animated version of the desert car scene, since an animation relies on reference stripes, not just swatches, and each stripe must be 50 or 100 (or more) times the size of a swatch (and larger still if we want a long animation, since length of animation correlates to length of stripe). Without compression, we'd need unique reference stripes for several thousand mirror tiles and there typically won't be close to enough reference image display space for this in any display setting. Luckily, for our desert and car animation we can invoke a different compression technique, a form of "delta" compression, combined with already-described consolidation compression.

Delta compression involves identifying portions of an animation that do not change over a series of frames, and instead of repeatedly storing the same image information again and again from frame to frame, simply carrying forward the earlier frame, essentially treating the static portions of animations as still images, reducing the overall amount of data necessary to encode the animations. Animations can also be optimized for delta compression, imposing subtle image changes where possible to invoke more conformance from frame to frame.

Delta compression is possible in this instance because most of the pixels in our car-on-the-desert-highway animation don't change, since the movement of the car involves very few of the pixels in the overall desert image. In other words, our animated image really is a still image, with just a few small animated sections. The non-animated sections of the image consist of pixels that don't change color, and therefore can be consolidated to perhaps 50 color stripes, using the same compression strategy as used with the fish image. We'll have a palette of about 50 desert colors, and therefore need just 50 color reference stripes to construct the static areas of the image. Each section of the image that does animate will need a dedicated reflection reference for each and every pixel, in this instance about 550 stripes in all. These will be located on the opposite wall of the terminal hallway, from approximately 8 to 12 feet high. We thus have plenty of space to display an animation, but only thanks to the benefits of compression.

One additional issue to address is the fact that our animation will be focused. That is, all tile reflections will only be visible, from thin horizontal viewing positions, since the reference graphics themselves will be relatively thin horizontal stripes. The image viewing angle, though very wide, will be vertically narrow. We can vertically fatten these stripes, as space permits, but our viewing angle will remain vertically small. Passersby who are too tall or short will not see the reflected display, since it will be too far above or below their line of sight.

One of many available strategies to address this shortcoming is to stratify the display, split it into 6 different animations, each one directed at a different viewing height. To prepare for this it would be helpful to slightly crop the top and bottom of our image. In our image we see the highway curve into view in the mid-ground and then disappear into a vanishing point in the distance. The animated element is a car that will drive into frame around the curve and then speed into the distance down the highway, becoming a speck. The view of the car on the desert highway is already wide and short, and now we'll crop out some of the sky, and some of the foreground, resulting in an even shorter aspect ratio image, similar to a movie screen rectangle. We can now stack 4 duplicates of our scene on top of each other. The lowest iteration of the scene will be reflected toward the shortest viewers and the highest one will be directed toward the tallest viewers (Though this correlation is arbitrary. Each of the 4 iterations of the scene can be directed at any height). Each instance of the animation will only be visible from one of these narrow viewing heights, but most viewers (except the very, very short and the very, very tall) will be able to view at one or another of these viewing bands, by stretching up taller or slightly lowering their heads.

As mentioned, this animation's reflection graphic will consist of two types of reference stripes; consolidated palette stripes, referenced by the non-animating sections of the image, and one-to-one, pixel-to-stripe, references, for the animated sections. The palette-consolidated reference stripes, pertaining to the static sections of the image, will be spectrum sorted as were the fish reference colors. This will allow vertical viewer movement to control image hue, as with the fish image. An out-of-hue version of the desert scene will be visible from above or below the target viewing height ranges. It will thus tend to be readily discoverable, due to viewers' natural small body movements, that these reflection displays are interactive with regard to vertical movement hue adjustment. Once this is noticed, it will readily be discovered that there is a correct-hue viewing height. Interactive hue adjustment will act as a viewer position height "tuning in" method. The reflections of the animated sections of the image will still have narrow viewing height tolerance, but with brief experimentation, as encouraged by the interactive color effects, the animations will be discovered and easily watched in true color, through the most convenient horizontal viewing window for different height viewers.

Each of the 4 iterations of the car animation can be identical, but since they are directed to different audiences it might be useful to differentiate them. We can incorporate a different text message into each one, for example. For the animation directed to the lowest viewing height, we can provide a message targeted at a younger audience. For the middle height animations, we can present a message biased to women's interests. For the tallest viewing audience, we can provide a message biased toward men's interests.

We can also readily add custom graphical embellishments to each instance of the animation. We already have a palette of about 50 colors to draw upon, and we can use this palette to freely rework the static sections of the image, doing anything from adding a grazing animal to the landscape, a cabin, etc., as long as the new objects are constructed using the existing palette colors. We can, equally, rework the entire landscape, as long as we leave the animated highway sections unchanged and also work within the existing palette. We can optionally enhance the available palette, beyond the palette native to the original desert scene, allowing additional changes to the scenery. For example, if we add a range of green reference colors to the opposite wall we'll be able to add trees to the landscape. Whatever changes are made we can't, at the same time, change the section of the scene where the car is animated. All of the pixels involved in the animated sections of the image are hard-wired, one-to-one pixel-to-stripe references, since each pixel in the animated section is unique over time.

Since we've achieved good compression, and reduced the reference graphics requirements by using delta compression in conjunction with palette reference consolidation for the static sections of the graphic, we have made it possible to accommodate longer reference stripes, allowing the presentation of a much longer animation than otherwise would have been possible. Our final animation is thus several seconds long, correlating nicely to the length of time between the mirror grid coming into convenient view, remaining in view for several yards of viewing time, and then passing out of view, the passerby on the moving sidewalk having comfortably watched the entire animation.

Angled mirror tile compared to pixel Though a mirror tile shares the basic pixel nature of being a "picture element", it is functionally different in several respect, beyond being lit by reflected light instead of by emitted light. Those differences between pixel and mirror tile include:

I. reflective: A pixel is active, emitting light, while a mirror tile is passive, reflecting light, though it can optionally be active in the sense of being dynamically targeted, motorized, or can reference an active source such as an interactively or otherwise dynamically controlled computer display. It can even "shine" light, like a pixel, but only when, still, reflectively referencing a light source, in a array partially or wholly based on radiant light source reflection references.

II. not just pure color: A mirror tile's referenced color source can be a pattern, static or moving, and that pattern can present unusual pixel features such as lateral movement and other texture source manifestations, especially when several contiguous mirror tiles target patterned color sources, either static or moving.

III. free form and varying parameters: Mirror tile pixels can be of arbitrary shape and size, color space, number of sub-pixels—and these parameters can vary freely within a given display.

IV. RGB-based, or based on any other component color scheme: A pixel in a computer display is typically composed of primary color sub-pixels (RG and B), whose proportional intensity gives the display's full color gamut. Any color can be a native primary for a mirror tile, precluding the absolute need for sub-pixels. In other words, the primary colors for a mirror tile display can be 10,000 distinct colors, precluding the need to mix colors using sub-pixels. Equally, mirror tile displays can use sub-pixels based on any alternative to RGB, like CMYK, or any other custom collection of colors optimized to mix the shades necessary for a given display image.

V. Interactive: Mirror tile reflection sources can be the image viewer him or herself. Coloration and even the shape of a presentation image can be directly interactive in this way.

VI. display manipulated by viewer movement: The presentation image can be a static image that does not change in response to viewer movement, but there are also several types of animated and active mirror tile displays that are animated or visually adjustable in various ways and these image changes can be a function of viewer movement. Typically image manipulation is invoked by viewer movement along the presentation image's viewing path, and this manipulation is most often the control of image animation. Other image manipulation can be more subtle than wholesale body movement on the part of the viewer. For example, a display can be configured so that a simple turn of the viewer's head, while maintaining gaze on the display, will manipulate the image. (This is possible because the eyes are closer with respect to a display when the head is turned, and a display can be configured so that the differential between the left and right eye images is changed then the distance between the eyes is changed). In other embodiments the position and shape of the viewers body in reflection, or the raised or lowered or other positioning of his arms can reflect as dramatic differences in or adjustments to the display.

VII. freely configurable viewing angle: Mirror tile viewing angle is very configurable, to any shape and size. Viewing angle can be very tight, or very wide and even broken into several different view areas, each with its own viewing angle. Tight viewing angle displays can be advantageous for privacy and security applications, for example, and wide angle displays for inclusiveness in viewing not possible with some other types of image displays.

VIII. unconstrained size: Mirror tiles can be infinitesimally small, supporting extremely high resolution images, and can also be constructed of very large elements, at very large scale.

A key feature of a mirror tile is that its color is physically separated from it. The angle of a mirror tile is, essentially, its color setting and that is all that ties it to its color. The mirror tile being abstracted away from its chief attribute, its color, gives rise to one of its chief abilities, the image transformations that can be performed by a mirror tile array, which can be compared to mathematical matrix transformations, versatile and useful beyond specific image extractions, extending to general purpose image effects. The versatility of the possible transformations multiplies further in specialty embodiments when mirror tiles reference further mirror tiles, or reference programmatically controlled graphics, or are under mechanical control or are otherwise articulated.

There are a wide range of reflective pixel coloration attributes that have no corollary in standard pixels. For example, mirror tiles that reference moving sources can invoke an array of effects from moving sources that have no meaning in regard to typical pixels. For example, contiguous mirror tiles targeting the same moving textured color source (like the leaves of a tree), but with slightly offset angles, will present a wave effect, based on random movements of the reflected moving texture.

While the pixels in an LCD display may have a viewing angle of perhaps 66 degrees, the viewing angle of a mirror tile display can be less than 1 degree (or over 150 degrees, or any angle in between). As noted above, there can be multiple separate images displayed at the same time, each with different viewing angles. This is all controlled by the size and positioning of the reflection graphics, as the size and shape of the reflection source of a mirror tile or of a mirror tile display establish the viewing angles of the images made of those mirror tiles.

"Reflective Construct", "Reflection Translation Grid", "Reflection Reference Graphic"

One generic phrase for images presented by mirror components is "reflective construct". The mirror tile array might be referred to as a "reflection translation grid", especially when it uses a specific image as the color source for constructing another image, though also when an environmental array of colors is "translated" into any image or effect. Any color source array of any type can be referred to as a "reflection reference". These are three core functional elements of the present invention. "Reflective translation" refers to the action of an angled mirror array, as it takes as input a given color array and freely translates (moves from one x-y position to another) as its output any elements of the input.

In the city scene example above, the city scene is "reflectively translated" into a fish image. A reflection reference need not however be a recognizable image. It can be an abstract graphic or physical construction, or be no image at all. It can, for example, simply be an unconnected constellation of ambient colors, and textures, including moving textures and environmental shades that change over time, with those changes incorporated into the constructed image so that sections of the constructed image can dynamically change over time in concert with the environment. A daily changing color, moving from light to shadow over the course of a day, can become the reflection source for a similarly changing element in a presentation image.

For certain displays, the reflection reference must be an abstract image, such as when the reflection grid is already set and is then re-purposed to display a new image, an image different from the one upon which the reflection grid was originally based. Given a preset grid, with no option to re-angle the tiles, all image configuration must be done in the reference image. To obtain a reference image that will display a photo of, for example, the album cover of "Dark Side of the Moon" (a prism splitting a light beam into a spectrum, on a black background) through a pre-set reflection grid, that image (this album cover) must be projected backwards through the given reflection grid, and the resulting pattern must then be mounted as the display image reflection source. When a desired display image is backward projected in this way, "encoded" in one sense, or bi-directionally mapped, through a pre-set mirror array, that mirror array becomes the key to then decode the encoded image. The mirror array-encoded version of this album cover image will be an abstract mass of mostly black, along with splashes of white and the various deeps hues of the spectrum scattered around. Looked at through the mirror array it will, of course, appear as the original album cover image.

System Concepts

Composite Mirror Tiles and Mirror Tile Shape

Pixels in a computer display are typically a composite of RGB primary colors, with each component's brightness at a proportion of its maximum, to mix all colors across the gamut. Reflective color pixels can also be composite in this way, though with much more latitude with respect to color space. For example, a mirror tile pixel can be constructed according to any desired color space, whether RGB, CMYK (Cyan, Magenta, Yellow, Black) or any arbitrary or hybrid color spaces, with any number of component pixels, provided simply that corresponding reflection sources are provided. A reflection source for an RGB mirror tile display, that provides all shades each of RG and B, could be simply 3 gradients, one for each primary color. Same for a 4-component CMYK pixel. Same for any other primary color configuration. A standard RGB display has ⅓ the resolution of an identical display that could alternatively display full color with each pixel component. A mirror tile display that relies upon component mirror tiles, for one reason or another, will in some cases suffer the same reduction of resolution. In other cases, however, depending on manufacturing constraints, component pixels can be grouped using geometries that don't reduce apparent resolution as much as would be the case with pixel components rigidly constrained to a grid. First, mirror tiles can often simply be made much smaller than pixels. Since there are no mechanical parts in a reflective pixel they can in fact be almost arbitrarily miniaturized, limited only by the wavelength they are reflecting. Secondly, alternative pixel and sub-pixel shapes can maximize display sharpness, such as by using mirror tile shapes that conform to the details of the image. Aliasing of diagonal lines in traditional pixel displays can be avoided in many cases in mirror tile displays by orienting the mirrors at the same angle as the diagonal line. In addition, both the number of mirror tile sub-pixels and mirror tile size can be varied and optimized on a mirror tile by mirror tile basis across the display. For example, if a given pixel is yellow in an RBG-based display, only the R and G sub-pixels are necessary, though the math is somewhat complicated for how such a pixel's size should be adjusted in relation to other pixels which may have different sub-pixels and shape and size variations. In general, there are distinct advantages in the malleability of mirror tile size, mirror tile shape and mirror tile component color scheme and the other customizable characteristics of mirror tile displays.

Mirror tile pixels can be any shape, including any regular shape or any arbitrary combination of regular and irregular shapes. Typical reflective tile array displays may use square mirror tile, for manufacturing convenience, or use triangular mirror tiles, for targeting convenience when targeting is controlled by controlling the position of each corner of each mirror tile (three control points being minimally necessary to establish each mirror tile angle when angling in any direction), depending on the targeting mechanism. Mirror tiles can be custom designed based on the content of a given image with regard also for the different properties of different reflection source types (textured, solid color, gradient, etc.). Different mirror tile shapes can be used to enhance different image elements, in creative and synergistic ways: wide and flat mirror tiles for a distant lake surface, tall and thin mirror tiles for a grass field, a concentration of vary small mirror tiles for an area of detail—almost endless combinations of shape, size and other mirror tile parameter combinations in relation to different image content. For best reflective performance and simplified geometry and other reasons, front surface mirrors are the preferred mirror type.

Standardized Grid Angle Patterns

To derive a specific image from a pre-set graphics source, a custom mirror array is required. If the graphics source is, instead, configurable, then the mirror array angle pattern can be any pre-set pattern, whether a pattern required by another graphics source/presentation image combination or, a standardized angle pattern. There are several benefits to standardized angle pattern mirror tile arrays, including:

Regular mirror array patterns require that the source graphic also conform to a regular pattern, which may be in some instances a desirable form for the source graphics. When several regular arrays and their regularized source patterns are seen in sequence, a pattern will be evident, which could be aesthetically desirable.

A simple example basis for a regular pattern is to divide the reference graphic area into eight equal sections and allot the first eight mirror tiles in the image to the first position of each of the eight reference image sections. Allot the next eight mirror tiles to the last position of each of the eight reference image sections. Allot the next eight to the second position, allot the next eight to the second to last, and repeat until each mirror tile is assigned. This will result in a reference image pattern in the form of eight roughly similar sections, with each section either unrecognizable or characteristically distorted. Or, depending on the image, the 8 sections may be recognizable, though characteristically distorted, as may be desired for the given display situation. Any of a multitude of mappings of mirror array to graphic reference are possible, with many potential purposes and possible visual effects.

The graphical characteristics of the color reference is subject to great variability, initially due to the interplay of the given mirror array for which the graphic is encoded for display and the nature or content of the graphic itself. If the goal in a given situation is to render the color reference unidentifiable as a color reference or unidentifiable as a reference for the given display image, it is possible to set up the mirror array translation pattern so as to maximize the distortion and rearrangement of the display image. Some mirror array patterns will distort one image, but leave another quite recognizable. For instance, the source image for a sky with clouds might be hard to disguise as being a source graphic for said image. The way to render it unrecognizable in source form might actually be to reverse encode it into ordered blocks of white and grey and blue. Or, by virtue of a specific mirror pattern, the image color elements could be encoded into recognizable text: "these are not clouds", written white on blue, with a grey text shadow. If the mirror array for the reference graphic encode of the sky image were not to later be used to display other images, then image-specific high color compression could be used, in which just the few dozen blues and greys necessary for this image will be printed as the color reference, reducing the size of the color reference and requiring many mirrors to share color reflection references with many other mirrors. This sharing of color references by multiple mirrors is a complication in reusing the array to display other images, since other images will not have the same shared mirror color patterns, won't have the same areas of like color. The way around this is to set up the geometry of any additional image display that uses this same mirror array in a different geometry between the viewer, array and color reference, such that mirror reflection sources that coincided in the original image display geometry do not also coincide in the second instance. This is easy to achieve on a case by case, mirror by mirror basis, by changing the distance and angle of the display elements. If two mirror reflection vectors converge at the same color source from 10 feet away, in the first display, they won't converge in the second display, which is t 14 feet away. But, to track all convergences of multiple mirrors among two or more arrays is very complex, and so would typically be calculated by computer, by varying the several relevant parameters, primarily the geometric placement of the source graphics, the viewing position (if also an open variable in the given situation) and the mirror tile translation setup for each display.

A regular mirror array angle pattern can perform a useful general purpose effect when it is reflecting images or scenery other than the display's primary target. For example a regular pattern might invoke generic wave-like distortions, from outside the viewing area, due to their mirror angles varying slightly according to a sine function, on top of the primary function to translate each source presentation pixel according to some pattern.

Regular mirror array patterns can be mass produced.

Regular mirror array patterns may be the only patterns able to present certain effects, for example those that require that all source mirror tiles line up in order to reference pixels in specific regular order.

Regular patterns can be paired with easy-to-use image encoding routines, making it easier to produce mirror tile displays.

Palette Constellation

Some mirror tile displays are based on a pre-existing environmental array of colors—the local ambient palette—and some are based on colors designed and deployed as a custom source graphic to support a given effect. In all cases the mirror tile display source graphics are, generically, a constellation of colors, a spatial array of colors, each color located at a unique angle coordinate, from the point of view of the mirror tile mirror array. The list of all colors that exist in the given location can be used as a reference for setting the angle of each mirror, so as to reflect, to any given position, and given color. This list, the basic reference for coloring, that is "angle-setting", a given array, minimally consists of a table of colors and their angle location. Other features or attributes of the colors in the list can also be included, such as the time of day of the availability of each given color, and many other changing characteristics. These other features are useful in composing different types of mirror array images and effects, which can take artistic or informational other advantage of the additional attributes, to enhance or interplay with the content of the given display.

The color angle of a given color, as listed in the palette, actually varies with the position of the given mirror tile. A mirror tile in the top right of an array will need a different angle setting in order to reference the same color as a mirror tile on the opposite side of the array. The angle listed in the palette may be the angle from the perspective of a point at the center of the mirror array, or at the top-left mirror tile, and from this baseline angle the angle applicable to all other mirror tiles would be derived. The angle variation across the array will be greater or smaller in proportion to the distance of the given color source to the array, so the distance to the color source must also be known in order to calculate the reference angle across the display.

Ambient Palette

Distinct from the many engineered color reference varieties, which are designed and deployed in conjunction with a mirror array, there are mirror tile displays that rely upon no designed reference graphics. These arrays use as their reflection references the existing colors in the given environment, the "ambient" colors. An ambient color is any color which is native to the surrounding environment and which is reflectable from the viewing location of a mirror array. The ambient palette is compiled by sensing the available colors, usually with calibrated camera equipment, and listing these colors and their positions in the environment. When designing an ambient colors mirror tile display for a given location the colors available for that display are given in the ambient palette. Any desired display image must first be qualified as possible in the given environment, based on whether the necessary colors are available in the ambient palette. Any image can be constructed, as long as it can be color mapped to the available ambient color set. A given location and its characteristic available color set will allow true color display of images that share the same color set. A city setting will provide a color set suitable for presenting other similar city scenes and, may equally allow the presentation of a renaissance era portrait that utilizes a similar color set of browns, grays and blues. When necessary, or desired, to present an image with color requirements beyond those natively available, additional reference colors can be deployed to enhance the existing ambient palette.

The first step in specifying graphics that will rely upon a given ambient palette, is to measure that palette, to register it, that is, and construct the local ambient palette, to determine the available color set, and the angle position of each color. This information is later used to set the angles of the tiles in the mirror array, to produce any display image to later be configured for that location. There are various techniques for doing sensing the available colors and the angle locations. General purpose color position registration can be done with a relatively simple digital camera setup, using a fisheye lens or lens wide enough to see in one image the full intended reflection reference field. That camera's lens has to be calibrated to accurately correlate all pixels to an angle with respect to the display to later be configured. When there is distance variation among the color sources then multiple images from at least the corners of the mirror grid need to be taken, to register the change in angle of each color, and the potential disappearance or obscuring of a color source, due to parallax across the display.

In an environment with any anticipated movement or gradual color changes, multiple sensing shots may need to be taken over time when registering the palette. Color patches that do not persist may not, with respect to certain standard display types, be used as reference colors. More detailed palette listings can register such scenery changes, and generate specialty palette entries that include a color source's change over different time periods. For example, if in a given color reference area the color consistently changes between green and blue, this could be a useful color patch for many images. (Leaves on a tree sometimes obscuring the sky might provide a reference patch that would change color in this way). This color source angle location would be logged as a dynamic color, registered for its various dynamic qualities. One of those qualities would be its relatively high frequency of change. An area in an outdoor scene which for part of the day were in shadow and part of the day were outside of shadow would also be registered as a dynamic source, but with a much lower frequency of color change. One use for shadow changing reference colors is the construction of shadow-changing elements in a scene. There are numerous other possible uses of this and other types of dynamic reference colors to lend dynamism and depth to otherwise still images, and tie the content of a mirror tile image to changes in the local environment.

Wide Field Vs. Narrow Field Color Reference

When a given mirror tile is targeted to a small color source, then the viewing angle is small. A large color source gives a large viewing field. A given image can be viewable from only a very narrow viewing area, so narrow in fact that it is only feasible to view it through an aperture, or some other constraint. A display can be very wide field, using the entire sky for example, as a blue reference source, a wide lawn of grass as the green source, and thus present a display viewable from a very wide viewing angle. Wide-angle indoor displays are equally feasible, for example by placing the reference colors very close to the mirror grid in order to maximize viewing angle, or by resorting to lensing effects to optimize viewing angle and reference graphic size requirements.

In non-composite mirror tiles, the viewing field is set by the size and shape of each mirror tile's color reference shape. Individual mirror tiles and sections of an array can readily have different viewing field sizes. In a display using composite mirror tiles, the viewing field size does not, generally, vary mirror tile by mirror tile since, generally, in a composite configuration all mirror tile's sub-components reference the same primary color sources, and thus share the same viewing field size parameters. A given display can use some direct color mirror tiles and some composite mirror tiles, combining them freely.

Multiple Viewing Angles, Images and Image Types in a Single Display

A single mirror tile display can include wide field color references in some parts of a given image along with narrow field references in other parts of the image. For example, the source colors of different buildings in a scene can be targeted to a range of narrow and mid-sized color sources, while the sky of the same scene could target a very wide field gradient source, resulting in an image that on approach appears just to be a sky, but in which on further approach some buildings would appear and on further approach additional buildings would appear, if their viewing angle were different and the default color, say blue perhaps, were present in the wider reference field when the building colors were not present. The appearance of the reference graphic for a single mirror tile in such an image might vaguely resemble a Venn diagram where a field of blue contained one or more sections of grays (bldg. colors). Other mirror tiles in the same image would contain different Venn-like patterns, corresponding to their pattern of change from different viewing positions. Single images can thus be complexly modular and contain sections and elements that are visible or not depending upon viewer location.

Single Display, Multiple Different Images

There can also be several different viewing areas in a given mirror tile display, several coincident viewing positions from which different viewers can see entirely different images while looking at the same mirror grid. Obviously, a standard mirror has this same property, allowing different viewers to see different images at the same time, from different viewing positions. Among the novel properties of a mirror tile display, by contrast with a standard mirror, is how the mirror tile display can present entirely different reflected images to the different viewers—a sunset, a cat, an x-ray, a tree, a cityscape, a blueprint—all displayed at the same time and without any of the viewers knowing what any of the other viewers are seeing. These images can, in addition, be displayed at the same time that animations and other unique mirror tile effects are displayed to other viewers.

Reference Color/Viewing Area Shape

The size of a color reference can be regular, an exact circle or square, which is typically the shape of the referring mirror tile, and is therefore a minimal shape for filling that mirror tile with color. A color reference can also be irregularly shaped, for many reasons, and in many useful ways. For a simple example, wide but vertically thin reference graphics allow an image to be viewed from a wide lateral range, but a limited vertical range. Similarly, for viewers descending an escalator a diagonally extended reference graphics, and thus a diagonally extended viewing area, would be appropriate, to allow the display to be viewed for the duration of the diagonally moving escalator ride. From an area within which viewers have freedom of movement in all directions on a floor, a asterisk shaped reference source would allow viewers to move among an asterisk-shaped viewing area, so that they can see image color changes, manipulations and effects alternatingly presented as they move so that all mirror tile's reflection references move among the various arms of the asterisk reference shape shared by all mirror tiles. Multidimensional effects can be implemented this way, or different animations can be encoded along the different arms of the asterisk-shaped viewing field. There is no way to describe all the possible reasons and strategies for constraining or shaping the viewing area, but the basic principles can be outlined. Obviously, the size of the available reference graphics display area plays a role in designing the scope of viewing area, and in many if not most instances compression strategies will be required.

A reference graphic can actually be arbitrarily long, say down a long hallway, and an animation thus be minutes in length, or longer. A mirror array corresponding to such a long reference might be rather expensive, unless it were a regular pattern mirror, cheaply stamped out and embedded in flooring. Another strategy for viewing extended reference graphics is, instead of an equally extended mirror array, using a small but moving mirror array moving in tandem with the viewer, such as an array embedded in the moving handrail of a moving sidewalk.

The viewing area when indicated by, for example, a mark on the floor, should be understood to be typically a bulbous shape centered at average eye level, from within which one can see the reflected image. Often the shape of a viewing area is roughly spherical or, as in the case of simple animated displays, shaped like a long thin balloon, somewhat pancaked. Complex branched, curved, angled, overlapped and compartmentalized viewing areas are also possible. Viewing area size is freely variable in all three dimensions, X, Y and Z—Z being distance from the display. In addition, the viewed image may degrade differently as the viewer moves out of the viewing area in different directions. The way that a mirror tile array image degrades, de-coheres or disappears as a viewer moves outside the focal area is explored elsewhere, along with considerations for different methods for helping viewers locate and stay within the viewing area of a mirror tile array display, sometimes as signaled by the way the image is designed to degrade as it begins to pass out of view.

Binocular Reflection Sources

In narrow-view displays each eye needs its own reference swatch for each mirror tile. If the distance between the eyes is about 2.5 inches, then a one-inch reference swatch could only be seen by one eye (the reference swatches in this example are the same distance from the mirror as the mirror is from the viewer, to keep the apparent size equal, for this simple example, and the mirror size is a bit smaller than pupil size). Another swatch would be needed 2.5 inches away (on center) to reflect a color to the other eye. Every mirror tile can therefore show a different color, potentially, to each eye. The whole mirror tile display can, likewise, shows a different overall image, potentially, to each eye. While the left eye can be shown a pelican and the right eye a potato, though of course there are many much more interesting and useful complementary image pairs. 3D stereo pairs can be shown, for example. A 3D image can also be animated along a timeline, perhaps rotated, or even shown along 2 (or more) time axes, where the horizontal axis encodes rotated views of the object and the vertical axis encodes another manipulation.

There are binocular implications when presenting animations. In the case of a horizontal animation the two eyes will see the reference graphic at slightly different points in time. There are various ways to deal with this, including in some cases the need to avoid horizontal animations, instead limiting certain types of animations to diagonal and vertical situations, thus allowing a separate reference stripe for each eye, instead of the same refer reference at a slight time offset. Certain types of animations based on horizontal reference graphics can take benefit from the eyes seeing temporally offset images, presenting 3D animations that synchronize the offset to the scene's parallax offset, giving a realistic stereo 3D effect without needing separate images for each eye, though this is a specialty case.

The binocular issue is a reference graphic complication even for still images, and there are several methods for dealing with it, one such method is to arrange the palette in horizontal gradients within which reflection targets are averaged between the eyes, in that each eye's reflection spot is just to the side of each other, and the apparent color becomes the average of the two colors seen by each eye. Though binocularity can be a complication in the design of mirror tile displays, it can also be a great advantage. Narrow view-field mirror tile array displays can present different images to both eyes, thus supporting 3D still images, 3D animations and interactive effects and other often unusual binocular vision effects.

The Nature of Designed Reference Graphics

A designed reflection source can be a printed image or a 3D object, can be a recognizable image or object, a lake or a building, or an abstract designed object (a sculptural object, with the necessary color attributes), can be a light source or a dynamically changing object or screen display. Some reference color sets are partially ambient and partially designed. For a simple example, a given reflection environment may provide virtually all colors necessary for full color images except certain shades of bright green. A tree placed into this reflection environment is, essentially, a designed reflection source, one that in this case enables the reflection grid to construct full color images, where it previously could not, absent any source of the primary color green.

Designed reference graphics are often abstract images, basically a presentation image, effect or animation encoded by a mirror array into an unrecognizable jumble of colors, to be decoded by the mirror array upon viewing. In many cases the reference graphic will be very prominent and visible and must thus be presentable, interesting, decorative if not outright attractive in its own right. When designing a given mirror grid array and the reference graphic to support a given display effect, there is typically great latitude in the possible tile angle patterns and, thus, the reference graphic configuration. The way the presentation image encodes a mirror tile display thus often allows exercise of aesthetic control over various reference graphic options, to make the reference graphic interesting, decorative and attractive or to conform it to the shape and location of the various available reference graphic locations. The objective for a given display may be to make the reference graphics minimally obtrusive, and this can be done for example sometimes by constraining them to rectangular areas, the peripheries of wall sections, confined to a few feet near the tops of walls, for example. Other options for shaping the reference graphics include emulating the style of certain art media or certain artistic styles. As previously noted, real images can be used as reference graphics, such as a series of familiar paintings, photos, subway maps, advertisement placards, or any images that happens to be a super-set of the colors needed for the presentation images, but such reference images typically have only small color patches, and therefore small viewing areas. To present images to wider view, expansive ambient color sources or specifically placed colors would typically be used.

Mirror Tile Array Display Angle Pattern Types

There are 3 general types of mirror tile array angle patterns: 1) randomly angled, 2) regularly patterned, 3) derived from a given presentation image and reference pattern combination.

1) Randomly Angled Arrays:

The tiles in a mirror tile array can be randomly angled, perhaps constrained to within a certain angle range, but still random within that range. One reason for a randomly angled array is so that when the grid is seen from outside of the viewing area, when random objects are reflected, the array will not display any image artifacts, will seem unremarkable and unobtrusive.

Another purpose of randomized tile angles is so that when pedestrians pass in front of and interrupt the display, as is possible in some settings, the degradation of the image is randomly distributed, rather than causing an absolute interruption of parts of the image.

There are also different types of randomness, with different properties desirable in different situations. For example, randomness may be constrained so that no two neighboring mirror tiles may reference neighboring swatches. Or randomness may be combined with order, such as when each successive row of mirror tiles is constrained to reference a color in the upper half or the lower half of the reference palette, but reference a random swatch according to these or other constraints. This would result in a tendency to display subtle stripes, a kind of a secondary texture behind the explicit image, even when random color sources are reflected.

2) Regularly Patterned Arrays

This is a very wide category, with many different types of regular patterns with different useful properties. One of the motivations for using regular patterns is to provide an attractive reflection when a display is seen from a perspective from which the engineered color source cannot be seen. Another motivation for regular color patterns is to simplify development or manufacture of displays, allowing various standard displays to be based on mass produced mirror arrays and easily developed or deployed reference patterns. For example, one regular pattern may provide that reference graphics are constrained is a way that is useful for a certain printing pattern, such as in that it refers to a graphic reference pattern which is constrained to 14 inch stripes. Various regular patterns can be designed for displaying animations, in that they distribute their reflection reference to a stripe pattern, as necessary for animation.

3) Arrays Derived from a Given Reference Pattern or Presentation Image or Effect:

When a coherent image or an ambient environment is used as a source, the angle pattern for a presentation image that draws on that pattern may seem random, but is not actually random. It is a function of the source image and the presentation image, though with some variability since colors can often be sourced from any number of different parts of the reference image. As already noted, a mirror angle pattern derived from a given source image/display image pair can still display a new presentation image, provided that a source image is designed based on the presentation image as encoded by the existing angle pattern.

Animation & Relative Motion

Mirror tile array animations typically require that the viewer be in relative motion with respect to the reflection grid or the reference graphic. Mirror tile array animation invoked by viewer movement, as compared to animation invoked by movement of the mirror array or of the reference graphic, has the advantage of allowing the viewer to directly control the animation. Though there are advantages, in many cases, to user actuated animation, there are other situations that can't rely on user movement based animation, and relative movement must be invoked by movement either of the array or the reference graphic. In cases where accurate regular movement is the priority for a given display viewer movement-based animation may not be the best method. In these cases the viewer and the mirror may be stationary while a reference graphic is mechanically moved in relationship to them, at a fixed speed, to present a constant-speed animation. Similarly, when reference graphics are highly compressed, the control of the indexing (movement of the array of mirror tile reflections through the reference graphics) must be much more precise and again may need to be mechanically controlled.

Focused Mirror Tiles

Curved mirror tile surfaces and other methods can be used to focus mirror tiles toward size-reduced reference graphics, as a form of reference graphic compression. One alternative focusing method is to interpose a concave reflective surface between the mirror tiles and their reference graphics. Both of these methods allow effectively much larger reference graphics, resulting in viewing areas and effect durations much larger and greater than otherwise possible. The optical precision of a focusing reflector for all mirror tiles need not be great, and can actually be rather crude, since the specific shape of the curve can be measured and accommodated for in the shape of the reference graphic. When mirror tiles are focused onto smaller spaces and smaller reference graphics, those graphics must be more brightly lit, in relation to the amount of compression.

Refractive, Instead of Reflective Tiles

A window can be configured with a refractive mirror tile array that translates a given outdoor scene into any arbitrary other image (as long at it uses a palette subset of the existing scene). A series of windows can thus present a gallery of different images all mirror array-derived from one existing outdoor tableau. If the existing scene is a cityscape, then areas of the street will be registered in the mirror tile palette as dynamic color sources, and these can be used as active elements in entirely different types of images—a series of several different mountain scenes, for example, refractively translated from a city scene, where the passing colored cars can be flowers moving in a field of grass.

Mirror tile eyeglasses can be constructed for various specialty effects, such as reading hidden images in a specially prepared book or interacting with computer-based 3D displays, using the same binocular image separation techniques as described for reflective displays.

Re-Referenced Mirror Tiles

In many installation sites there won't be enough opposite wall space to accommodate all the reference graphics required for a desired image or effect. Reference graphic space can be greatly increased by re-referencing some mirror tiles back to the same wall upon which the mirror tile array is mounted, or to other available wall space not line-of-sight from the mirror tile array. Assume a mirror tile display that requires 100 reference swatches, but is mounted facing a wall that only accommodates 60 swatches. The remaining 40 swatches can all be pointed at a single mirror swatch, hung among the 60 standard color swatches, and these 40 swatches are thus then re-referenced back to points on the mirror tile array's own wall, or even a wall out of sight of both the array and the viewer of the array. The reference graphics increases and, along with it, the potential image complexity and display siting options.

With precise re-referencing mirror tiles, all source graphics of an array can be radically abstracted away from the mirror tile array site, down hallways to walls not visible from the image viewing location, to various points half a mile across a city park, within sight but too small to readily discern as associated with the presentation image.

Self Contained Mirror Array and Graphics

In one embodiment of the invention that utilizes re-referenced mirror tiles the source images can be integrated into a wide frame around the mirror array itself. In this type of self-contained mirror tile display, the mounting of the display is simpler than in other embodiments, in that only a mirror need be mounted opposite, to reference all the mirror tiles back to the frame-resident reference graphics and thus invoke the mirror tile display. This would, however, be a narrow viewing range display.

Effects

Texture Reference Effects

When a series of contiguous pixels reference a moving texture, such as tree leaves or water ripples, those mirror tiles will not be solidly colored, but slightly moving or shimmering, as each mirror tile's color reference source area is in motion and each mirror tile's content moves perhaps in a constant direction, as when referencing flowing water that moves in one consistent direction, or a random direction, as when referencing leaves on a tree, which might be moving one way or the other. Interesting effects can be invoked by relatively offsetting the reference angle one mirror tile to the next, so that even random source texture movements will register as coherent waves or other patterns, instead of as random activity. Different relative offset patterns give different effects not present in the referenced object. For example, a gradually increasing offset will result in a wave washing across the neighboring mirror tiles at a changing speed.

Color Offset and Gradient References

There is a wide range of color mixing techniques possible when referencing the transition or border between two or more color patches. In display situations with high angle targeting accuracy, and a stabilized viewing position, color swatch offset targeting can be used to greatly increase the number of available colors. For example, if a blue swatch borders a red swatch, targeting this border effectively gives a purple mirror tile. When very high accuracy is possible, multiple shades of purple can be targeted, by targeting different percentage splits of the two (or more) bordering colors. In order to reference 256 shades of grey, for a high-fidelity greyscale image, it might normally be necessary to deploy 256 color swatches, requiring perhaps an 16×16 inch area (for a narrow view display). Alternatively, a 1×2 inch area could afford a larger, effectively continuous palette of grays, when using offset color referencing. A black swatch next to a white swatch provides a full grey scale tone map, as any percentage of grey from white to black is available by targeting one or the other swatches, or any point between the two. In many cases this level of precision is not possible, but adjustments on this strategy can be made to accord with the available level of mirror targeting precision.

When color offset targeting accuracy fails, the display color drifts to one or the other source colors. In cases where this potentially can happen the problem can be moderated by balancing identical offsets in reverse polarity, so that slight movement will not affect the combined color balance.

In many mirror tile display viewing situations, viewer positioning accuracy is more accurate in one dimension. The color border targeting effect can often only be used in this dimension and to accommodate this the palette can be constructed so that useful color mixing borders are along this dimension. In other ways as well, such as by carefully pairing useful mix colors, offset color mixing advantages can be greatly optimized by the geometry of the color swatch pattern, especially as pertains to the color needs of a given image. Offsets are not limited to just two colors.

Color gradient references can also be used in place of one-to-one mirror tile-to swatch references. Although a mirror tile that references a point on a gradient is not going to present a solid color, if the gradient is gradual enough then the visual result may effectively be a solid color. There are, in addition, various graphic effects enabled by gradient references, such as simple overall interactive brightening/darkening or hue adjustment of an image, and differential adjustability of certain parts of an image, when just some parts of an image are constructed of gradient references.

Viewer Positioning Indicators

Mirror tile array displays can be situated so that the viewing position is in the natural path of the viewer, and the viewer need not adjust his position or movement in any way in order to see the image or effect. In other cases the encounter with the display is entirely under the control of discretionary movement and positioning by the viewer. In these case the viewer may need to be cued as to the existence of a mirror tile display, the proper direction from which to enter it, if there is a directionality to the viewing path, and cued to movement options once within the viewing area.

Once within the viewing area the viewer's positioning options may be simple, as for a still image display where the only requirement upon the viewer is to maintain position within the viewing area in order to retain the image in view. Or, the positioning options may be complex, as for a long, branched and stratified animation, where the progression of images and effects is dependent on complex movement alternatives on the part of the viewer. Other complexities arise when a viewer sees one of several possible unconnected images of a given display, and might need to be directed as to the existence of and position of the various other viewable images.

For someone not yet viewing a display there are several ways to cue the proper approach to the display, and for those already viewing the display there are various ways to indicate the boundaries and viewing options within the display. Some of these indicators, such as marks on the floor, are useful as indicators for viewers both inside and outside the viewing area. Some only apply only within the display area, such as image effects and messages and arrows encoded into the image. Here are some examples of viewer position indicators:

Floor Markings:

A spot with an arrow is easily understood to mean "stand here and look over there". For animated displays an arrowed line can be designed to be almost equally intuitive. For high traffic areas along long hallways and other pedestrian situations the interplay of floor markings and available mirror tile array views can become very elaborate and engaging, even game-like, especially when a series of related displays are integrated in some ongoing coherent presentation. A parallel series of long animations in a long hallway, each indicated by parallel positioning lines on the floor can be embellished with indications of the various significant points in the various animations, and their various interactions. Interactions can include points at which one animation can, plot-wise or message-wise, switch to an animation on an alternate track. Animations can also branch together and apart, briefly sharing an identical frame, and allowing the viewer to choose one of two or more alternate paths upon which to view the continued animation, elected by their continued movement along one of the available viewing paths traced along the hallway floor. The floor marking indications would graphically map out these and other animation events, as well as possibly provide key frames and other summary information and overview to participants in such displays.

Spotlights:

Similar to marks on the floor, but in some cases under programmatic control, spotlights can guide viewers through a sequence of viewing positions, perhaps in a gallery setting.

Armatures:

A simple physical pointer, perhaps a few inches long and mounted above a display can directly point to the viewing position or positions for a display. This armature can for example be a simple straight rod or a hoop at the end of a rod with an associated target at the base of the rod, such that lining up these two elements puts one at the viewing position. The shape of the hoop and target could show the shape of the viewing area or areas, and when there is more than one viewing area the arrangement of the hoops that indicate each area also shows the relative position of the multiple areas, thus indicating to viewers how to move among the different viewing areas.

Navigation keys:

A section of a display can be dedicated to providing overview information about the display, including providing positioning cues. This section can be by convention located in a certain corner of the display, such as in a large mall, museum, airport or city, or other venue where there are a series of mirror tile array displays, so that viewers will quickly learn to refer to it.

Written Instructions:

Written instructions, or simple arrows, can be incorporated into display images, to guide viewers. Even more simply, and obviously, written instructions may be provided adjacent to a display.

Mirror Tile Halo Viewer Positioning Cues:

When an image palette is consolidated to, for example, 32 colors, the entire reference graphic need only occupy approximately 64 square inches (1 square inch per eye per color=64 square inches). This is a very small and precise viewing area. Of course, this allows a large number of different viewing areas with different images, but whenever there is a small viewing area such as this it is helpful to provide homing cues for finding and maintaining the view. If all these 64 reference areas are spread out, and then surrounded with a halo of black, the target color for each mirror tile fading to black in all directions, and if all is printed on a background of white, then image viewers will see the following viewing cue:

If the image starts to darken, then they have to move back in the direction opposite the direction of movement that resulted in the image darkening, to re-center themselves at the proper viewing position. Another mirror tile halo cue might be a caret pointing toward the viewing center, inwards from all sides. Another mirror tile halo viewer positioning cue might use color to cue the position correction direction. For example a reddening image may indicate that a rightward correction is required while a blue tinging may indicate that a leftward correction is required.

Guide Mirror Tiles (Visible Either or Both from within or Outside the Viewing Area):

Color cues, animations or patterns can be encoded into just the borders, edge or corners of a display, as a subtle and intuitive form of directional cues. "indicator" rows might be the entire 4 or 5 bottom row of mirror tiles in an array configured to display a marquee lights style animation, or advanced and more subtle variation of such an animation, with the purpose of attracting the gaze of passersby at the operative moment as well as helping to direct their position, to better view the approaching display. Similarly, degradation of an array may be biased to begin first at the edges, to cue viewers to reverse their movement in that direction, to avoid losing their view of the display.

Providing a special indicator animation, in for example the top or bottom 5 rows, or even in 10 rows or columns in the very center of the display, does not require that these mirror tiles can no longer be part of the presentation image. All that is required to display this additional mirror tile array animation or image entirely separate from the display image is that an entirely separate reference graphic be provided, supporting the given effect. This is simply a special case of the general ability of mirror tile displays to different images and effects to different viewing position.

Generic Distortion Effects

It is possible to present funhouse mirror type effects with mirror tile grids. For example it is possible to invert sections of a reflection and then, as apparent to a passerby, restore the orientation of those sections of the reflection. Individual mirror tiles would not be not inverted, but the order of the reflected rows would be inverted, resulting in an apparent image inversion. Image distortions of all types are also possible, by simply gradually varying mirror tile angle across an array, in a combination of sine wave patterns. A mirror tile array can also be configured as a telescope, or a macroscope, provided great tile angle accuracy. Mirror tile arrays are effectively a very versatile reflection surface for general purpose reflection and distortion effects, aside from specific color translation purposes. A live actuated array combined with machine vision and interactive control is potentially a very precise and versatile instrument with many uses.

A reflective tile array is also effective with regard to the described techniques when reflecting other wave-propagated phenomena other than visible light, such as sound, and non-visible portions of the electromagnetic spectrum, provided reflective surfaces appropriate to the given waveform and an appropriate sensing device.

Techniques

Linear Compression of Animation Reference Stripes

When an animation is converted to a mirror tile array reference graphic, each individual pixel in the animation is, typically, converted to a stripe, hundreds or thousands of which constitute the full reference graphic. These mirror tile reflection reference stripes, these animation pixel timelines, are read or "indexed" by the viewer by his movement along the viewing path, which actuates en masse movement of each mirror tile in the array through its individual reflection reference stripe. Thus, reflected back to the viewer are the pixel timelines of all pixels/mirror, as an animation visible in the array. The speed of indexing through an animation is set by the speed of the viewer along the viewing path, other things, such as the geometry of the reflection relationship, being equal. If a viewer of the reflective animation is expected to move quickly along the viewing path, the animation time-to-path length ratio must be small. The stripe length for a given duration of animation will need to be relatively long where, instead, the viewer is expected to move slowly along the viewing path. The ideal speed of reflection indexing is, often, much slower than viewer movement. Thus, it is often advantageous to optimize reflection geometry to reduce the reflection reference speed. There are many methods for this. Each pixel's single frame's worth of animation as encoded into the reference stripe will itself become a line segment, will be longer than it is wide. If the viewer's speed is expected to be low, the reflection reference stripe will be short, and each pixel's length along the line will become shorter and shorter. At a certain very low viewing speed, the speed of the reflection vector along the encoded stripe becomes so slow that the limit of print resolution is reached. This is actually close to the ideal indexing speed: Any slower and it is not possible to print each frame, as each frame encodes to too short a length in each pixel's reference stripe; Any faster and reference graphic print area is being wasted. There are various ways to use adjunct mirrors, lenses and reference graphic proximity to more closely approach this optimum ratio of reference image indexing speed.

One category of techniques is to focally concentrate all of the reflection vectors with large curved mirrors. As with still image re-reflection focal source color size reduction with large curved mirrors, an inexpensive imprecisely curved sheet metal mirror can be used. Once the mirror is in place, the newly redirected color sources or paths, the new locations that is for the reference colors or stripes, including any distortions due to inaccurate mirror concavity, are not a problem for an updated reference graphic printout. This is because the new mirror tile reflection color source locations or paths can be directly determined by shining a light from the viewer position or along the viewer path, into the array, and photographing the resulting reflection pattern with a digital camera that can easily be calibrated to the given wall or mounting position geometry.

A correlation of animation frame rate to index graphic printed stripe length that represents good compression might be approximately 10 seconds to an inch (assuming 30 FPS video and 600 DPI printing, and assuming one frame per 2 printed dots). Higher quality printing may be able to significantly improve upon this, at a price (more expensive printing). Such a high print compression factor would rely upon precise focusing along at least in the direction of indexing, to expand each frame to the width of the referencing mirror, and rely as well upon accurate indexing speed.

Mirror tile array animation is generally very limited in X and Y resolution, compared to video, due to the constraints in available reference graphics real estate, with thousands of individual pixels each requiring not just a reference graphic swatch, but a reference graphic stripe, that stripe extending in length in proportion to the length of the animation. But mirror tiles in many situations have extra capacity in T resolution (T=time). One strategy is to trade some of the available T resolution for X and Y resolution, by using the minimum ink necessary for each frame, greatly reducing the amount of space needed to encode a length of animation and thus allow more room to increase the number of reference stripes and thus the presentation image resolution.

One example: A linearly uncompressed 20-second animation might require reference stripes 30 feet long. If the available reference graphic space allowed the encoding of just 2,500 30 foot long reference stripes, then the animation would be limited to 2,500 pixels. The same animation linearly compressed to 2 inches would allow the same animation at 450,000 pixels, nearly half a mega-pixel. Two axis focal compression would further optimize the use of reflection reference display space, allowing a further increase in the display animations pixel resolution. Additional compression techniques, noted elsewhere, could be applied to further reduce the reference graphic foot print.

Animation "Frame Rate"

In earlier discussions it has been assumed that video encoded into mirror tile reference stripes will have a T (time) dimension discontinuity, a "frame rate" that is, one slice of time every 30th of a second, for example, one snapshot of the animation scene every 30th of a second, similar in concept to standard movies and video. The rigid X/Y grid of traditional pixels is quite malleable for mirror tiles, as already noted (even to the point of mirror tiles becoming too small to be individually visible, and thus effectively becoming a continuous smooth surface). Similarly, there is no inherent structure in a mirror tile array display's T dimension, except as may be introduced by the reference image print, or other reference image production method. Mirror tile animation is similar to vector animation in this respect, which similarly has no concept of frame rate, except as it may be imposed by the presentation medium. This means that video which is encoded into mirror tile reference graphics unnecessarily limits the mirror tile animation frame rate to perhaps 30 frames per second, though mirror tiles can easily present much higher frame rates.

Unless video is encoded to reference stripes which are closely matched to the horizontal resolution of the printing medium, then the printed reference has unused potential for increased frame rate resolution. Since to a certain degree an increase in frame rate above 30 FPS will result in perceptibly improved video fidelity, it can be useful to take advantage, to at least some extent, of the mirror tile array medium's capability for arbitrarily high frame rate. Tests have shown that while a minimum of approximately 15 FPS is needed to establish the illusion of animation, and approximately FPS is needed to comfortably solidify the illusion, 60 FPS brings an additional noticeable improvement in realism. Therefore, in some cases, a more appropriate video source for mirror tile array animation displays may be a higher speed camera. Computer-generated animation would be an especially apt source for mirror tile array displays, not only because animations can easily be output from computer generated graphics at any frame rate, but because of the many other fluid parameters in a mirror tile array display—pixel size and shape, component color scheme, juxtaposition of animated and still imagery in a single frame, etc.—all of which can be readily managed programmatically but are difficult to deal with otherwise.

Reference Graphic Geometries and Space Constraints

When a color reference for animation is generated there are various geometric constraints on how the pixel reference stripes can be packed. Different compression techniques can be used in different situations to reduce the reference graphic size requirements, but there remain compression limits, and a premium on careful design to enable or optimize a given effect. For a very simple example, a packed reference palette ("packed" meaning that the color swatches all border each other with no additional space) for a still image cannot support animation because, being packed, the colors in the palette cannot be extended into stripes, in any direction. Before such a still image can be converted to an animation or be enhanced with any interactive effects (which are based on viewer movement that correspondingly changes the reflected image source size from a swatch to an elongated shape, minimally a "stripe") the geometry of the reference palette must be changed, to accommodate the necessary reference graphics shape changes. Some still image effects require a buffer area surrounding each pixel, which in a one-to-one mirror tile to reference swatch relationship would bloat the reference graphic size requirements, if it were not for compression techniques, such as consolidating mirror tile-swatch references (which in typical images with moderately constrained palettes can easily lead to 100 or 1000 times palette compression and thus similar reduction in the size of the reference graphic). Still, some effects make great demands on reference graphic real estate, and more complicated compression techniques may be required.

The first-level consideration in optimizing reference graphic size is to arrange the mirror tile reference shapes so that they can be most effectively packed. For example, an L-shaped two perpendicular axis animation or effect requires each swatch to conform to the inverse L shape of this intended viewer movement. Therefore, the geometry of optimal L-packing is the likely best geometry for the reference palette. Another example, perhaps more complicated, is the case of an effect to be viewed in movement along the Z axis (distance from the display), where the reference patches extend radially, which means they will not be parallel, and thus less easily packed. Depending upon the available reference graphic space there are various optimizations to the packing of the radial reference stripes, which are a collection of stripes probably of varying length, at all orientations around the compass. For example, each swatch stripe has its 180 degree complement, and all these pairs are parallel, and might effectively be plotted right next to each other in the reference graphic. Further, stripes of very close angle can be reasonably packed very closely.

Mirror tile array displays utilizes novel and unfamiliar compression concepts not present in other media. For example, no two pixel time trails may be identical, but the 2nd half of one may be identical to the first half of the other. These two pixel time trails can be combined into one trail, with the first pixel referencing the first ⅔ of this trail, and the 2nd pixel referencing the last ⅔ of it. Multiple pixel time trail merges can afford useful additional compression in combination with other strategies. Preparation of the video to optimize it for the unique compression methods available can increase the applicability of pixel time trail overlap, and other techniques.

Interactive Subject-Reflective Display Image Manipulations

An image of a face can use as its reference graphic another face, even the face of the viewer of display image face. In other words, a viewer's own face can provide the source colors for the construction of another face.

Color targeting of faces can be configured to be optimally adaptable to different faces so that many people, with varying facial features, can see a desired display image. For example, to produce the eyebrows in the display image face it might in some cases be helpful not to reference the eyebrows of the reference source face, thus ultimately of the viewer, since many women have very thin eyebrows and, in general, eyebrow location is very variable. Better perhaps to refer to head hair, in order to color the eye brows of the presentation image—though heads are also unreliable sources of hair color . . . (It might be allowed that for a given display, bald viewers will see an eye brow-less display image). The fine structure of the eyes might need to be derived from more easily targeted locations. It might be necessary to target the white of the display image eyes from the actual white of the viewer's eyes, and let that act as a homing element for viewing. The pupil might be targeted from hair (though this would not work for blond viewers or, again, for bald viewers). The iris might be targeted from the upper body (resulting in frequent blue, green, brown and black irises, which is fine, but also in red, orange and white irises, depending on the clothing worn by the subject, which may be fine too, and interesting in its own way—or not). The occasional odd results in the coloration in some facial elements might be part of the interest and amusing variability of such interactive facial images. Or, it might be required that the reflection be enhanced with a source of black and white, for certain key facial areas.

Setting aside the subtleties of color source options when the image viewer is the graphic source, the key attraction of viewer referential images might be the facial transform capability of such displays. Each such display can, in effect, change the source graphic face, the viewer's face, into an entirely different face: Ben Franklin, Marilyn Monroe, James Dean, Albert Einstein, Groucho Marx a Cro Magnon man, a fanciful face, an animal face, etc. One of the most interesting results of this configuration is that the celebrity or fanciful target face constructed from the viewer's face is controllable in real time by the viewer's face. This effect is like wearing a prosthetic face, or becoming the celebrity or fantasy person or entity, given the live interactivity. Further, the expressions on the input and output faces can be related in fanciful ways. Expressions can be mapped differently, for example by remapping facial regions so that movement of one part of the face will result in the reflective construction a different movement, different expression change. Exaggeratedly enlarged ears could be constructed from cheek area colors in such a way that when the viewer bloats his or her cheeks the ears will move. It would be a kind of facial puppetry using one's own face to control another face, that face in the reflectively apparent position of the puppeteer's own face. Fanciful creature faces can also be constructed, with radically distorted features, but which still retain mobility, directly mapped to the expressive movement of the viewer's face. Fanciful features can be added as well, so that not only are chins articulated by the viewer's chin movement, but other facial parts as well—or the chin itself could be constructed of forehead reflections, and the chin can be dedicated to the control of the alternate fanciful facial parts in the display.

One hurdle in designing such facial interactive reflectors is to make them work with both eyes at the same time. There are various reflection pattern constraints that can help support binocular vision, but these may compromise some of the best effects described so far. One elegant resolution of the binocular problem in viewer referential images is to require that the viewer wear a patch over one eye when viewing the display. This is elegant because a) the patch provides a surface on which additional useful reference colors can be printed, and printed accurately, greatly enhancing the display image and b) the viewer will see him/herself with both eyes, will not see the patch, in the reflection, and will to a great degree not recall that he is wearing an eye patch.

For high-accuracy facial translation mirror tile array displays to be customized for specific faces/viewers, would require at least one facial photograph. For a great boost in image accuracy, several photographs showing the subject displaying a wide range of facial expressions and mouth positions would be necessary, so that the various changeable facial color sources can be registered, along with the facial color sources that remain static during facial mobility. A fully registered mirror tile array reference palette is essential for constructing the animated portions of the constructed image. The subject would then choose the target face, or faces, that they would like to have reflectively translated from their image. Simulation software, using the registered palette as a basis, would be able to provide previews of the chosen display images, and allow customization of the display image and the available live manipulations: Would you like your raised eyebrow to reflect as enlarged eyes, on this display image cartoon face? Would you like your pursed lips to reflect as gills opening and closing, on this display image creature? Would you like your smile to reflect directly as this particular expression on Sean Connery's face, or this other expression of his, or this one? Popular alter egos for customized translation mirrors might be Marilyn Monroe, Humphrey Bogart, James Dean, Albert Einstein and other iconic figures, along with a range of their characteristic facial expressions and changes between expressions.

Computer Managed Reference Graphics

A computer display can be a mirror tile graphics reference. Various interactive effects can be managed programmatically, including dynamic tracking of viewers' position, updating the reference image in various ways such as by shifting it in response to viewer movement so that the viewing area follows the viewer. Stereo vision reference images when managed by computer become usefully interactive, given the programmability of the computer display, opening a wide range of entertainment and technically useful effects.

Wrap-Around Immersive Display

Assume a wide mirror tile array at comfortable viewing distance, gently curved horizontally such that every mirror tile in the middle row of mirror tiles is the same distance from the viewer's eyes. Assume that this one array covers 30 degrees of the viewer's visual field, horizontally, and 20 degrees vertically. The reference graphic is a large and high resolution computer projection display above and behind the viewer's head, providing enough reference graphics area for high resolution binocular 3D in the mirror tile array. So far this is a typical 3D mirror tile array display, that happens to use a computer display to manage the reference graphics. Now assume 5 more identical mirror tile array side by side with the first, each referencing the same reference graphics monitors behind the viewer. Whatever image had been on the first display is now repeated 6 times, once on each display. Together the six arrays form a single seamless mirror tile array, covering 180 degrees of the viewer's visual field, horizontally. By stacking 5 more rows of such displays on top of this first row of 6 we'll have a display that covers 180 degrees horizontally and 120 degrees vertically. We now have a single very large wrap-around display, though the image displayed remains the size of a 20×30 degree display, repeated 36 times. This is a wrap-around display but not a wraparound image.

Next, let's add a pair of eyeglasses that constrain the viewer's peripheral vision, so that he sees no more than approximately 20×30 degrees at a time. This is a very functional visible range, larger than the useful field of vision necessary for most tasks. Finally, assume a tracking device, so that the system accurately knows where the viewer is looking.

This mirror tile display is about to become, functionally, a 180×120 degree 3D display. Though each of the 36 panels of the overall mirror tile array still displays the same image as all the others, as they must do, since they all reflect the same computer display reference graphic. The viewer, however, does not see more than one image at a time. The key to invoking the illusion of a single unified wide-field display is to update the image with the changing eye position of the viewer. If the viewer looks to the left, in a 3D scene for example, the display shows the left side of the 3D scene. If the viewer looks up, the display shows the view in that direction. If the viewer slowly pans from left to right, the view slowly pans from left to right, the frame of the image tracking perfectly with the viewer's moving gaze.

When the viewer's gaze straddles two or more panels in the mirror tile display, the display is not split, as when looking between two neighboring television screens. The viewer sees the display centered wherever he is looking. In order for the frame of the frame of the scene to straddle large display's component panels the computer managed reference graphic simply needs to slide the reference graphic laterally, proportionally to the viewer's offset from the center of a given component panel.

The mirror pattern for these panels will most often be identical, for manufacturing reasons, though unique mirror patterns would also work. When identical flective angle patterns are used the reference graphic does still need to be adjusted slightly, optimized to the given panel, since each is at a slightly different perspective. The same reference graphic will roughly apply to all, but should be slightly transformed to best fit the panel of current gaze.

Configuration Methods

The color of a mirror tile array pixel can be established, for a given mirror tile array display either through 1) placement of the required colors (for a given display image) where each mirror tile already points, or in; 2) pointing each mirror where the proper color already exists, or in; 3) designing and engineering both color source position and mirror angle in tandem. Here are guidelines for these three most common mirror tile array display development scenarios.

1) Implementation by Reference Graphic Configuration:

Mirror array is pre-set;

Reference graphic is freely configurable.

When a mirror tile array display is based on a pre-set mirror array, the decode/encode pattern (i.e., the mirror array angle settings pattern) can be discovered by shining a light from the viewing position to the reference graphic location, through each tile, in sequence. This process can be automated, with complicated equipment, or done by hand, laboriously.

Alternatively, and ideally, when a custom mirror array is generated, the angle pattern is saved for future reference, so that if or when a new image is to be displayed using that array, the graphic encoding that must be applied to produce the reference graphic for that new image is readily available. This encoding transform, when applied to any given image, with the resulting encoded graphic then mounted in the proper reference position, for a chosen viewing location, displays the new image in the array. When the mirror array's transform is available, all that needs to be measured at the site are a few anchor points of the reflection locations, to establish the boundaries for the proper positioning of the reflection source as it should be positioned in the given location. For example, if the reference graphics are to be mounted on a slanted wall, the anchor points will determine how to skew (applying an affine transformation) the entire encoded graphic, so that when mounted at that location it can be properly read by the mirror array.

When a pre-set mirror array is based on certain regular patterns, some of which are designed to ease the production of reference graphics, that mirror array may be made available with a source graphics production template. Such a mirror array pattern may be specialized in constraining source graphics in long strips convenient for printing, or other shapes useful in other ways.

2) Implementation by Tile (Flect) Angle Configuration:
Mirror array is freely configurable;
Reference graphic is pre-set:

When a reference graphic or color array is already in place, either in the form of a generated graphic that was mirror encoded to produce an unrelated image, or in the form of a happenstance pre-existing ambient color constellation, it is required that the palette/angle table of this color reference environment be available, in order to set the angle tiles of a new mirror tile array to reference these colors, and thus generate new images based on these colors. One method, noted previously, to compile an ambient palette involves photographing the scene with an angle-normalized digital camera (to account for lens distortion). The palette for a printed reference graphic can similarly be derived from scratch, though it is preferable to have the original file that produced the graphic, because it contains the palette/angle table. Once the palette/angle table is available, for a given mirror tile array display mounting location, the mirror angle pattern to reflectively produce any given image can then be calculated (provided that it is a palette subset of the existing color set). A computer program performing such angle calculations is basically following a process that can, alternatively, be laboriously performed by hand.

The by-hand process of determining the mirror tile angle settings required for a given image, and then setting them to the thousands of mirror tiles in a given array, can be illustrated if we assume a mirror array with tiles that can freely pivot and be set by hand. The configurable angles of mirror tile arrays can be manufactured in many ways, and freely configurable mirror tiles are certainly not the least expensive, and are used here just for illustrative purposes. Two people, working in tandem, can perform the angle determination task, and set the angles to each mirror tile, though the task is very laborious for any useful number of mirror tiles, so for this illustration we'll use a simplified case of 10×10 mirror tile array. One person is at the viewing location, and is referring to a print out of the desired presentation graphic. Our demonstration graphic will be the letter "A". That graphic has been converted to the exact resolution of the tile array and its palette has been constrained to the available reflective palette. In our instance the only necessary colors are black for the letter and light blue for a background. Each pixel/mirror is perhaps numbered, or at least easy to identify on the grid. The color of each pixel is also perhaps numbered, to assist in the targeting. The person at the viewing position calls out a pixel number and its color assignment and his collaborator, whose job it is to physically target the mirror tiles, then locates that numbered mirror tile, and tries to aim it at the correct color, where ever it is listed as existing in the surrounding environment or in the available reference graphic. When successfully aimed, the proper color reflection will be apparent to the first technician, and the process then proceeds to the next mirror tile (i.e., pixel).

Both these functions could be automated using simple devices. A color sensor at the viewing position could work in tandem with a device that articulates a mirror at each mirror tile location, methodically scanning back and forth across the reflectable field. When the proper color is reflected for the given mirror tile position, the color sensor will see it, and the position of the mirror can be noted and the process repeated for another mirror tile position.

3) Implementation by Reference Graphic and Tile Angle Configuration in Tandem:
Mirror array is freely configurable;
Reference graphic is freely configurable:

When both the mirror array and the reference graphic are unconstrained there is a complex interplay of the full range of design variables and options of these two components. In this situation a computer model is probably the only realistic approach to effectively explore the vast range of options, at least for some of the more advanced effects. For this process the necessary 3D computer model of the display environment can be constructed based on a survey of the geometry of the mounting location of both the mirror tile array and the reference graphics. It is not important how the geometry of the site is recorded, only that it is accurate. Or, a geometrically accurate reference graphic and mirror array relationship can be based on the assumption that one or both of these two elements will be freestanding and thus the geometry as explored virtually can be implemented in the actual setting. A compromise approach is to at least roughly survey the geometry of the deployment location and then design an array/reference graphic/viewing position scenario based on those rough dimensions, making sure to work within the available bounds of the given location. For example, if we design a mirror tile display that requires the mirror array and the reference graphic be mounted facing each other, perfectly parallel, 10 feet apart and on center, this is easy to design and implement in a location with 11 available feet, or 12.2 available feet, for example. If however the given location requires that reference graphic must be distributed among several patches mounted on various walls at different angles with respect to the mirror array, this would require an accurate on-site survey of the 3D space. Even the original plans of the building may not suffice, for some displays, as when accuracy is at a premium, since a building's foundation shift of ½ an inch can throw off the alignment of a mirror grid and its reference graphics. Once a computer model is of a given deployment situation and display effect intention, many iterations of the various optional design parameters can be tested against each other, and artistic and functional choices can be weighed. 3D renderings and animation of possible mirror grids, reference graphics arrangements and the resulting viewer experiences can be rendered programmatically and interactively tweaked based on the many variables involved in any presentation situation.

Fabrication

There are many ways to produce the mirror arrays used by mirror tile array systems. Here's a brief outline of some implementation methods for mirror tile arrays:

- Arrays can be mass produced, especially when based on standard regular mirror array patterns that can be stamped into reflective foil or other media;
- Arrays can be machined, when based on custom angle settings;
- Arrays can be constructed of modular components, using a set of differently angled shims, stacked and combined as needed, at various orientations, to produce any angle;
- Arrays can be built using any number of different designs of articulating mirror tiles, which could then could be set to any designated angle by hand, by automated device or even to a random setting—a stochastic approach—allowing the image to be produced by the reference graphic then designed based on the accidental array and the desired view image.

It is not important to the underlying invention which method is used, though some proprietary manufacturing methods can be developed. What is key is that the system can be built by any number of methods. Nonetheless, it may be useful to note some of the basic approaches to building or manufacturing mirror arrays.

CNC

One method is for a computer numerically controlled (CNC) machine to take input from the tile angle settings array as prescribed by a computer 3D model, and precisely carve the tiles into some medium, whether plastic or metal or another material. This material would then need to be mirror coated, again by whatever method were most convenient, from among the many possible methods. The priority (generally, though not always) is that the reflective surfaces of each mirror tile be very accurately flat.

Impress

As an alternate to CNC carving tiles, a malleable substrate could be covered with adhesive mirror mylar, and a CNC arm could position a square, round, triangular or differently shaped (or series of differently shaped) indent tools, angled appropriately by the CNC arm to impress each mirror tile, and simply deform the mylar and underlying substrate to the properly angled facets. One advantage of this approach may be cost effectiveness, compared to the cost of milling a material.

Foil Stamped Micro Array

Tiny mirror arrays, such as those that might be embedded into floor tiles, into escalator rubber handrails, could possibly be stamped, hundreds or thousands of mirror tiles at a time, especially if the mirror tile arrays were based upon regular patterns.

Individually Articulated

Another construction approach is for each tile to be independently individually articulated, either motorized or articulated by a separate device.

Motorized

Motorized mirror tiles under programmatic and interactive control is perhaps the most advanced embodiment of the invention, with a wealth of real-time effects not possible otherwise. An interactive motorized array that also senses the location of the viewer can update the viewing position in response to viewer movement, keeping the viewer always in the viewing position. Motorized displays would be able to update the presentation images moment by moment, perhaps even quickly enough to present animations, given a responsive enough set of mirror tile articulation motors. An interactive motorized display could cycle through the complete range of mirror tile array effects, one moment presenting a 3D image, then become a simple magnifying mirror displaying the viewer's face, then distort that face into a cartoon, then display a series of entirely different still images (leaving the viewer wondering the source of all these distinctly different images appearing in what was moments before clearly just a mirror), display image distortion effects (such as distortion waves echoing back and forth across the display) cued to viewer movements or sounds and many other different types of images and effects.

A useful adjunct invention would be a device that crawls an array of articulated flects and one-by-one updates the entire array. Over the course of a few hours, overnight perhaps, a billboard-size display can be updated to display a new image.

Various interchangeable part mirror tiles can be used to construct arrays, the interchangeable parts being mirror tiles set to different angles, or the mirror tiles themselves could be constructed, using interchangeable parts for adjusting the reflection angle each mirror tile.

Shim Construction Set

Mirror tiles pegs can be individually angled using a shim insert construction set, wherein a small set of differently angled shims can be freely combined, to build up the needed angle.

Saw Tooth Profile Array, Visible from Opposing Directions

Viewers approaching from opposing directions can see separate arrays that resemble the peaks of a neighborhood of houses seen from a low angle. The south facing angles of the simple gable of each house are the mirrors seen from one direction. The north facing gables are an array seen from the opposing direction. In this "neighborhood", the houses are contiguous. Such an array can be constructed according to a typesetting model, where a selection of slightly different angle position and size mirror tooth pieces take the place of letters.

Angle Cut Pegs:

A construction set of interchangeable mirror tile pegs with (for example) 100 differently angled heads which can be seated into a pegboard set at any rotation could reference any point on a 360° circle, and at any of 100 different angles from vertical.

Component mirror tiles (mirror tiles groups comprised of one mirror each for, in one embodiment, R, G and B, in several shades each) can be easier to target with rotatable rods, since each of a small selection of reference colors (3 colors, in the case of and RGB component scheme) can each be larger targets. If a given display uses an RGB component color space, with 4 shades each of R, G and B (therefore supporting 64 colors: 4×4×4), then there need be just a total of 12 color swatches to target, and these could be oriented radially, for one example, around the display, allowing the proper color to be dialed in, like a hand on a clock—easy to do by hand, provided circular sub-flects that are easily rotated and then locked at the position of a clock hand.

What is claimed is:

1. A visual display apparatus configured to display persistent images, video and visual effects, comprising: an array of mechanically adjustable pivoting mirror tiles; a computer program configured to individually control the pivot angle of each mirror tile; a viewer eye position tracking system configured to track an eye position of one or more viewers; and an ambient color source patch identification and position tracking system configured to identify and track, for each color present in the image, video or visual effect to be displayed, a corresponding color source in a local ambient environment; wherein the computer program is configured to receive data from the viewer eye position tracking system and the ambient color source patch identification and position tracking system, and control the pivot angle of each mirror tile such that the image, video or visual effect is displayed to one or more stationary and/or moving viewers within a designated viewing area.

2. The apparatus of claim 1, capable of displaying multiple different images and visual effects to multiple different viewers at the same time.

3. The apparatus of claim 1, wherein the color source can include one or more prepared color sources.

4. The apparatus of claim 1, wherein the viewer eye position tracking system is configured to track both left and right eye positions for each viewer.

5. The apparatus of claim 1, capable of displaying autostereoscopic images and effects.

6. The apparatus of claim 1, wherein the tracked color sources are found on the viewer's own face, and wherein the display image is another person's facial likeness, and in which the other person's displayed facial likeness changes expression as a result of changes in expression of the viewer's face.

7. The apparatus of claim 1 wherein the color source is a video projection of dynamically changeable prepared color sources.

8. The apparatus of claim 1, further comprising an audio sensing system that detects the volume and direction of sound, wherein said system is configured to display image distortion effects in response to local ambient sounds.

9. The apparatus of claim 1, capable of controlling the mirror tiles quickly enough to present animation.

10. The apparatus of claim 1, wherein the array of mirror tiles is capable of returning to a fully flat configuration, forming a standard mirror.

11. The apparatus of claim 1, wherein the array of mirror tiles is capable of forming magnification and distortion effects, including by gradually varying mirror tile pivot angles across the array in a combination of sine wave patterns.

\* \* \* \* \*